US009379789B2

(12) United States Patent
Lin et al.

(10) Patent No.: US 9,379,789 B2
(45) Date of Patent: Jun. 28, 2016

(54) ANTENNA SELECTION ADJUSTMENT

(71) Applicant: QUALCOMM Incorporated, San Diego, CA (US)

(72) Inventors: Jamie Menjay Lin, San Diego, CA (US); Ashok Mantravadi, San Diego, CA (US); Francesco Negro, Nuremberg (DE); Petru Cristian Budianu, San Diego, CA (US); Taesang Yoo, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/318,122

(22) Filed: Jun. 27, 2014

(65) Prior Publication Data
US 2015/0010099 A1    Jan. 8, 2015

Related U.S. Application Data

(60) Provisional application No. 61/842,454, filed on Jul. 3, 2013, provisional application No. 61/939,608, filed on Feb. 13, 2014.

(51) Int. Cl.
*H04B 7/04*    (2006.01)
*H04B 7/08*    (2006.01)
*H04B 7/06*    (2006.01)

(52) U.S. Cl.
CPC ............ *H04B 7/0404* (2013.01); *H04B 7/0608* (2013.01); *H04B 7/0802* (2013.01); *H04B 7/0691* (2013.01); *H04B 7/0874* (2013.01)

(58) Field of Classification Search
CPC .. H04B 7/0404; H04B 7/0608; H04B 7/0802; H04B 7/0874; H04B 7/0691; H04B 17/20; H04B 7/0817; H04B 17/00; H04B 7/08
See application file for complete search history.

(56) References Cited

U.S. PATENT DOCUMENTS 5,379,449 A * 1/1995 Porambo ............. H04B 1/1081
                                                                381/13
5,634,206 A * 5/1997 Reed ..................... H04B 17/20
                                                                455/135

(Continued)

FOREIGN PATENT DOCUMENTS

CA    2176613 A1    11/1997
EP    2129005 A1    12/2009

(Continued)

OTHER PUBLICATIONS

ISA/EPO, International Search Report and Written Opinion of the International Searching Authority, Int'l. App. No. PCT/US2014/044866, Jan. 14, 2015, European Patent Office, Rijswijk, NL, 16 pgs.

(Continued)

*Primary Examiner* — Pablo Tran
(74) *Attorney, Agent, or Firm* — Holland & Hart LLP

(57) ABSTRACT

Dynamic adjustment of antenna selection period at a wireless communication device or user equipment having two or more antennas. The described approaches consider an antenna selection performance metric. The antenna selection performance metric may include both measurement overhead (capacity loss due to measurements) and antenna switching capacity gain (gain in capacity through switching antenna subsets). The antenna selection performance metric may further include an estimate of UE speed or an antenna selection change rate. The antenna selection period may be adjusted by increasing or decreasing the antenna selection period based on the antenna selection performance metric. Antenna selection may be enabled or disabled based on the antenna selection performance metric.

14 Claims, 34 Drawing Sheets

(56) References Cited

U.S. PATENT DOCUMENTS

| | | | |
|---|---|---|---|
| 5,777,693 A | 7/1998 | Kishigami et al. | |
| 6,009,307 A * | 12/1999 | Granata | H04B 7/0808 455/13.3 |
| 6,296,565 B1 * | 10/2001 | Kenkel | H04B 7/0802 455/269 |
| 6,330,433 B1 * | 12/2001 | Jager | H04B 7/0808 455/135 |
| 6,456,827 B1 * | 9/2002 | Kubo | H04B 7/2628 342/104 |
| 6,535,723 B1 * | 3/2003 | Jiang | H04W 52/241 455/24 |
| 6,784,923 B1 * | 8/2004 | August | H04B 7/0848 348/180 |
| 7,099,380 B1 | 8/2006 | Feng et al. | |
| 7,366,247 B2 * | 4/2008 | Kim | H04B 7/063 375/267 |
| 7,639,999 B2 * | 12/2009 | Wallace | H04B 7/0871 375/347 |
| 8,644,413 B2 | 2/2014 | Harel et al. | |
| 2008/0232325 A1 | 9/2008 | Mehta et al. | |
| 2010/0195754 A1 | 8/2010 | Li et al. | |
| 2010/0284454 A1 | 11/2010 | Oteri et al. | |

FOREIGN PATENT DOCUMENTS

| | | |
|---|---|---|
| WO | WO-9413064 A1 | 6/1994 |
| WO | WO-9637966 A1 | 11/1996 |
| WO | WO 2013166464 A1 | 11/2013 |

OTHER PUBLICATIONS

ISA/EPO, Partial International Search Report of the International Searching Authority, Int'l. App. No. PCT/US2014/044866, Oct. 27, 2014, European Patent Office, Rijswijk, NL, 5 pgs.

* cited by examiner

ANTENNA SELECTION ADJUSTMENT

CROSS REFERENCES

The present application for patent claims priority to U.S. Provisional Patent Application No. 61/842,454 by Mantravadi et al., entitled "Enabling And Disabling Antenna Selection Using An Outer Loop," filed 3 Jul. 2013, and assigned to the assignee hereof; and U.S. Provisional Patent Application No. 61/939,608 by Lin, entitled "Antenna Measurement Control With Throughput Maximization," filed 13 Feb. 2014, and assigned to the assignee hereof, each of which are expressly incorporated by reference herein.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations or Node-Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

The base station and the UE may each use multiple antennas when communicating with each other. Multiple antennas at the base station and UE may be used to take advantage of antenna diversity schemes that may improve communication quality and reliability. There are different types of techniques that may be used to implement an antenna diversity scheme. For example, transmit diversity may be applied to increase the signal to noise ratio (SNR) at the receiver for a single data stream. Spatial diversity may be applied to increase the data rate by transmitting multiple independent streams using multiple antennas. Receive diversity may be used to combine signals received at multiple receive antennas to improve received signal quality and increase resistance to fading.

SUMMARY

Methods and apparatuses are described for performing antenna selection at a wireless communication device or user equipment (UE) having two or more antennas. In general, the antenna selection may be performed with dynamic periodicity adjustment. The approaches described herein consider an antenna selection performance metric. The antenna selection performance metric may include both measurement overhead (capacity loss due to measurements) and antenna switching capacity gain (gain in capacity through switching antenna subsets). The antenna selection performance metric may further include an estimate of UE speed or an antenna selection change rate.

In addition, methods and apparatuses are described for enabling and disabling antenna selection using an outer loop. In some examples, antenna enabling and disabling is performed in an outer loop based on estimates of receiver speed. Receiver speed may be estimated based on observations of Doppler effects to the received signals. During a Doppler estimation window, antenna selection may be disabled or an anchor antenna may be used for Doppler estimation while antenna selection may continue selection of one or more other antennas. The receiver speed estimates may be used to select the period for antenna selection.

In some examples, enabling and disabling of antenna selection is performed based on a change rate of selected antenna subsets according to the antenna selection function. An outer loop may be performed that periodically checks the antenna selection change rate based on the antenna selection function while antenna selection is disabled. When the antenna selection change rate falls below a high change rate threshold, antenna selection may be enabled and the antenna selection period may be varied according to an inner loop. If the change rate is below a low threshold, the antenna selection period may be increased until a maximum antenna selection period is reached. If the change rate is above a high threshold, the antenna selection period may be decreased until a minimum antenna selection period is reached. If the change rate stays above the high threshold at the minimum antenna selection period, antenna selection may be disabled and the outer loop may be resumed to evaluate the change rate while antenna selection is disabled.

Some examples of the present disclosure describe a method for performing antenna selection at a user equipment (UE) having two or more antennas. In one configuration, the method may include performing, for an antenna selection interval, one or more measurements for a measurement set comprising one or more antenna subsets of the two or more antennas, determining an antenna selection performance metric, and adjusting an antenna selection period for the antenna selection interval based at least in part on the antenna selection performance metric.

In some examples, determining the antenna selection performance metric includes determining a capacity gain for the antenna selection interval based at least in part on the one or more channel measurements, and determining a measurement overhead metric associated with performing the one or more channel measurements for the measurement set. In some examples, determining the capacity gain includes calculating the capacity gain based at least in part on a highest estimated capacity identified for the measurement set and an estimated capacity of a current antenna subset. In some examples, adjusting the antenna selection period includes adjusting the target gain according to a target gain period comprising one or more antenna selection periods. In these examples, the adjusted antenna selection period conforms the capacity gain to a target gain, and the target gain is based at least in part on the measurement overhead metric. In some examples, adjusting the antenna selection period includes decreasing the antenna selection period by a variable decrease step determined based on an amount by which the capacity gain is greater than an upper target gain, and increasing the antenna selection period by a variable increase step determined based on an amount by which the capacity gain is less than a lower target gain. In these examples, the upper target gain is based at least in part on the measurement overhead metric and an upper gain margin, and the lower target gain is based at least in part on the measurement overhead metric and a lower gain margin.

In some examples, the method further includes filtering a plurality of antenna selection periods to obtain a filtered antenna selection period, and determining the measurement overhead metric based at least in part on the filtered antenna selection period. In some examples, when a difference between the filtered antenna selection period and a previous filtered antenna selection period is less than a threshold, the measurement overhead metric is set to a previous measurement overhead metric. In some examples, the measurement overhead metric includes a ratio determined by a number of subframes in the measurement set divided by a number of subframes in the filtered antenna selection period. In some examples, the measurement overhead metric is determined based at least in part on an effective channel capacity for a current antenna subset and estimated capacity losses from channel measurements for each antenna subset of the measurement set.

In some examples, determining the antenna selection performance metric includes determining an estimate of UE speed. In some examples, determining the antenna selection performance metric includes determining an antenna selection change rate. In some examples, adjusting the antenna selection period includes decreasing the antenna selection period if the antenna change rate is greater than an antenna change rate high threshold, and increasing the antenna selection period if the antenna change rate is less than an antenna change rate low threshold.

Some examples of the present disclosure describe a method for determining when to perform antenna selection at a user equipment (UE) having two or more antennas. In one configuration, the method includes evaluating whether to perform antenna selection during an outer-loop process, the evaluating based at least in part on an antenna selection performance metric meeting an antenna selection enablement threshold, enabling an inner-loop process for performing antenna selection based on the evaluating, and performing antenna selection for each of a plurality of inner-loop periods of the inner-loop process.

In some examples, performing antenna selection includes determining, for each of the plurality of inner-loop periods, a subset of the two or more antennas for receiving downlink transmissions during the inner-loop period based at least in part on an antenna selection function. In some examples, evaluating whether to perform antenna selection includes determining, for a first outer-loop period of the outer-loop process, a first estimate of UE speed, an determining that the first estimate of UE speed is less than an initial antenna selection speed threshold. In these examples, enabling the inner-loop process includes enabling the inner-loop process for a first outer-loop period based at least in part on the first estimate of UE speed being less than the initial antenna selection speed threshold. In some examples, the method further includes determining that a second estimate of UE speed is greater than an antenna selection high-speed threshold, and disabling antenna selection for a second outer-loop period based at least in part on the second estimate of UE speed being greater than the antenna selection high-speed threshold. In some examples, the method further includes determining that a third estimate of UE speed is less than an antenna selection low-speed threshold, and enabling antenna selection for a third outer-loop period based at least in part on the third estimate of UE speed being less than the antenna selection low-speed threshold.

In some examples, determining the first estimate of UE speed includes estimating a spectrum spread of reference signals of downlink transmissions received by the UE over a Doppler observation time period, the Doppler observation time period being greater than each of the inner-loop periods. In some examples, determining the first estimate of UE speed further includes selecting at least one common antenna for each subset of antennas selected during the Doppler observation time period.

In some examples, evaluating whether to perform antenna selection during the outer-loop process includes determining a first change rate of subsets of the two or more antennas selected according to an antenna selection function, the first change rate corresponding to a number of changes of selected subsets of the two or more antennas over a first period of time, and comparing the first change rate with an antenna change rate high threshold. In these examples, enabling the inner-loop process includes switching to the inner-loop process based at least in part on the first change rate being less than the antenna change rate high threshold. In some examples, the method further includes determining, in the inner-loop process, a second change rate based on antenna selections performed for one or more of the plurality of inner-loop periods, the second change rate corresponding to a number of changes of selected subsets of the two or more antennas over a second period of time, comparing the second change rate to an antenna change rate low threshold, and increasing the inner-loop periods based at least in part on the second change rate being less than the antenna change rate low threshold. In some examples, the method further includes determining, in the inner-loop process, a second change rate based on antenna selections performed for one or more of the plurality of inner-loop periods, the second change rate corresponding to a number of changes of selected subsets of the two or more antennas over a second period of time, comparing the second change rate to an antenna change rate high threshold, and decreasing the inner-loop periods based at least in part on the second change rate being greater than the antenna change rate high threshold. In some examples, the method further includes switching to the outer-loop process based on determining that the second change rate is greater than the antenna change rate high threshold with the inner-loop periods set to a minimum inner-loop period.

Some examples of the present disclosure describe an apparatus for performing antenna selection at a user equipment (UE) having two or more antennas. In one configuration, the apparatus includes a processor and memory in electronic communication with the processor. The memory may embody instructions, and the instructions may be executable by the processor to perform, for an antenna selection interval, one or more measurements for a measurement set comprising one or more antenna subsets of the two or more antennas, to determine an antenna selection performance metric associated with the measurement set, and to adjust an antenna selection period for the antenna selection interval based at least in part on the antenna selection performance metric.

In some examples, the instructions are executable by the processor to determine the antenna selection performance metric by determining a capacity gain for the antenna selection interval based at least in part on the one or more channel measurements, and determining a measurement overhead metric associated with performing the one or more channel measurements for the measurement set. In some examples, the instructions are executable by the processor to determine the antenna selection performance metric by determining an estimate of UE speed. In some examples, the instructions are executable by the processor to determine the antenna selection performance metric by determining an antenna selection change rate.

Some examples of the present disclosure describe an apparatus for determining when to perform antenna selection at a user equipment (UE) having two or more antennas. In one configuration, the apparatus includes a processor and memory in electronic communication with the processor. The memory may embody instructions, and the instructions may be executable by the processor to evaluate whether to perform antenna selection during an outer-loop process, the evaluating based at least in part on an antenna selection performance metric meeting an antenna selection enablement threshold, enable an inner-loop process for performing antenna selection based on the evaluating, and perform antenna selection for each of a plurality of inner-loop periods of the inner-loop process.

In some examples, the instructions are executable by the processor to evaluate whether to perform antenna selection by determining, for a first outer-loop period of the outer-loop process, a first estimate of UE speed, and determining that the first estimate of UE speed is less than an initial antenna selection speed threshold. In these examples, the instructions are executable by the processor to enable the inner-loop process by enabling the inner-loop process for a first outer-loop period based on the first estimate of UE speed being less than the initial antenna selection speed threshold. In some examples, the instructions are executable by the processor to evaluate whether to perform antenna selection during the outer-loop process by determining a first change rate of subsets of the two or more antennas selected according to an antenna selection function, the first change rate corresponding to a number of changes of subsets of the two or more antennas over a period of time, and comparing the first change rate with a high change rate threshold. In these examples, the instructions are executable by the processor to enable the inner-loop process by switching to the inner-loop process based at least in part on the first change rate being less than the high change rate threshold.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
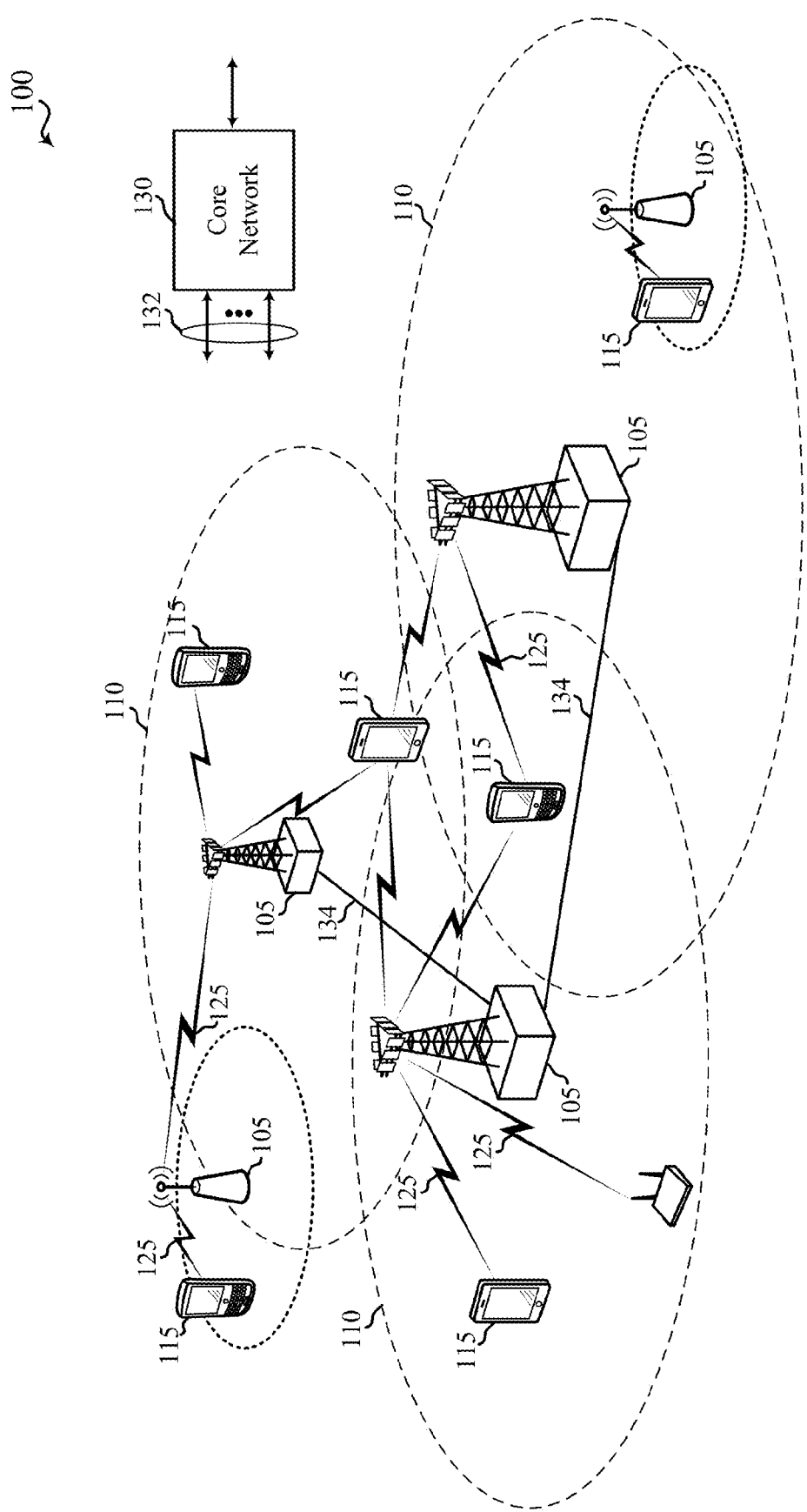
FIG. 1 shows a diagram of an example of a wireless communications system in accordance with various examples.

Described examples are directed to systems and methods for controlling antenna selection by dynamically adjusting an antenna selection period. The approaches described herein consider an antenna selection performance metric. The antenna selection performance metric may include both measurement overhead (capacity loss due to measurements) and antenna switching capacity gain (gain in capacity through switching antenna subsets). The antenna selection performance metric may also include an estimate of user equipment (UE) speed or an antenna selection change rate. Described examples are further directed to systems and methods for wireless communications in which antenna selection is enabled and disabled using an outer loop.

In some examples, channel measurements for a measurement set of one or more antenna subsets of two or more antennas of a UE may be performed during an antenna selection interval. A capacity gain for the antenna selection interval may be determined using the channel measurements. The capacity gain may be calculated as an absolute quantity or as a ratio of the improvement in estimated capacity as a result of performing antenna selection divided by the current capacity. Also, a measurement overhead metric associated with the measurement set may be determined.

In some examples, an antenna selection period (measurement periodicity) for the antenna selection interval may be adjusted using the capacity gain and the measurement overhead metric. In some examples, the measurement overhead metric may be used to determine a target gain, which may be semi-statically set. For example, the target gain may be set as a ratio of the measurement overhead loss for measurement subframes compared to the current effective capacity divided by the effective capacity over the antenna selection interval. Adjusting the antenna selection period may be performed based on comparing the capacity gain to the target gain such that the capacity gain tracks the target gain. By accounting for measurement overhead in controlling the antenna selection period, the approaches described herein may provide more accurate and more robust switching of antenna subsets, which may enable higher performance in data throughput to be achieved.

In some examples, antenna enabling and disabling may be performed in an outer loop based on the estimate of UE speed. The UE speed may be estimated based on observations of Doppler effects to the received signals. During a Doppler estimation window, antenna selection may be disabled or an anchor antenna may be used for Doppler estimation while antenna selection may continue selection of one or more other antennas. The UE speed estimates may also be used to adjust the period for antenna selection.

In some examples, enabling and disabling of antenna selection is performed based on a change rate of selected antenna subsets according to the antenna selection function. An outer loop may be performed that periodically checks the antenna selection change rate based on the antenna selection function while antenna selection is disabled. When the antenna selection change rate falls below a high change rate threshold, antenna selection may be enabled and the antenna selection period may be varied according to an inner loop. If the change rate is below a low threshold, the antenna selection period may be increased until a maximum antenna selection period is reached. If the change rate is above a high threshold, the antenna selection period may be decreased until a minimum antenna selection period is reached. If the change rate stays above the high threshold at the minimum antenna selection period, antenna selection may be disabled and the outer loop may be resumed to evaluate the change rate while antenna selection is disabled.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various examples. Base stations 105 may communicate control information and/or user data with the core network 130 through backhaul links 132. In examples, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some examples, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In examples, the system 100 is an LTE/LTE-A network. In LTE/LTE-A networks, the terms evolved Node B (eNB) and UE may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a small cell, and/or other types of cell. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station that may operate in the same or different (e.g., licensed, unlicensed, etc.) frequency bands as macro cells. Small cells include pico cells, femto cells, and micro cells. A pico cell would generally cover a relatively smaller geographic area and may allow unrestricted access by UEs with service subscriptions with the network provider. A femto cell would also generally cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication networks that may accommodate some of the various disclosed examples may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. In some examples of the system 100, base stations 105 and/or mobile devices 115 may include multiple antennas for employing antenna diversity schemes to improve communication quality and reliability between base stations 105 and mobile devices 115. Additionally or alternatively, base stations 105 and/or mobile devices 115 may employ multiple-input, multiple-output (MIMO) techniques as described in more detail below.

In some examples, the mobile devices 115 may have more antennas than are required for reception of a transmission link 125 based on an antenna diversity or MIMO configuration of the link. Thus, the mobile device 115 may use a subset of the antennas for receiving transmissions over a transmission link 125 at a given time. Because different antennas of the mobile device 115 may have different channel conditions or multipath characteristics, different subsets of the antennas may provide better reception quality or throughput at different times. The rate of change of channel conditions for the antennas may also vary. For example, under high Doppler conditions (e.g., higher speed of the mobile device 115, etc.), channel conditions for the antennas may change more rapidly than under low Doppler conditions.

Figure 2:
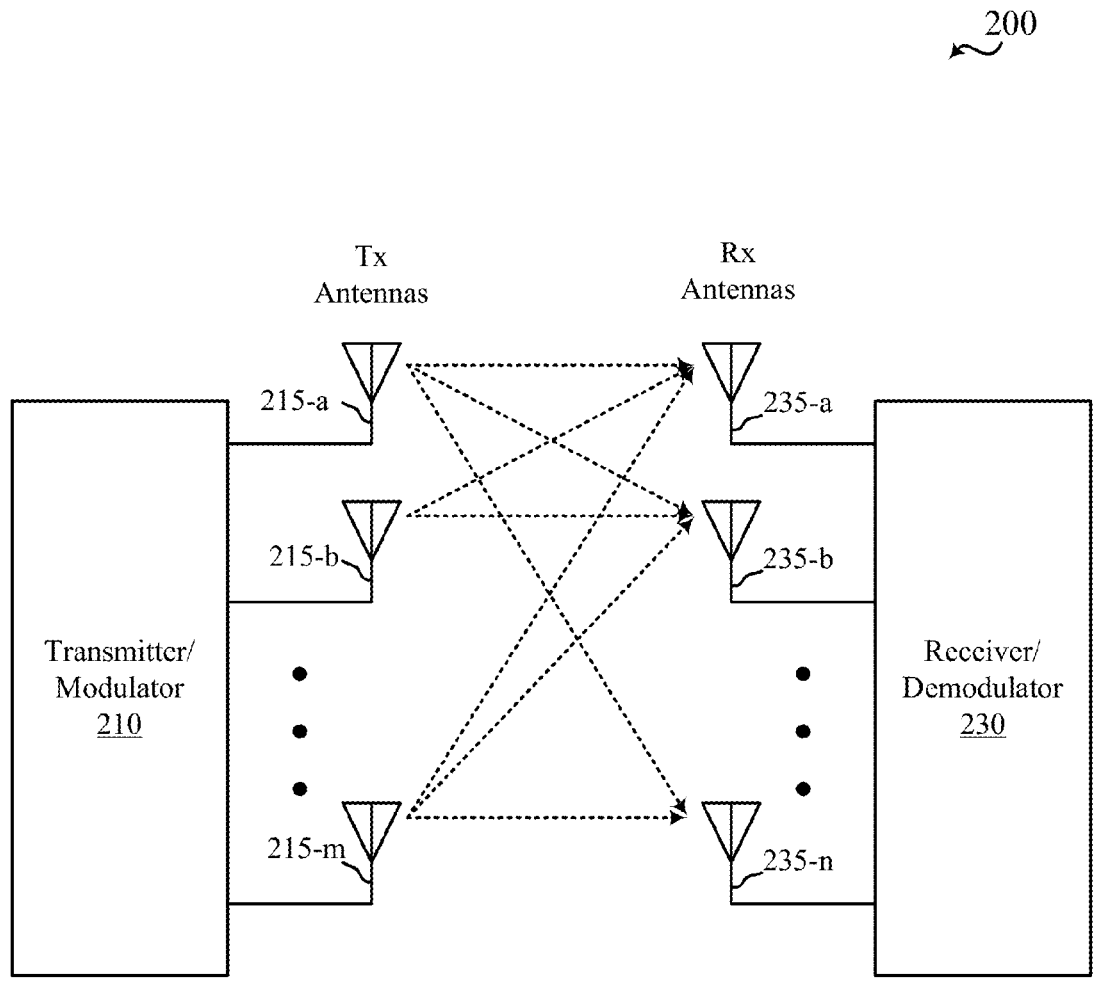
FIG. 2 shows a diagram of a system for employing antenna diversity techniques in accordance with various examples.

FIG. 2 is a diagram of a system 200 for employing antenna diversity techniques. System 200 includes a transmitter/modulator 210 and a receiver/demodulator 230. In examples, transmitter/modulator 210 illustrates aspects of one of the base stations or eNBs 105 while the receiver/demodulator 230 illustrates aspects of the mobile devices or UEs 115 as described above with reference to FIG. 1. In other examples, however, the transmitter/modulator 210 may be part of a device or UE 115 and the receiver/demodulator 230 may be part of a base station or eNodeB 105.

The transmitter/modulator 210 may have M transmit antennas 215. The receiver/demodulator 230 may have N receive antennas 235. System 200 may be used to employ diversity techniques such as transmit diversity, where multiple antennas (or antenna ports) transmit versions of a signal (e.g., delayed, coded, etc.) which maybe equalized at the receiver to provide diversity gain. Receiver/demodulator 230 may also employ receive diversity, where signals from multiple antennas are combined to provide diversity gain.

System 200 may employ MIMO techniques to increase diversity gain, array gain (e.g., beamforming, etc.), and/or spatial multiplexing gain.

Figure 3:
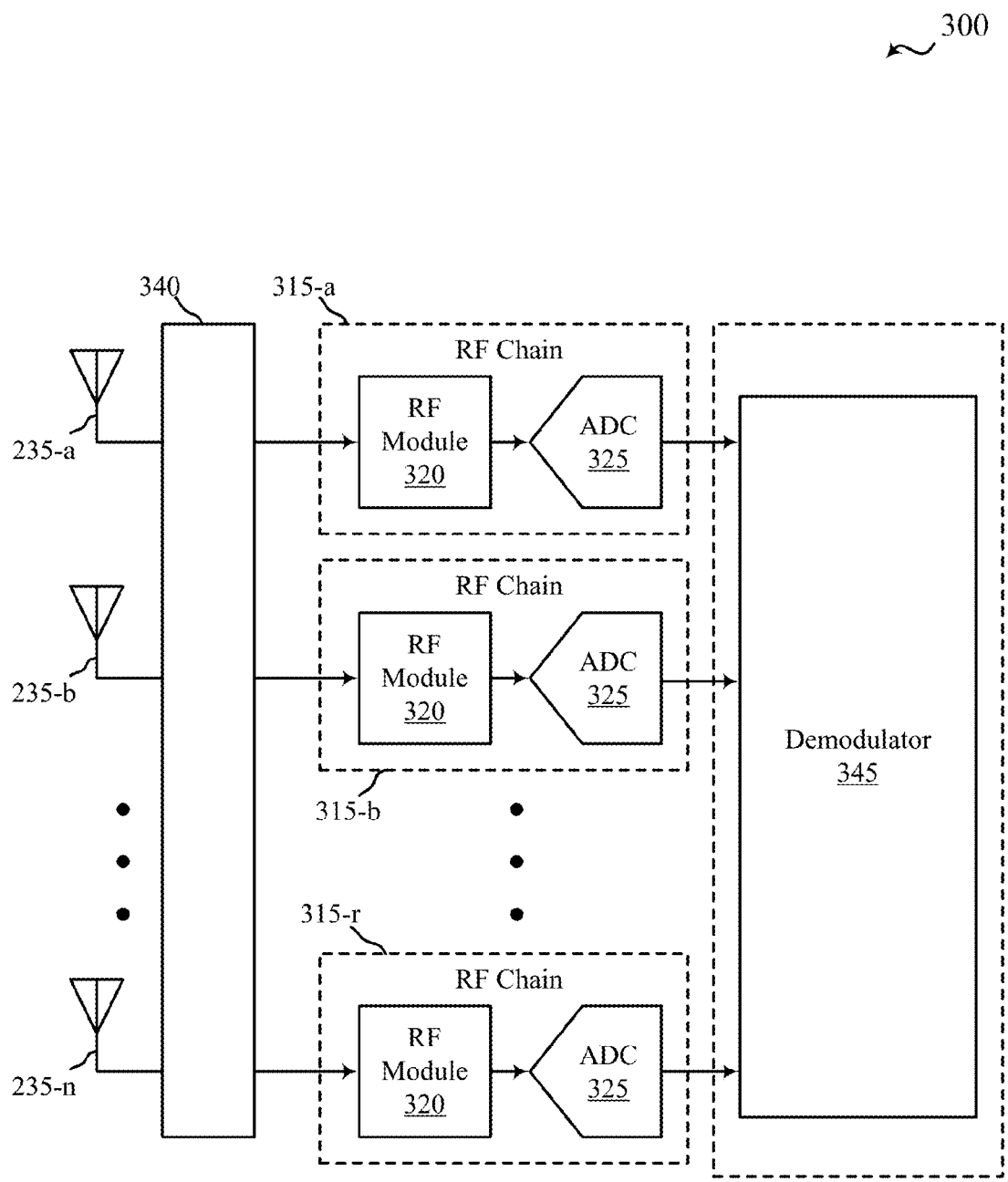
FIG. 3 shows a diagram of a multiple antenna receiver in accordance with various examples.

FIG. 3 is a diagram of a multiple antenna receiver 300. The receiver 300 may be an example of the receiver/demodulator 230 of FIG. 2. The receiver 300 may include N receive antennas 235. The receiver 300 may include R radio frequency (RF) chains 315, where R is generally less than or equal to N. Each RF chain 315 may include an RF module 320 and an analog-to-digital converter (ADC) 325. Receiver 300 may include switch matrix 340 for connecting antennas 235 and RF chains 315. In examples, switch matrix 340 can connect each of the R receive chains 315 to any of the antennas 235. In some examples, R may equal N and switch matrix 340 may be omitted. In this case, each antenna 235 may be directly coupled with an RF chain 315. As used herein, "antenna" may refer to an antenna 235 or an antenna 235 and an associated RF chain 315, depending on context.

During operation, signals received by a receive antenna 235 are provided to an input of the switch matrix 340, which provides those signals to an input of an RF chain 315. At the RF chain, the signals are processed (e.g., amplified, downconverted, filtered, etc.) by the RF module 320 and digitized by the ADC 325. The output of the RF chain 315 is provided to the demodulator 345 for further processing. The demodulator 345 may combine signals received from multiple antennas using receive diversity techniques to increase the signal-to-noise ratio (SNR) or signal-to-interference plus noise ratio (SINR) of the received signals. The demodulator 345 may use a suitable signal combining technique such as equal gain combining, maximum ratio combining (MRC), and the like. The demodulator 345 and RF chains 315 may use interference cancellation techniques to further provide interference cancellation and/or suppression (e.g., interference rejection combining, successive interference cancellation, and the like).

Figure 4:
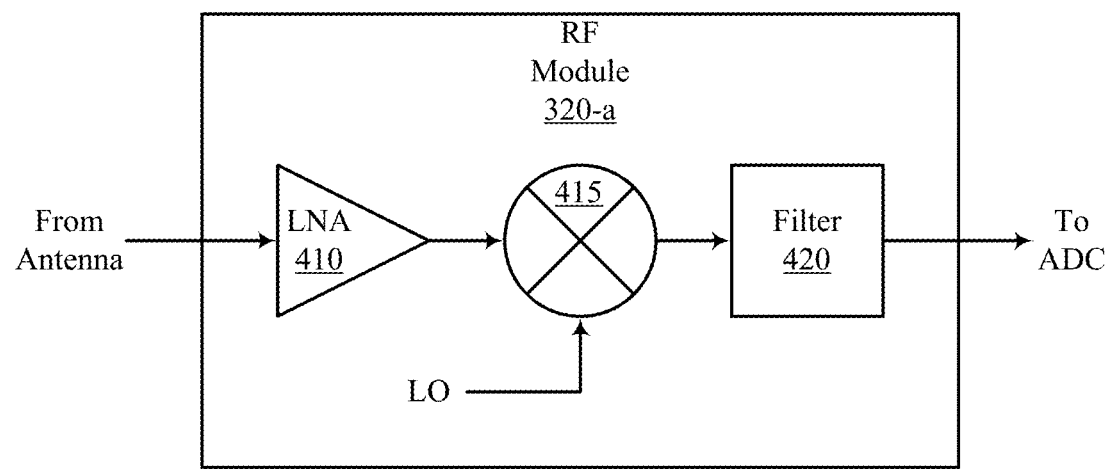
FIG. 4 shows an RF module that may be an example of the RF modules of FIG. 3.

FIG. 4 illustrates an RF module 320-$a$ that may be an example of the RF modules 320 of FIG. 3. In the example shown, the RF module 320-$a$ includes a low-noise amplifier (LNA) 410, a mixer 415, and a filter 420. Each of these components may be in communication, directly or indirectly.

The LNA 410 may amplify low-level signals received from an antenna through a switch (e.g., switch matrix 340). The mixer 415 may be used to downconvert the amplified signals from radio frequency to baseband based on the frequency of a local oscillator (LO) signal. The filter 420 may filter (e.g., bandpass filter) the downconverted signals and may provide the filtered signals to an ADC for digitization. In some examples, the RF module 320-$a$ may include additional components such as amplifiers, filters, and/or mixers. For example, the RF module 320-$a$ may include multiple mixers when the downconversion operation involves more than one stage and each of those mixers may be associated with a different LO signal. The RF module 320-$a$ may also include components for interference cancellation or suppression.

Referring back to FIG. 3, receiver 300 may utilize receive diversity techniques to combine signals concurrently received at multiple antennas 235 to increase SNR of a given received transmission. However, different antennas of the receiver 300 may experience different channel conditions or multipath propagation. Receiver 300 may perform antenna selection to select a subset of antennas 235 for receiving downlink transmissions.

In some examples, receiver 300 may have N antennas 235 and may use a predetermined number of antennas 235 for receiving a transmission. The receiver may have fewer RF chains 315 than antennas 235 (e.g., the receiver 300 may have N antennas 235 and R RF chains 315, where R<N). In other examples, the receiver may use a subset of the antennas 235 for receiving a transmission to reduce power consumption. Thus, antenna selection (AS) may be performed to a subset of R antennas 235 of the N antennas having the highest SNR for receiving particular transmissions. For example, receiver 300 may have four antennas 235 ($a_1$-$a_4$) and may use two antennas for receiving one or more transmissions. Antenna selection for the one or more transmissions may be performed to select a subset k having two receive antennas from the set K=({$a_1$, $a_2$}, {$a_1$, $a_3$}, {$a_1$, $a_4$}, {$a_2$, $a_3$}, {$a_2$, $a_4$}, {$a_3$, $a_4$}) for receiving downlink transmissions. These techniques for antenna selection may be known as R-out-of-N antenna selection.

In other examples, antenna selection may be performed to select a subset of antennas 235 and RF chains 315 to optimize the capacity of a selected antenna subset with respect to the receiver power consumption. For example, receiver 300 may have four antennas 235 ($a_1$-$a_4$), where each antenna 235 has an associated RF chain 315. The receiver 300 may select a subset k of antennas 235 having at least two antennas 235 from the set K=({$a_1$, $a_2$}, {$a_1$, $a_3$}, {$a_1$, $a_4$}, {$a_2$, $a_3$}, {$a_2$, $a_4$}, {$a_3$, $a_4$}, {$a_1$, $a_2$, $a_3$}, {$a_1$, $a_2$, $a_4$}, {$a_1$, $a_3$, $a_4$}, {$a_2$, $a_3$, $a_4$}, {$a_1$, $a_2$, $a_3$, $a_4$}). The receiver 300 may select the subset k having the highest capacity to power ratio (C/P), the subset k having the highest capacity of antenna subsets having a capacity to power ratio within a tolerance of a maximum capacity to power ratio, or the subset k having a highest capacity or highest capacity to power ratio of those subsets satisfying a minimum latency constraint. These techniques for antenna selection may be known as capacity-power antenna selection.

Generally, the antenna selection process may be performed dynamically, semi-statically, or when parameter inputs to functions used in antenna selection change. For example, antenna selection may be performed on a timescale of several frames (e.g., several tens of milliseconds) for transmissions to be received during subsequent frames and may be updated based on changes to transmission parameters, channel state information, etc. To evaluate antenna subsets, the UE can switch antenna subsets to receive a downlink subframe using a particular antenna subset and receive and demodulate the reference signals from the transmitter in the subframe. The UE can calculate a channel estimate and/or interference estimate for measured antenna subsets and select the best antenna subset based on the channel estimates and/or interference estimates. However, switching antenna subsets for subframes where data is received may impact demodulation of the received data. In addition, the UE may not know prior to the start of a subframe if data will be scheduled for the UE in that subframe. Thus, switching antenna subsets for measurements may result in overhead on the channel due to impacts of measurement on demodulation of data received during measurement subframes.

Based on the channel measurements performed for measured antenna subsets, the receiver may select an antenna subset (e.g., the antenna subset providing the highest capacity) for use in receiving transmissions. The receiver may report a quantized capacity (e.g., channel quality information (CQI), etc.) based on the selected antenna subset. For example, the receiver 300 may determine an antenna subset for downlink transmissions and may report CQI to a serving eNB 105 based on the calculated receiver SNR using the selected antenna subset.

Generally, movement of the receiver, changes in orientation of the receiver, and changes in local environment (e.g., a user's grip on a mobile device, etc.) may affect channel conditions for each antenna of the mobile device differently. Capacity gain for performing antenna selection may depend on how frequently channel conditions change. For example, benefits provided by antenna selection may be related to the speed of the receiver. In a static position or at low speed, the channel conditions experienced by the receiver may vary slowly (e.g., hundreds of milliseconds, seconds, minutes, etc.). If the receiver begins to move faster, the multipath propagation from the transmitter to the receiver may change more rapidly. Performing antenna selection as speed increases may continue to provide benefits. However, as the speed of the receiver increases even more, (which may be considered high Doppler conditions, etc.), channel conditions for the antennas may change more rapidly than when the receiver is positioned statically or under low Doppler conditions. Thus, the best antennas or antenna and receiver combinations at a given time may not continue to be the best selection throughout a selection period. Continuing to do antenna selection at increased speed of the receiver may incur additional measurement and processing overhead without significant advantage, or may even result in negative effects over not performing antenna selection.

The receiver 300, used for example in UEs 115 of the systems 100 and/or 200, may be configured for controlling antenna selection by dynamically adjusting and/or enabling/disabling an antenna selection period based on an antenna selection performance metric. In some examples, the receiver 300 may be configured for enabling and disabling antenna selection using an outer loop. Antenna enabling and disabling may be performed in an outer loop based on estimates of UE speed. The UE speed may be estimated based on observations of Doppler effects to the received signals. During a Doppler estimation window, antenna selection may be disabled or an anchor antenna may be used for Doppler estimation while antenna selection may continue selection of one or more other antennas. The UE speed estimates may also be used to select or adjust the period used for antenna selection.

In some examples, enabling and disabling of antenna selection is performed based on a change rate of selected antenna subsets according to the antenna selection performance metric. An outer loop may be performed that periodically checks the antenna selection change rate based on the antenna selection performance metric while antenna selection is disabled. When the antenna selection change rate falls below a high change rate threshold, antenna selection may be enabled and the antenna selection period may be varied according to an inner loop. If the change rate is below a low threshold, the antenna selection period may be increased until a maximum antenna selection period is reached. If the change rate is above a high threshold, the antenna selection period may be decreased until a minimum antenna selection period is reached. If the change rate stays above the high threshold at the minimum antenna selection period, antenna selection may be disabled and the outer loop may be resumed to evaluate the change rate while antenna selection is disabled.

Figure 5:
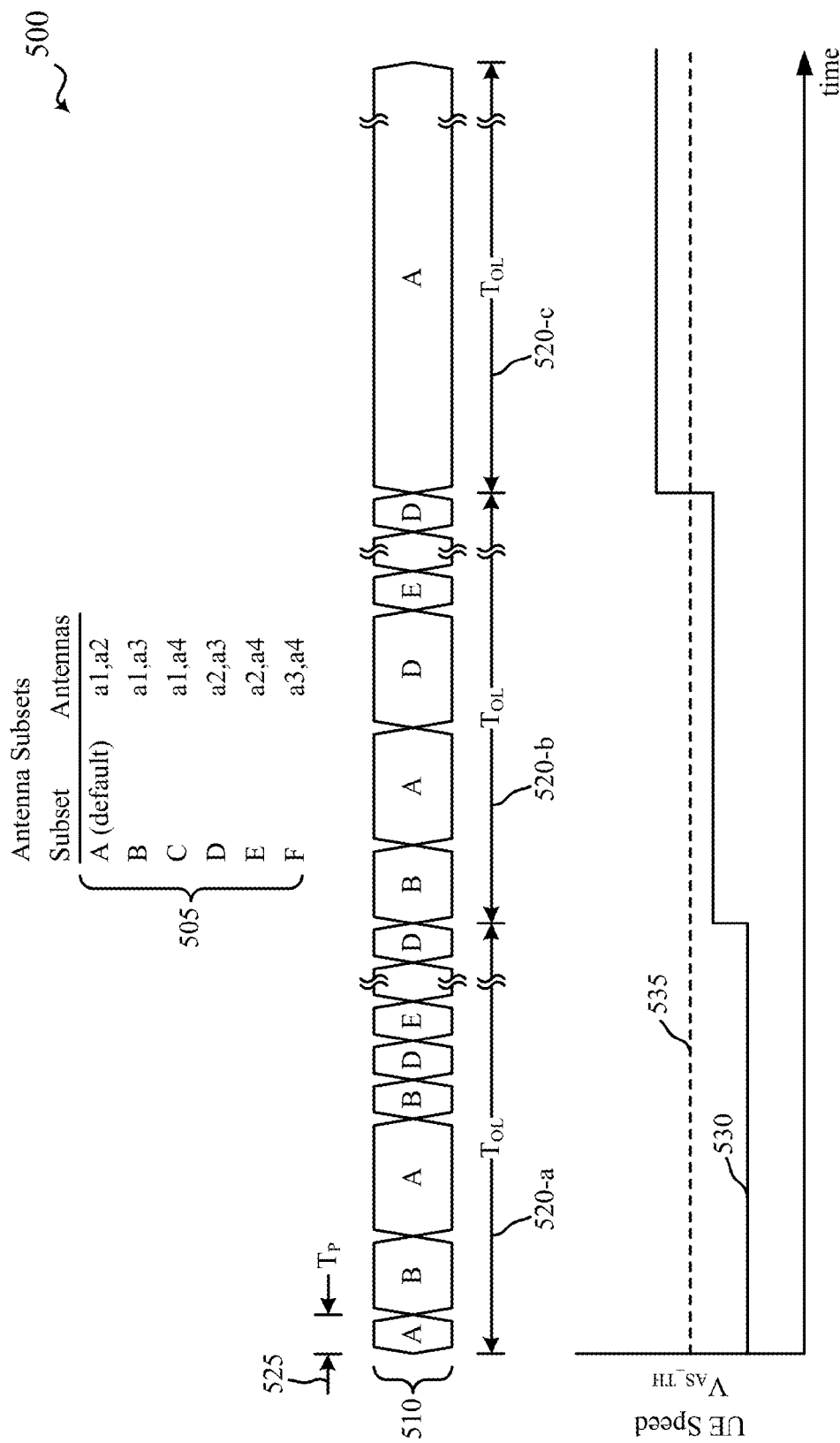
FIG. 5 shows a timing diagram illustrating enabling and disabling antenna selection using estimates of UE speed according to various examples.

FIG. 5 is a timing diagram 500 illustrating enabling and disabling antenna selection using estimates of UE speed according to various examples. The UE may employ various techniques for estimating speed. For example, the receiver may estimate the UE speed based on the received transmissions from the transmitter (e.g., eNB 105, etc.). Additionally or alternatively, the UE may obtain location and speed information by receiving global positioning system (GPS) signals or employing sensors (e.g., accelerometers, gyroscopes, etc.). For many techniques used in speed estimation, filtering of location, acceleration, or speed data may be used to reduce noise in estimated UE speed. The filtering may employ a variety of techniques (e.g., moving average, infinite impulse response (IIR), finite impulse response (FIR), etc.).

In the example illustrated in FIG. 5, the receiver has four antennas ($a_1$-$a_4$) and antenna selection 510 is used to select a subset A-F of two antennas from the set of subsets 505 for receiving downlink transmissions. Antenna selection may be performed according to an antenna selection period $T_P$ 525. In each antenna selection period 525 (e.g., at the beginning of the antenna selection period 525, etc.), a measurement set of antenna subsets may be measured over a set of subframes (e.g., measuring each subset of the measurement set in one subframe and different subsets in successive subframes, etc.). In some examples, antenna selection may be performed by measuring each antenna subset A-F of the available antenna subsets 505 (e.g., including the current antenna subset). In other examples, the set of measured antenna subsets may include fewer than all the antenna subsets in the available antenna subsets 505. For example, the receiver may use partitioned or disjoint antenna subsets and may calculate channel conditions for other antenna subsets using the measurements for the disjoint antenna subsets. However, measuring a subset of the available antenna subsets (e.g., partitioned or disjoint subsets, etc.) may reduce the accuracy of channel estimates and/or interference estimates derived from the measurements.

In some instances, generating a speed estimate may take longer than the antenna selection period $T_P$ 525. For example, the antenna selection period $T_P$ 525 may be approximately 40 ms while generating a filtered speed estimate may take greater than 40 ms. In addition, estimating UE speed may consume a substantial amount of processing resources and power. Thus, the UE may employ an outer loop for enabling or disabling antenna selection based on UE speed estimation according to an outer-loop period $T_{OL}$ 520 that is longer than the antenna selection period $T_P$ 525. The UE may generate a speed estimate once for each $T_{OL}$ 520 and the UE may enable or disable antenna selection for the outer-loop period $T_{OL}$ 520 based on the speed estimate.

A UE speed threshold $V_{AS\_TH}$ 535 may be defined for enabling and disabling antenna selection. Antenna selection may be enabled when UE speed 530 is below the UE speed threshold $V_{AS\_TH}$ 535 and disabled when UE speed 530 is above the UE speed threshold $V_{AS\_TH}$ 535. For a first outer-loop period $T_{OL}$ 520-a, the UE speed 530 may be less than the UE speed threshold $V_{AS\_TH}$ 535 and antenna selection may be enabled. During a second outer-loop period $T_{OL}$ 520-b, the UE speed remains below the UE speed threshold $V_{AS\_TH}$ 535 and antenna selection remains enabled. During a third outer-loop period $T_{OL}$ 520-c, the UE speed has increased above the UE speed threshold $V_{AS\_TH}$ 535 and antenna selection is disabled for the third outer-loop period $T_{OL}$ 520-c. In some examples, the UE speed threshold $V_{AS\_TH}$ 535 may be approximately 10-15 km/hr.

In one example, UE speed is estimated based on signals received from the transmitter (e.g., transmitter/modulator 210, eNB 105, etc). The receiver may perform Doppler estimation of reference signals (RS) in the received signals. The reference signals used for UE speed estimation may be, for example, common reference signals (CRS) or demodulation reference signals (DM-RS) and may be cell or UE specific. The transmitter may transmit reference signals at a predetermined time interval ($T_S$), which may be 250 microseconds (us), in some examples.

Additionally or alternatively, the antenna selection period $T_P$ may be varied based on UE speed. For example, the antenna selection period $T_P$ may be decreased as UE speed increases to reduce the effects of changes in multipath propagation to performance of antenna selection. The antenna selection period $T_P$ may be varied in relation (e.g., inverse proportion, etc.) to UE speed, or may be determined according to a look-up-table indexed by UE speed.

Figure 6:
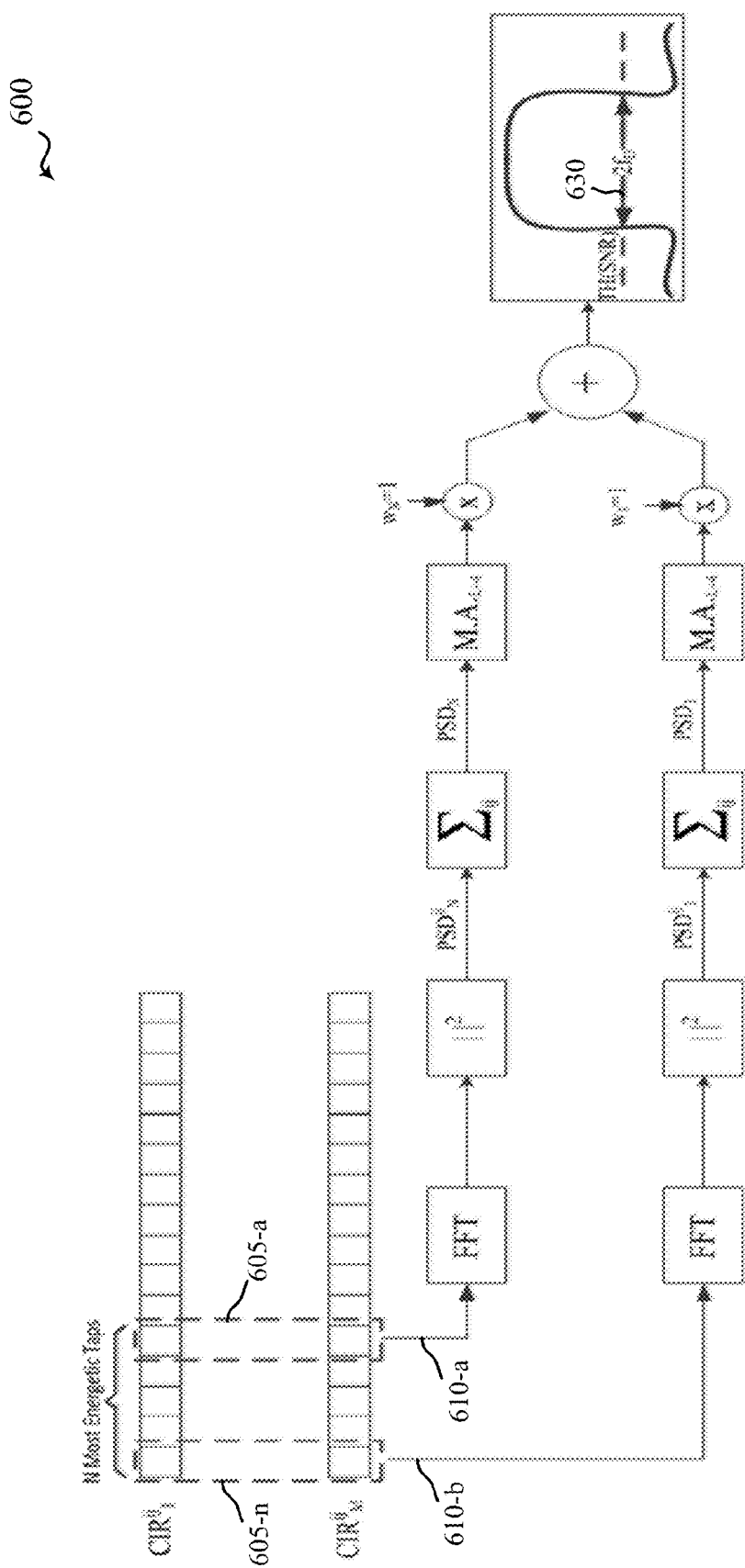
FIG. 6 shows a block diagram of a system for Doppler estimation of received reference signals in accordance with various examples.

FIG. 6 shows a block diagram of a system 600 for Doppler estimation of received reference signals in accordance with various examples. The system 600 may illustrate aspects of the UEs 115 of FIG. 1, the receiver/demodulator 230 of FIG. 2, or the receiver 300 of FIG. 3. The system 600 may make one channel impulse response (CIR) estimate 610 for each of N taps 605 for each antenna pair ij. To estimate the spectrum spread (e.g., power spectral density (PSD)), the system 600 may use an observation window of a number M of CIR estimates. For example, the system 600 may use an observation window M={256, 512, 1024} CIR estimates to estimate the spectrum spread 630. Thus, the Doppler observation window may result in one Doppler estimate every $T=M \cdot T_S=\{64, 128, 256\}$ ms, where the Doppler frequency resolution is given by:

$$\Delta_f = \frac{1}{M \cdot T_S} \quad \text{Eq. 1}$$

The system 600 may use a moving average (MA) filter (e.g., length=4, etc.) and may employ a variable threshold for estimating the spectrum spread based on the SNR.

In examples, a set of thresholds is defined based on estimates of UE speed for enabling and disabling antenna selection. For example, a UE speed of less than 10 km/hr may be defined as low-speed where antenna selection generally provides benefits in receiving downlink transmissions. A UE speed of greater than 15 km/hr may be defined as high-speed where the benefits of antenna selection are generally reduced due to fast changes in multipath propagation. These limits are merely examples and other speed thresholds may be selected.

Based on the UE speed thresholds, sets of Doppler frequency thresholds may be determined. The Doppler frequency thresholds may be defined according to estimated frequency ranges at the UE speed thresholds. For example, the Doppler frequency thresholds may be defined by a percentile range of Doppler estimates for SNR ranges (e.g., 70 percentile, maximum, etc.).

In examples, an initial Doppler frequency threshold $T_{fDE}$ is determined for enabling or disabling antenna selection. Subsequently, a low-speed threshold $T_{fDL}$ may be defined for enabling antenna selection when it is currently disabled and a high-speed threshold $T_{fDH}$ may be defined for disabling antenna selection when it is currently enabled. The thresholds may be defined according to mean, maximum, or a percentile of estimated Doppler frequency for a given observation length. The thresholds may be defined according to SNR ranges of the received signals. For example, threshold sets may be defined for SNR ranges of $\{-\infty, -5; -5, +5; +5, +\infty\}$.

Based on the Doppler frequency thresholds, probabilities of false alarm (e.g., enabling antenna selection at the high-speed) and misdetection (e.g., disabling antenna selection at the low-speed) may be determined. For example, the probability of false alarm $P_{FA}(SNR)$ for a given threshold T may be given by:

$$P_{FA}(SNR)=P\{fD_{est(SNR)}<T|v=15 \text{ km/hr}\} \quad \text{Eq. 2}$$

The probability of misdetection $P_{MD}(SNR)$ may be given by:

$$P_{MD}(SNR)=P\{fD_{est(SNR)}>T|v=10 \text{ km/hr}\} \quad \text{Eq. 3}$$

To reduce the probabilities of false alarm and misdetection, the Doppler frequency thresholds may use longer observation windows and/or maximum estimated Doppler frequency thresholds. For example, an observation window of 1024 observations (e.g., 256 ms at $T_S=250$ us, etc.) may provide substantially lower probability of false alarm. Using the maximum estimated Doppler frequency for the low-speed threshold may reduce the probability of misdetection substantially. For example, the probability of misdetection may be reduced from approximately 4-5% at an SNR Between −5 dB and +4 dB to approximately 1% or less by using the maximum estimated Doppler frequency instead of a threshold based on 70% of the estimated Doppler frequency values.

Figure 7:
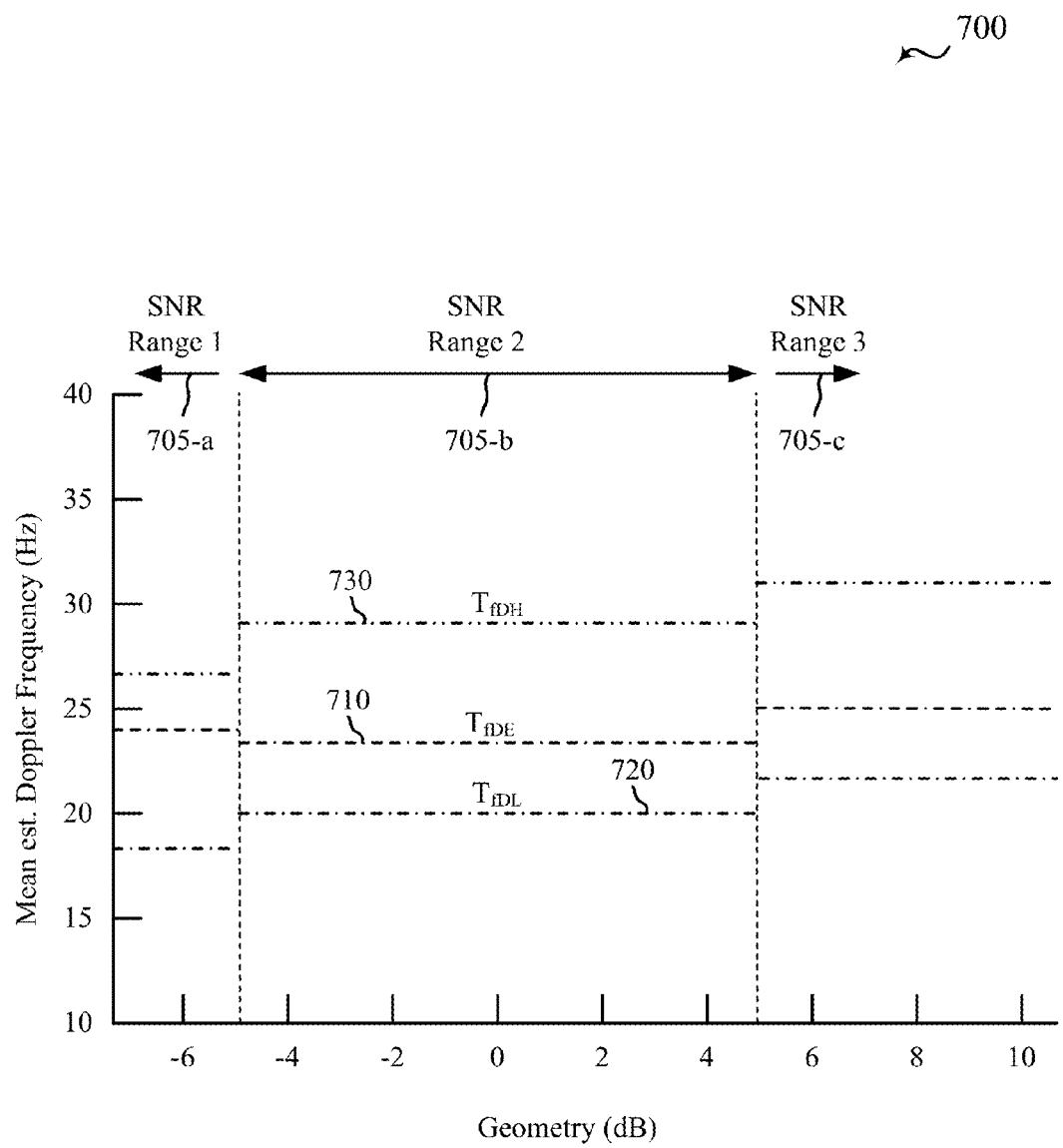
FIG. 7 shows a diagram illustrating example thresholds for enabling and disabling antenna selection based on UE speed in accordance with various examples.

FIG. 7 is a diagram 700 illustrating example thresholds for enabling and disabling antenna selection based on UE speed in accordance with various examples. In the example illustrated in FIG. 7, it may be determined that antenna selection provides benefits below a UE speed of approximately 10 km/hr. In diagram 700, three SNR ranges 705 are defined as SNR Range 1 705-*a* of $\{-\infty, -5\}$, SNR Range 2 705-*b* of $\{-5, +5\}$, and SNR Range 3 of $\{+5, +\infty\}$. The initial threshold $T_{fDE}$ 710 may be determined by the maximum of estimated Doppler frequency of a UE speed of 10 km/hr for the SNR ranges 705. The low-speed threshold $T_{fDL}$ 720 may be defined as the mean estimated Doppler frequency of a UE speed of 10 km/hr for the SNR ranges 705. The high-speed threshold $T_{fDH}$ 730 may be defined as the mean estimated Doppler frequency of a UE speed of 15 km/hr for the SNR ranges 705.

Figure 8:
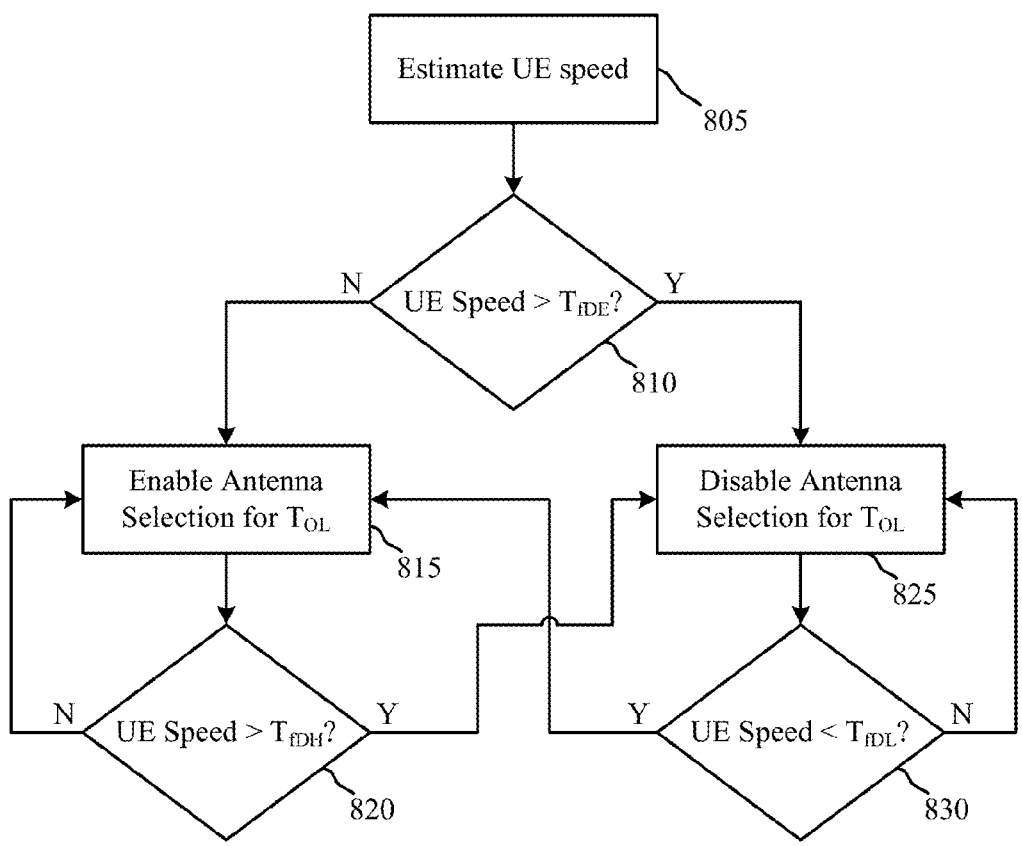
FIG. 8 shows a flow diagram of an example method for enabling and disabling antenna selection using estimates of UE speed according to various examples.

FIG. 8 illustrates a flow diagram of an example method 800 for enabling and disabling antenna selection using estimates of UE speed according to various examples. The method 800 may be performed using, for example, the UEs 115 of FIG. 1, the receiver/demodulator 230 of FIG. 2, and/or the receiver 300 of FIG. 3. The method 800 may be employed using the initial threshold $T_{fDE}$ 710, low-speed threshold $T_{fDL}$ 720, and high-speed threshold $T_{fDH}$ 730 of FIG. 7.

At block 805, the receiver may estimate UE speed. For example, the receiver may estimate UE speed based on an observation window M of CIR estimates of reference signals in downlink transmission from a transmitter (e.g., eNB 105). At block 810, the UE may compare the speed estimate to an initial enablement threshold $T_{fDE}$.

If, at block 810, the UE speed is less than the initial enablement threshold $T_{fDL}$, the receiver may enable antenna selection for an outer-loop time period $T_{OL}$ at block 815. The UE may determine a new estimate of UE speed at the end of the outer-loop time period $T_{OL}$ and may compare the new estimate to the high-speed threshold $T_{fDH}$ at block 820. If, at block 820, the UE speed estimate is less than the high-speed threshold $T_{fDH}$, antenna selection may remain enabled for the next $T_{OL}$ at block 815. If the UE speed estimate is greater than the high-speed threshold $T_{fDH}$, antenna selection may be disabled for the next $T_{OL}$ at block 825.

If, at block 810, the UE speed is greater than the initial enablement threshold $T_{fDE}$, the receiver may disable antenna selection for the next outer-loop time period $T_{OL}$ at block 825. The UE may determine a new estimate of UE speed at the end of the outer-loop time period $T_{OL}$ and may compare the new estimate to the low-speed threshold $T_{fDL}$ at block 830. If, at block 830, the UE speed estimate is greater than the low-speed threshold $T_{fDL}$, antenna selection may remain disabled for the next $T_{OL}$ at block 825. If, at block 830, the UE speed estimate is less than the low-speed threshold $T_{fDL}$, antenna selection may be enabled for the next $T_{OL}$ at block 815.

As described above, the Doppler observation window may be longer than the antenna selection period $T_P$. For example, the antenna selection period $T_P$ may be on the order of 40 ms while Doppler observation may take approximately 256 ms to reduce the probability of false alarms and misdetection. However, CIR estimates taken during the Doppler observation window from different antennas may cause Doppler frequency estimation error. Thus, using Doppler frequency estimation to estimate UE speed for enabling and disabling antenna selection may provide challenges because the Doppler observation window may be greater than the antenna selection period $T_P$.

In examples, Doppler estimation may be performed once each outer-loop period $T_{OL}$ during a Doppler estimation period. The outer-loop period $T_{OL}$ may be substantially longer than the Doppler estimation period. In examples, antenna selection is disabled during the Doppler estimation period. In other examples, an anchor antenna is used for Doppler estimation during Doppler estimation periods while antenna selection is performed among the remaining antennas.

Figure 9A:
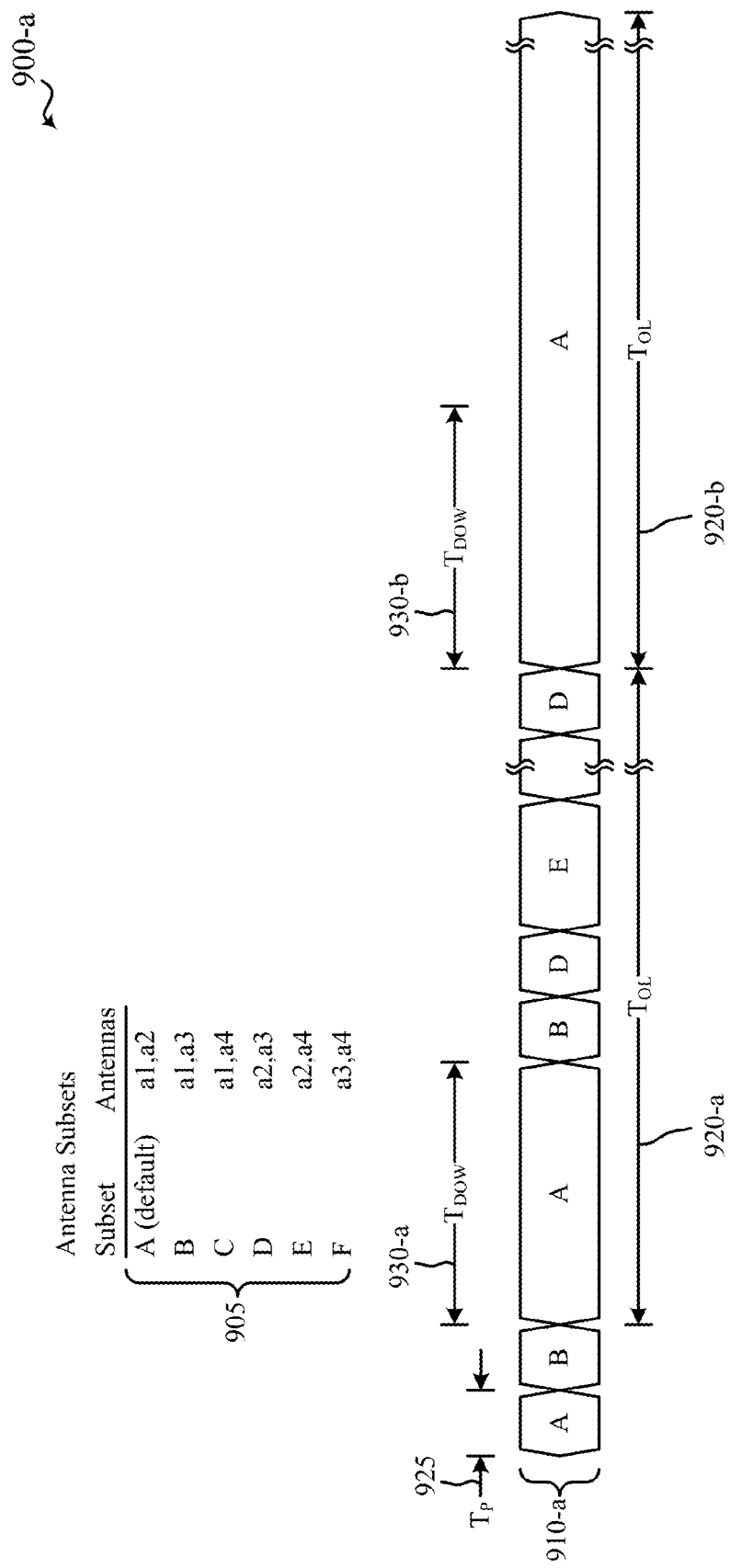
FIG. 9A shows a timing diagram illustrating enabling and disabling antenna selection using estimates of UE speed with antenna selection disabling during Doppler estimation periods according to various examples.

FIG. 9A is a timing diagram 900-a illustrating enabling and disabling antenna selection using estimates of UE speed with antenna selection disabling during Doppler estimation periods according to various examples. In the example illustrated in FIG. 9A, the receiver has four antennas ($a_1$-$a_4$) and antenna selection 910-a is used to select a subset A-F of two antennas from the set of subsets 905 for receiving downlink transmissions. Antenna selection 910-a may be performed according to an antenna selection period $T_P$ 925. While FIG. 9A illustrates antenna selection disabling during Doppler estimation periods for R-out-of-N antenna selection, antenna selection disabling may be applied to capacity-power antenna selection or a combination of these techniques.

As illustrated in FIG. 9A, the receiver may estimate UE speed during a Doppler observation window $T_{DOW}$ 930 during each outer-loop time period $T_{OL}$ 920. When antenna selection is disabled, the receiver may use a default antenna subset (e.g., subset A). When antenna selection is enabled, the receiver may perform antenna selection according to an inner-loop antenna selection period $T_P$ 925.

During a first outer-loop time period $T_{OL}$ 920-a, the receiver may perform Doppler observation during Doppler observation window $T_{DOW}$ 930-a. During the Doppler observation window $T_{DOW}$ 930-a, the receiver may disable antenna selection and may select the same antenna subset for receiving downlink transmissions during the Doppler observation window $T_{DOW}$ 930-a. For example, the receiver may select a default antenna subset (e.g., subset A) or may maintain the currently selected subset for the Doppler observation window $T_{DOW}$ 930-a. The receiver may determine the UE speed is less than a threshold for enabling antenna selection and the receiver may enable antenna selection for the outer-loop period $T_{OL}$ 920-a.

During a second outer-loop time period $T_{OL}$ 920-b, the receiver may perform Doppler observation during Doppler observation window $T_{OL}$ 930-b. During the Doppler observation window $T_{OL}$ 930-b, the receiver may disable antenna selection and may select the same antenna subset for receiving downlink transmissions during the Doppler observation window $T_{DOW}$ 930-b. The receiver may determine the UE speed is greater than a threshold for disabling antenna selection and the receiver may disable antenna selection for the outer-loop period $T_{OL}$ 920-b. For example, the receiver may select the default antenna subset for the outer-loop period $T_{OL}$ 920-b.

Figure 9B:
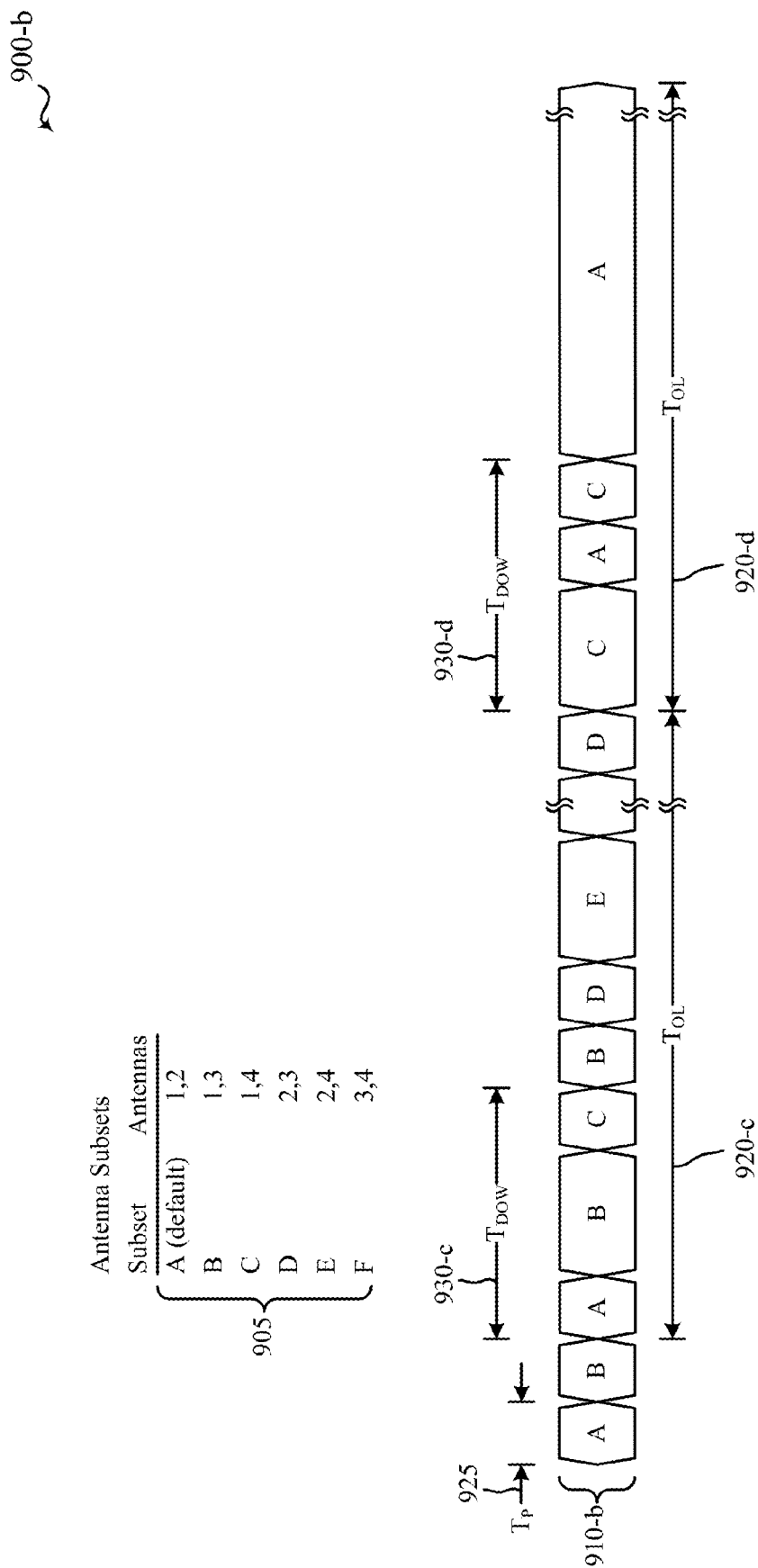
FIG. 9B shows a timing diagram illustrating enabling and disabling antenna selection using estimates of UE speed with anchor antenna based antenna selection during Doppler estimation periods according to various examples.

FIG. 9B is a timing diagram 900-b illustrating enabling and disabling antenna selection using estimates of UE speed with anchor antenna based antenna selection during Doppler estimation periods according to various examples. In the example illustrated in FIG. 9B, the receiver has four antennas ($a_1$-$a_4$) and antenna selection 910-b is used to select a subset A-F of two antennas from the set of subsets 905 for receiving downlink transmissions. Antenna selection 910-b may be performed according to an antenna selection period $T_P$ 925. While FIG. 9B illustrates anchor antenna based antenna selection during Doppler estimation periods for R-out-of-N antenna selection, anchor antenna based antenna selection may be applied to capacity-power antenna selection or a combination of these techniques.

As illustrated in FIG. 9B, the receiver may estimate UE speed during a Doppler observation window $T_{DOW}$ 930 during each outer-loop time period $T_{OL}$ 920. When antenna selection is disabled, the receiver may use a default antenna subset (e.g., subset A). When antenna selection is enabled, the receiver may perform antenna selection according to an inner-loop period $T_P$ 925.

During a first outer-loop time period $T_{OL}$ 920-c, the receiver may perform Doppler observation during Doppler observation window $T_{DOW}$ 930-c. During the Doppler observation window $T_{DOW}$ 930-c, the receiver may select an anchor antenna for Doppler estimates and perform antenna selection from among the other antennas. For example, FIG. 9B illustrates that antenna $a_1$ is selected as the anchor antenna during Doppler observation window $T_{DOW}$ 930-c. For R-out-of-N antenna selection, subsets A, B, or C may be selected for receiving downlink transmissions during the Doppler observation window $T_{DOW}$ 930-c. The receiver may determine the UE speed is less than a threshold for enabling antenna selection and the receiver may enable antenna selection for the outer-loop period $T_{OL}$ 920-c.

During a second outer-loop time period $T_{OL}$ 920-d, the receiver may perform Doppler observation during Doppler observation window $T_{DOW}$ 930-d. During the Doppler observation window $T_{DOW}$ 930-c, the receiver may select an anchor antenna for Doppler estimates and perform antenna selection from among the other antennas. For example, FIG. 9B illustrates that antenna $a_1$ is selected as the anchor antenna during Doppler observation window $T_{DOW}$ 930-d. For R-out-of-N antenna selection, subsets A, B, or C may be selected for receiving downlink transmissions during the Doppler observation window $T_{DOW}$ 930-d. The receiver may determine the UE speed is greater than a threshold for disabling antenna selection and the receiver may disable antenna selection for the outer-loop period $T_{OL}$ 920-d. For example, the receiver may select the default antenna subset for the outer-loop period $T_{OL}$ 920-d.

In some examples, enabling and disabling of antenna selection may be based on the history of antenna selection decisions. For example, a change rate of antenna selection may be determined based on a history of antenna selection decisions. If the change rate is small, antenna selection may be occurring faster than the channel variation seen by the receiver. A small change rate may also indicate that antenna imbalance is producing a strong subset of antennas even under changing channel conditions. If the change rate is large, the channels may be varying fast and possibly faster than the antenna selection period.

Figure 10:
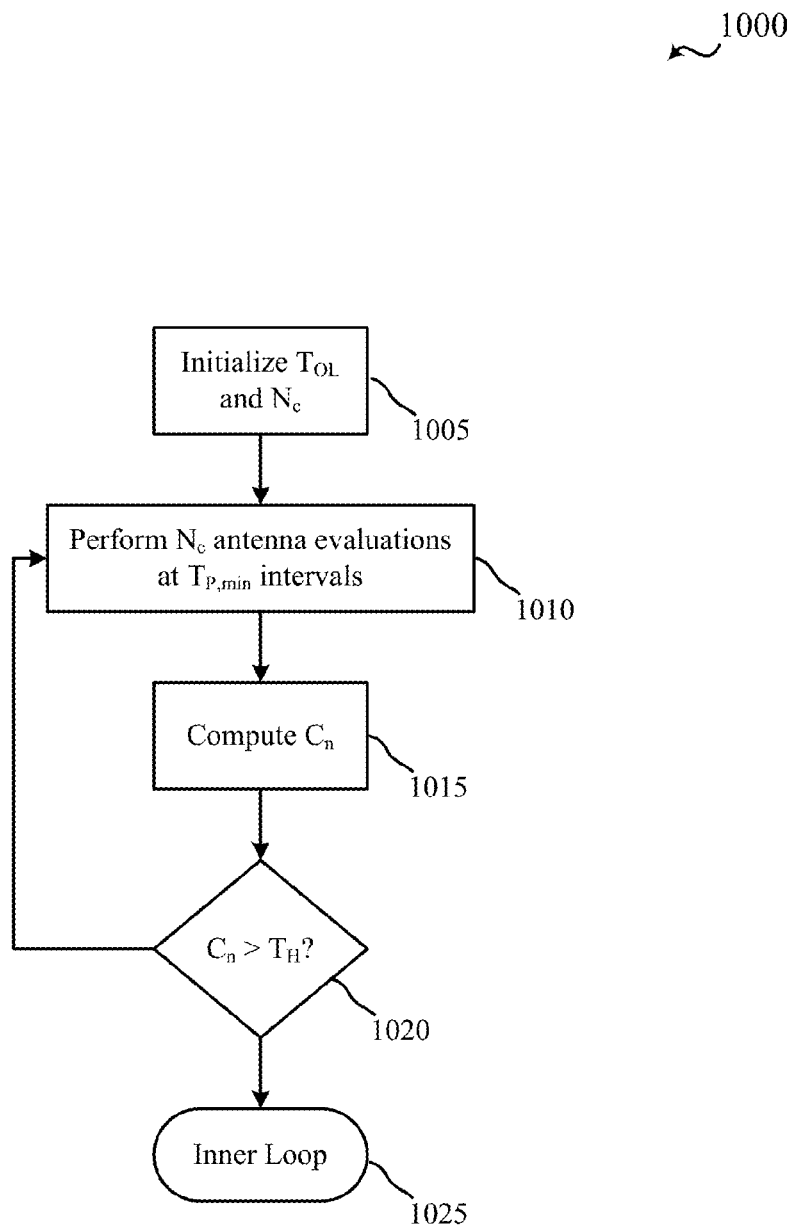
FIG. 10 shows a diagram of a method for enabling and disabling antenna selection using an outer-loop based on change rate of antenna selection in accordance with various examples.

FIG. 10 is a diagram of a method 1000 for enabling and disabling antenna selection using an outer-loop based on change rate of antenna selection in accordance with various examples. The method 1000 may be performed using, for example, the UEs 115 of FIG. 1, the receiver/demodulator 230 of FIG. 2, and/or the receiver 300 of FIG. 3.

At block 1005 of method 1000, the outer-loop period Tot and a number of antenna selections to be performed $N_c$ may be initialized. The outer-loop period $T_{OL}$ may be substantially longer than a minimum antenna selection period $T_{P,min}$.

At block 1010, $N_c$ evaluations of an antenna selection function used for antenna selection may be performed at intervals of the minimum antenna selection period $T_{P,min}$. In the outer-loop process of method 1000, the antenna selection function may be evaluated at block 1010, but antenna selection may not be performed. Thus, the subset of antennas selected by the antenna selection function is identified for each of the $N_c$ evaluations but the antennas used to receive transmissions when antenna selection evaluation is not being performed may be the default antenna subset.

At block 1015, the change rate $C_n$ is computed for the $N_c$ evaluations of block 1010. The change rate $C_n$ corresponds to the number of times the receiver determines that it needs to switch antenna subsets over a period of time or the $N_c$ evaluations. The change rate G may be computed as a block average of the rate of change of antenna selection decisions for the $N_c$ evaluations. The change rate $C_n$ may be given by:

$$C_n = \frac{1}{N_c - 1} \sum_{k=2}^{N_c} 1_{\{A_k \neq A_{k-1}\}} \qquad \text{Eq. 4}$$

Alternatively, the change rate $C_n$ may be computed by filtering (e.g., IIR, FIR, etc.) or some other suitable change rate calculation.

If the change rate is greater than a high change rate threshold $T_H$ at block 1020, then the process may proceed to block 1010 at the next outer-loop period $T_{OL}$. If the change rate is less than a high change rate threshold $T_H$ at block 1020, then the receiver may switch from the outer-loop process of method 1000 to an inner-loop process for performing antenna selection at block 1025.

Figure 11:
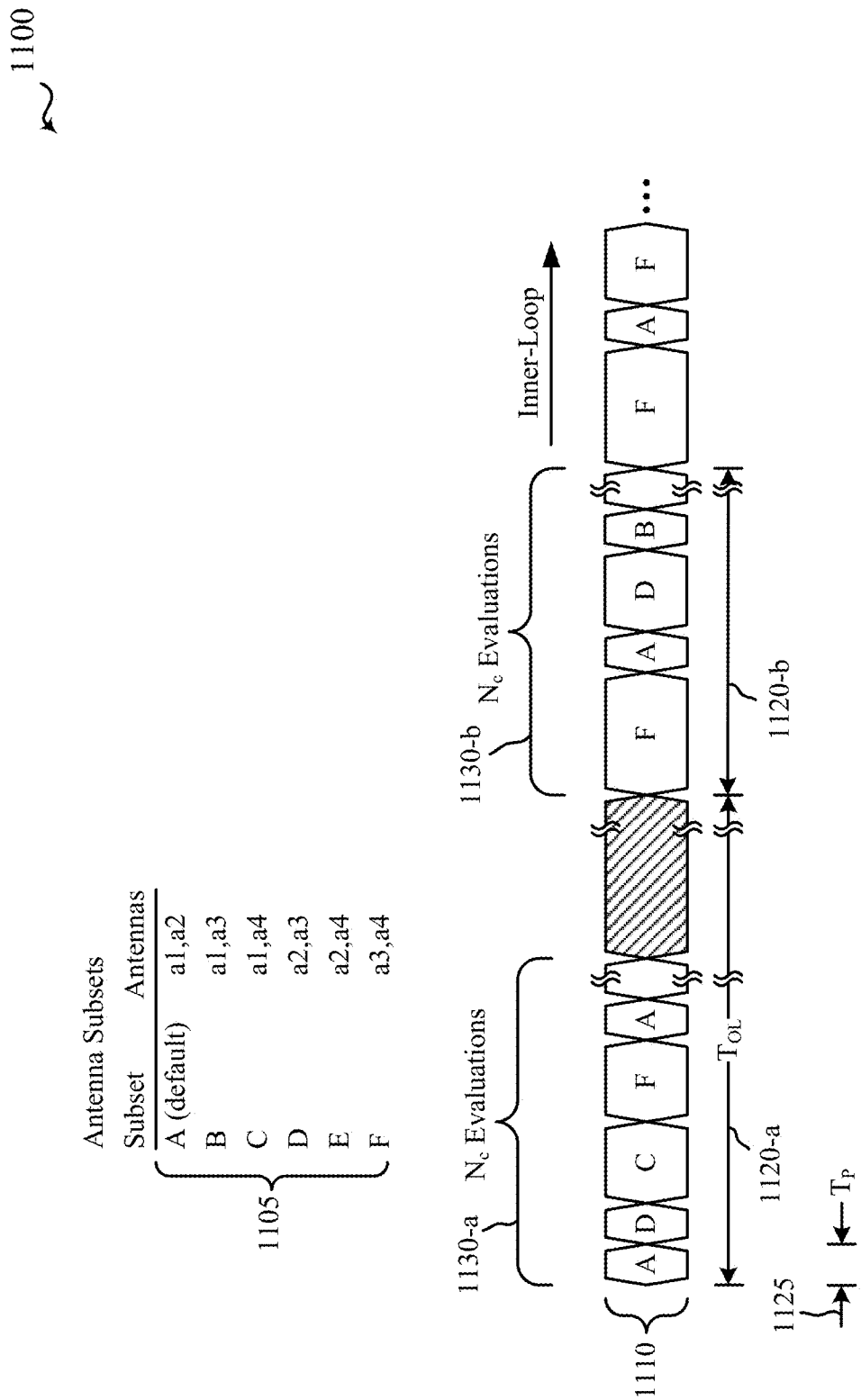
FIG. 11 shows a timing diagram of outer-loop enabling and disabling of antenna selection based on change rate of antenna selection in accordance with various examples.

FIG. 11 is a timing diagram 1100 of outer-loop enabling and disabling of antenna selection based on change rate of antenna selection in accordance with various examples. In the example of FIG. 11, the receiver has four antennas ($a_1$-$a_4$) and antenna selection is used to select a subset A-F of two antennas from the set of subsets 1105 for receiving downlink transmissions. Thus, FIG. 11 illustrates outer-loop enabling and disabling of antenna selection based on change rate of antenna selection for R-out-of-N antenna selection. However, these techniques may be applied to capacity-power antenna selection or a combination of R-out-of-N antenna selection and capacity-power antenna selection.

During a first outer-loop time period $T_{OL}$ 1120-$a$, the receiver may make $N_c$ provisional antenna selections 1110 during antenna change evaluation period 1130-$a$. The provisional antenna selections 1110 may be determined according to an antenna selection function used for antenna selection without actually performing antenna selection for receiving downlink transmissions during the antenna change evaluation period 1130-$a$. In each antenna selection period 1125 (e.g., at the beginning of the antenna selection period 525, etc.), a measurement set of antenna subsets may be measured over a set of subframes (e.g., measuring each subset of the measurement set in one subframe and different subsets in successive subframes, etc.). In some examples, provisional antenna selection 1110 may be performed by measuring each antenna subset A-F of the available antenna subsets 1105 (e.g., including the current antenna subset). In other examples, the set of measured antenna subsets may include fewer than all the antenna subsets in the available antenna subsets 1105. For example, the receiver may use partitioned or disjoint antenna subsets and may calculate channel conditions for other antenna subsets using the measurements for the disjoint antenna subsets. However, measuring a subset of the available antenna subsets (e.g., partitioned or disjoint subsets, etc.) may reduce the accuracy of channel estimates and/or interference estimates derived from the measurements.

The change rate $C_n$ of the $N_c$ evaluations may be calculated, for example, by block averaging (e.g., using equation 4) or IIR filtering the $N_c$ provision antenna selections. The change rate $C_n$ of the $N_c$ evaluations may be greater than the high change rate threshold $T_H$ and the receiver may disable antenna selection for the remainder of the first outer-loop time period $T_{OL}$ 1120-$a$.

During a second outer-loop time period $T_{OL}$ 1120-$b$, the receiver may make $N_c$ provisional antenna selections 1110 during antenna change evaluation period 1130-$b$. The change rate $C_n$ of the $N_c$ evaluations may be less than the high change rate threshold $T_H$ and the receiver may enter an inner-loop for performing antenna selection after antenna change evaluation period 1130-$b$.

Figure 12:
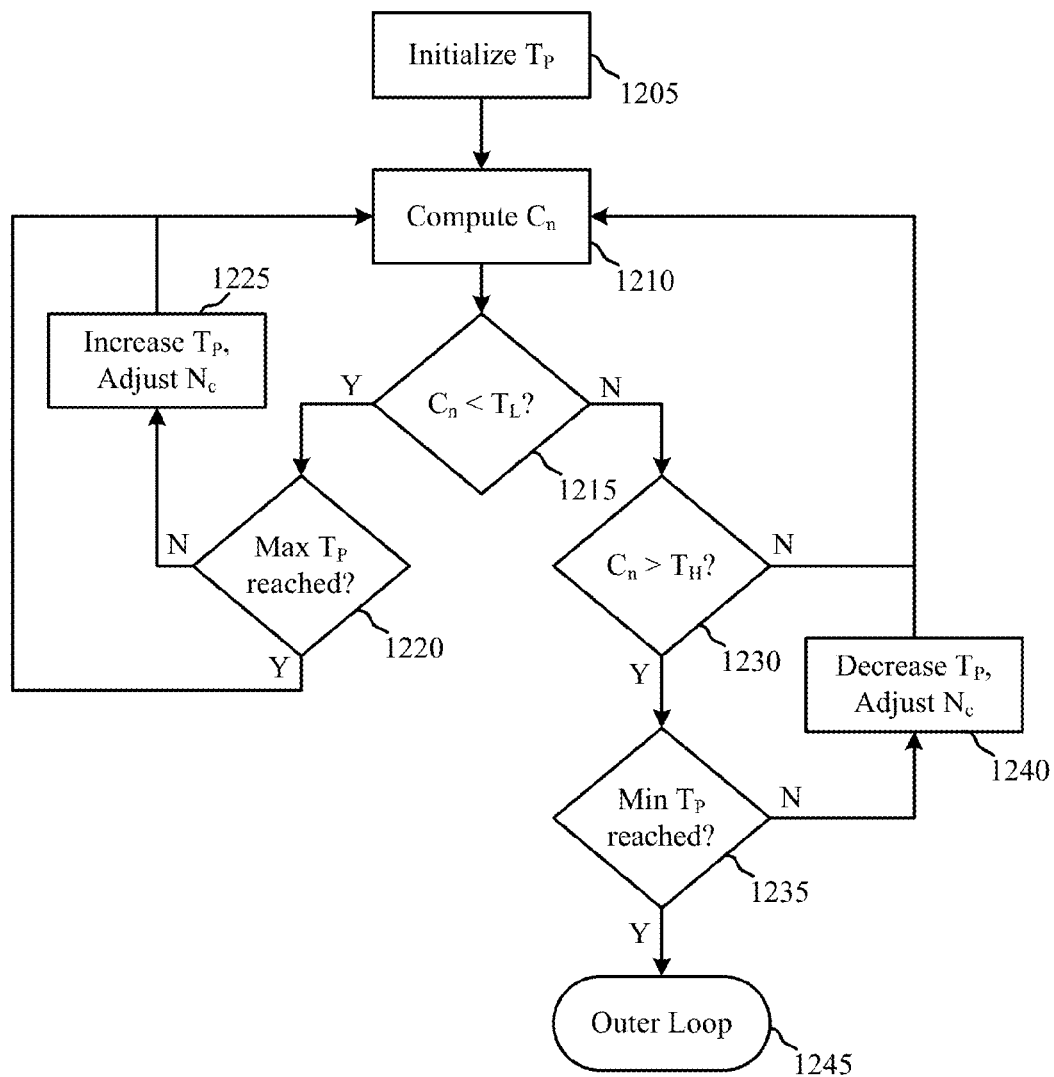
FIG. 12 shows a diagram of a method for performing antenna selection using an inner-loop based on change rate of antenna selection in accordance with various examples.

FIG. 12 is a diagram of a method 1200 for performing antenna selection using an inner-loop based on change rate of antenna selection in accordance with various examples. The method 1200 may be performed using, for example, the UEs 115 of FIG. 1, the receiver/demodulator 230 of FIG. 2, and/or the receiver 300 of FIG. 3.

At block 1205, the antenna selection time period $T_P$ may be initialized. For example, the antenna selection time period $T_P$ may be initialized to a default value. At block 1210, the change rate $C_n$ may be computed for antenna selections (e.g., $N_c$ antenna selections, etc.). For example, the change rate $C_n$ may be computed by block averaging (e.g., using equation 4) or IIR filtering the changes in selected antenna subsets.

At block 1215, the change rate $C_n$ is compared with a low change rate threshold $T_L$. If the change rate $C_n$ is lower than the low change rate threshold $T_L$ at block 1215, the method 1200 may determine whether the maximum antenna selection time period has been reached at block 1220. Where the antenna selection time period $T_P$ has reached the maximum antenna selection time period $T_{P,max}$, the method may return to block 1210 to compute a new $C_n$ after performing one or more additional antenna selections.

Where the maximum antenna selection time period $T_{P,max}$ has not been reached, the method 1200 may increase the antenna selection time period $T_P$ at block 1225. At block 1225, the method may also adjust the number of antenna selections $N_c$ for block averaging or IIR filtering based on the change to the antenna selection time period $T_P$. For example, the method may adjust the number of antenna selections $N_c$ to keep a substantially constant absolute time for computing the antenna selection change rate $C_n$.

If the change rate $C_n$ is greater than the low change rate threshold $T_L$ at block 1215, the method 1200 may determine whether the change rate $C_n$ is greater than the high change rate threshold $T_H$ at block 1230. If, at block 1230, the change rate $C_n$ is less than the high change rate threshold $T_H$, the method may return to block 1210 to compute a new $C_n$ after performing one or more additional antenna selections.

If, at block 1230, the change rate $C_n$ is greater than the high change rate threshold TH, the method may determine whether the minimum antenna selection time period $T_{P,min}$ has been reached at block 1235. Where the minimum antenna selection time period $T_{P,min}$ has not been reached, the method 1200 may decrease the antenna selection time period $T_P$ at block 1240. At block 1240, the method may also adjust the number of antenna selections $N_c$ for block averaging or IIR filtering based on the change to the antenna selection time period $T_P$. For example, the method may adjust the number of antenna selections $N_c$ to keep a substantially constant absolute time for computing the antenna selection change rate $C_n$.

If, at block 1235, the antenna selection time period $T_P$ has reached the minimum antenna selection time period $T_{P,min}$, the method 1200 may exit the inner loop at block 1245 and disable antenna selection. The receiver may return to an outer-loop process for evaluating whether antenna selections should be enabled or disabled. For example, the receiver may return to the process of FIG. 10 for determining whether antenna selections should be enabled or disabled in an outer-loop according to antenna selection change rate determined according to the antenna selection function while antenna selection is not performed for receiving downlink transmissions.

In some examples, the receiver may be configured for controlling antenna selection by dynamically adjusting an antenna selection period based on an antenna selection performance metric. The receiver may determine a target gain based on a metric of measurement overhead and dynamically adjust the antenna selection period such that the capacity gain tracks the target gain. Capacity gain may be calculated as an absolute quantity or as a ratio of the improvement in estimated capacity as a result of performing antenna selection divided by the current capacity. The target gain may be set semi-statically based on throughput losses due to measurement of antenna subsets providing lower capacity than the current antenna subset. For example, the target gain may be set as an absolute quantity or as a ratio of the measurement overhead loss for measurement subframes compared to the current effective capacity divided by the effective capacity over the antenna selection interval. In some examples, upper and lower target gains may be determined to set target bias or hysteresis in dynamic adjustment of antenna selection period. Dynamic adjustment of antenna selection period may be employed for R-out-of-N antenna selection or capacity-power antenna selection, in some examples.

Figure 13:
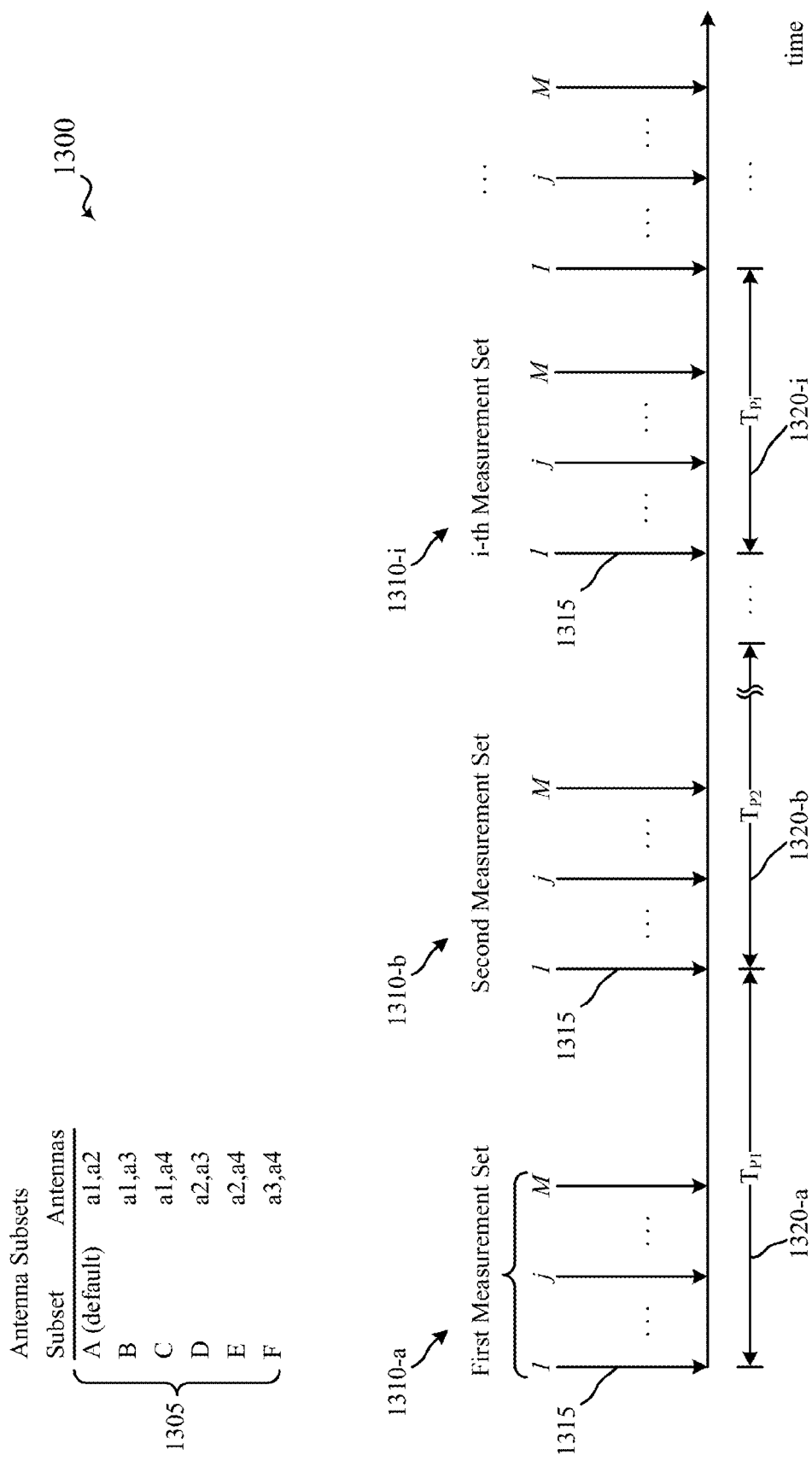
FIG. 13 shows a diagram illustrating timing for an antenna selection process in accordance with various examples.

FIG. 13 is a diagram 1300 illustrating timing for an antenna selection process in accordance with various examples. Antenna subsets may be defined for antenna selection as available combinations of antennas for use in antenna selection intervals. For a UE having four antennas a1, a2, a3 and a4, for example, antenna subsets 1305 for R-out-of-N antenna selection may be defined as alternative pairs of the antennas that may be employed.

Diagram 1300 illustrates antenna selection performed for antenna selection intervals 1320-a, 1320-b ... 1320-i. Each of the antenna selection intervals 1320-a, 1320-b ... 1320-i has a respective period $T_{P1}$, $T_{P2}$ ... $T_{Pi}$, which may be dynamically adjusted as described herein. For each antenna selection interval 1320, a measurement set 1310 may include a number of subframes where alternative antenna subsets are measured to determine the SINR or capacity of each of the available antenna subsets. In some examples, the measurement set 1310 includes each antenna subset of the available antenna subsets 1305 (e.g., including the current antenna subset). In some examples, the measurement set 1310 may include fewer than all the antenna subsets in the available antenna subsets 1305. For example, the receiver may use partitioned or disjoint antenna subsets and may calculate channel conditions for other antenna subsets using the measurements for the disjoint antenna subsets. However, measuring a subset of the available antenna subsets (e.g., partitioned or disjoint subsets, etc.) may reduce the accuracy of channel estimates and/or interference estimates derived from the measurements.

Figure 14:
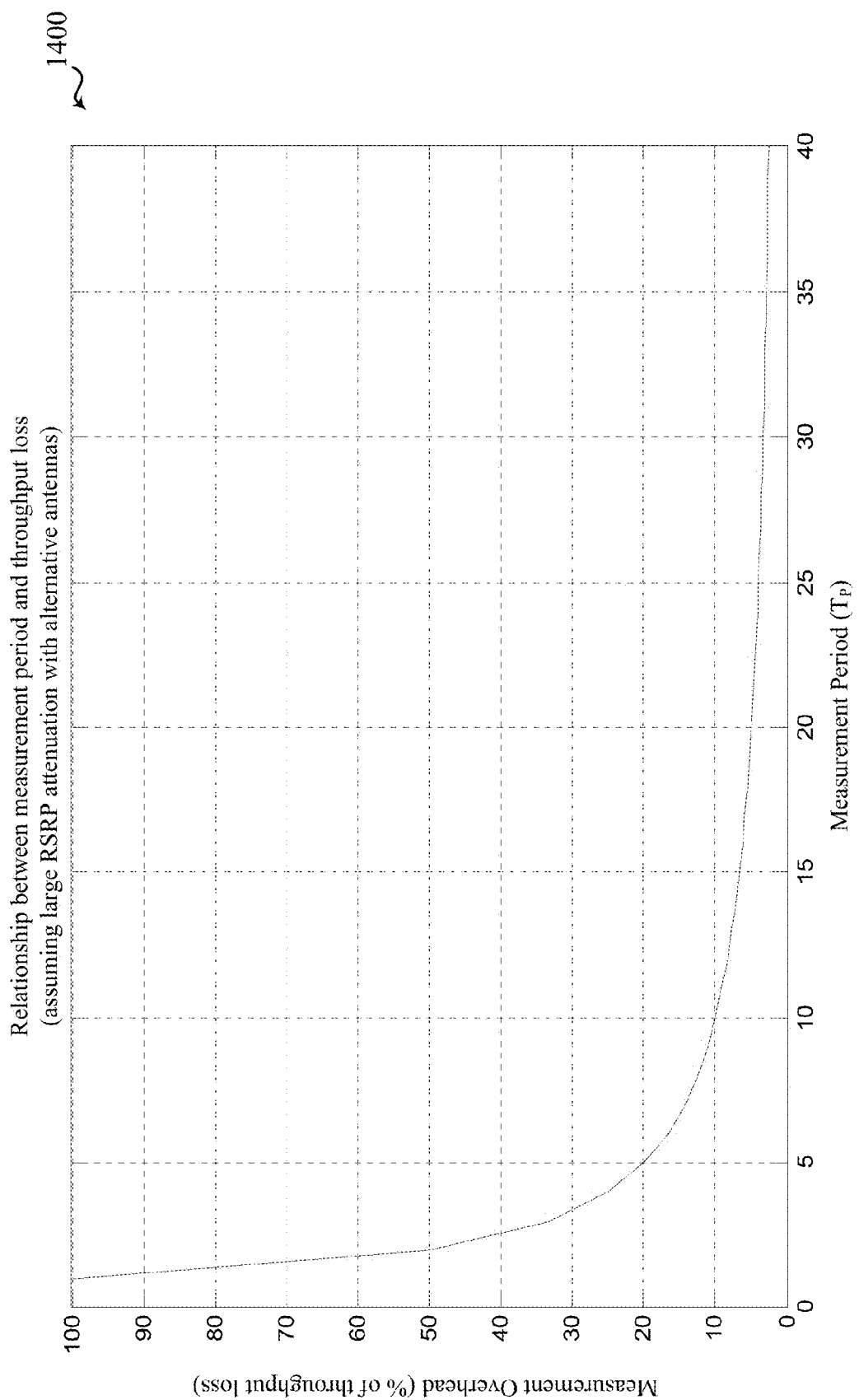
FIG. 14 is a graphical representation of the relationship between the measurement period (P) for an antenna selection interval and the measurement overhead associated with performing channel measurements for the antenna selection interval.

FIG. 14 is a diagram 1400 illustrating the relationship between the measurement period ($T_{Pi}$) for an antenna selection interval and the measurement overhead associated with performing the channel measurements of the measurement set for the antenna selection interval, as described above with respect to FIG. 13. As shown, the measurement overhead or throughput loss due to measurements performed for antenna selection is dependent on the measurement period. A shorter antenna selection period results in measurement being made more frequently, which negatively impacts data throughput (e.g., a measurement period of 5 subframes may result in a 20% throughput loss). Conversely, a longer antenna selection period results in lower throughput loss due to measurement of antenna subsets. However, a longer antenna selection period with less frequent measurements may reduce potential capacity gains from antenna switching (e.g., by not addressing changing channel conditions often enough). Thus, adjusting the measurement period by taking into account the measurement overhead in addition to the capacity gain from antenna switching may provide more accurate and robust measurement control for antenna selection, which may allow increased system performance in terms of overall data throughput.

Referring back to FIG. 13, a first measurement set 1310-a for antenna selection interval 1320-a may include one or more subframes 1315 for measurement of each of the antenna subsets 1305 (A-F). Each of the other antenna selection intervals 1320-b ... 1320-i has a respective measurement set, namely a second measurement set 1310-b ... an i-th measurement set 1310-i. Thus, each antenna selection interval may include a measurement set of M subframes out of P total subframes. In the example illustrated in diagram 1300, M=6 for measurement of each antenna subset of the available antenna subsets 1305.

Upon completion of each measurement set 1310, the following quantities may be derived:

$C_i^{best}$ Best capacity measured over all antenna subsets for the i-th measurement set;

$C_i^{curr}$ Capacity measured over the current antenna subset for the i-th measurement set;

$C_i^{curr,eff}$ Effective capacity over current antenna subset for the i-th antenna selection interval;

$C_i^{meas,j}$ Capacity measured over an alternative antenna subset that is being physically switched to in the j-th measurement subframe of the measurement set of the i-th antenna selection interval.

Using the measurements of the first measurement set 1310-a, an antenna subset having the best reception (e.g., the antenna subset corresponding to $C_i^{best}$, etc.) from among the antenna subsets 1305 is selected for use for the remainder of the first antenna selection interval 1320-a. Because channel conditions may be changing rapidly, the antenna subset selected for the first antenna selection interval 1320-a may not provide the best reception by the end of that interval. Thus, at the end of antenna selection interval 1320-a, a different antenna subset may provide a capacity gain over the subset used for the interval 1320-a. Based on the measurements of the second measurement set 1310-b, an antenna subset having the best reception (potentially different from the antenna subset selected for the first antenna selection interval 1320-a) is selected for use for the remainder of the second antenna selection interval 1320-b. Thus, the antenna selection process is periodically repeated for successive antenna selection intervals.

In each antenna selection interval 1320, capacity loss may be incurred by switching to antenna subsets of the measurement set that have lower reception quality (e.g., lower SINR, etc.) than the current antenna subset. The measurement overhead (throughput loss from antenna selection measurements) incurred by performing the measurements of the i-th measurement set includes loss of capacity due to worse reception of data, and may also include loss of capacity due to worse reception of grants.

In examples, the capacity gain is compared to a metric of measurement overhead and the antenna selection period for the next antenna selection interval is adjusted based on whether the capacity gain is greater than the metric of measurement overhead. Where the capacity gain is greater than the metric of measurement overhead, the antenna selection period may be decreased to seek additional capacity gain by more frequent antenna selection. Where the capacity gain is lower than the metric of measurement overhead, the antenna selection period may be increased to reduce the measurement overhead.

In some examples, ratios of measurement overhead and capacity gain are compared. For example, a measurement overhead ratio may be computed as a ratio of capacity loss due to measurement subframes divided by the effective capacity over the antenna selection interval. For example, a measurement overhead ratio may be computed as follows:

$$O_i^{meas} \triangleq O^{meas}(P_i, C_i^{curr,eff}, C_i^{meas,i}) = \frac{M \cdot C_i^{curr,eff} - \sum_{j=1}^{M} C_i^{meas,j}}{P_i \cdot C_i^{curr,eff}} \quad \text{Eq. 5}$$

In cases where the capacity measured over the alternative antenna subsets in the measurement set are negligible (e.g., effective antenna blocking by a user's hand) or where simplification is desirable, the measurement overhead ratio may be computed, for example, as follows:

$$O_i^{meas} \triangleq O^{meas}(P_i) = \frac{M \cdot C_i^{curr,eff}}{P_i \cdot C_i^{curr,eff}} = \frac{M}{P_i} \quad \text{Eq. 6}$$

The effective capacity $C_i^{curr,eff}$ may be computed by taking a sum of suitably weighted $C_i^{curr}$ quantities for a consecutive sequence of antenna selection intervals. In some examples, $C_i^{curr,eff}$ may take other types of overhead into account (e.g., power overhead, control channel overhead for HARQ, etc.).

The capacity gain ratio in the i-th antenna selection interval 1320 may be computed as follows:

$$\rho_i = \frac{C_i^{best} - C_i^{curr}}{C_i^{curr}} \quad \text{Eq. 7}$$

Note that $\rho_i \geq C_i^{best} \geq C_i^{curr}$ holds. Thus, antenna selection switches to a new "best" antenna subset where the antenna subset corresponding to $C_i^{best}$ is different than the current antenna subset (e.g., $\rho_i > 0$). Where the current antenna subset also corresponds to $C_i^{best}$, the current antenna subset may continue to be used for the i-th antenna selection interval. The length of the antenna selection intervals 1320-a, 1320-b . . . 1320-i, i.e., the respective periods $P_1, P_2 \ldots P_i$, may be varied to optimize the capacity gain ratio with respect to the measurement overhead ratio associated with measurements made during the antenna selection intervals 1320-a, 1320-b . . . 1320-i.

In some examples, measurement overhead and capacity gain may be compared using absolute gain and measurement loss. For example, a metric of absolute measurement overhead may be computed as follows:

$$O_i^{meas} \triangleq O^{meas}(C_i^{curr,eff}, C_i^{meas,j}) = M \cdot C_i^{curr,eff} - \sum_{j=1}^{M} C_i^{meas,j} \quad \text{Eq. 8}$$

Similarly, a metric of absolute capacity gain may be computed as follows:

$$\rho_i = C_i^{best} - C_i^{curr} \quad \text{Eq. 9}$$

The metrics of absolute capacity gain and measurement overhead may be compared, for example, using a suitable factor.

In some examples, upper and lower gain targets may be computed to provide target bias and/or hysteresis in antenna selection period adjustment. For example, quantization in effective capacity may lead to oscillations in antenna selection period.

Given the derived $O_i^{meas}$, an upper gain target $T_i^U$ and a lower gain target $T_i^L$ may be defined as follows:

$$T_i^U = O_i^{meas} + T_{margin}^U, \quad \text{Eq. 10}$$

and $$T_i^L = O_i^{meas} - T_{margin}^L \quad \text{Eq. 11}$$

where $T_{margin}^U$ and $T_{margin}^L$ may be suitably selected quantities for addressing target bias and/or hysteresis. Thus, the upper gain target $T_i^U$ and a lower gain target $T_i^L$ may operate as thresholds for decreasing or increasing the antenna selection period, as described below.

Further, upper and lower bound constants may be defined for the adjustment of the antenna selection period $P_i$. For example, upper and lower bounds for $P_i$ may be defined as:
$P_U$—upper bound of $P_i$, and
$P_L$—lower bound of $P_i$.

In some examples, setting of a target gain based on a metric of measurement overhead may be performed semi-statically. For example, target gain (e.g., upper and lower target gain, etc.) may be performed every S antenna selection intervals, where S≥1. In some examples, semi-static target setting may be performed using a filtered version of the periodicity value (P) for a history of $P_i$ values as follows:

$$P_{prev}^{filtered} = P_{curr}^{filtered}; \quad \text{Eq. 12}$$

$$P_{curr}^{filtered} = \text{filter}(P_{k, \forall k \in \{i, i-1, i-2, \ldots 1\}}); \quad \text{Eq. 13}$$

$$O_{prev}^{meas} = O_{curr}^{meas}; \quad \text{Eq. 14}$$

$$O_{curr}^{meas} = O^{meas}(P_{curr}^{filtered}); \quad \text{Eq. 15}$$

Where the filter may be any suitable filter function (e.g., average, moving average, FIR, IIR, etc.), as appropriate or desired.

In cases where the capacity measured over the alternative antenna subsets are negligible (e.g., effective antenna blocking by a user's hand) or where simplification is desirable, equation 14 holds unless the filtered antenna selection period for the current interval ($P_{curr}^{filtered}$) becomes significantly different from the filtered antenna selection period for the previous interval ($P_{prev}^{filtered}$). For example, for a small and non-negative value or threshold $\epsilon$, if the absolute value of the difference between the filtered version of the antenna selection period for the current interval and the filtered version of the antenna selection period from the previous interval is less than the threshold $\epsilon$, the target gain may remain unchanged. This may be written as:

$$\text{if } (|P_{curr}^{filtered} - P_{prev}^{filtered}| < \epsilon); \quad \text{Eq. 16}$$

then target is unchanged as $$O_{curr}^{meas} = \frac{M}{P_{curr}^{filtered}} \quad \text{Eq. 17}$$
$$\approx \frac{M}{P_{prev}^{filtered}}$$
$$= O_{prev}^{meas}$$

$$\text{else: } O_{curr}^{meas} = O^{meas}(P_{curr}^{filtered}) \qquad \text{Eq. 18}$$
$$= \frac{M}{P_{curr}^{filtered}}$$

where the threshold $\epsilon$ may be selected as appropriate or desired.

In some examples, dynamic target tracking of capacity gain may be applied to capacity-power antenna selection by accounting for power consumption in capacity gain and measurement overhead. For example, an appropriate power consumption factor $A_p$ may be determined for each antenna subset (e.g., based on a number of active receive chains, etc.). A capacity gain ratio may then be determined as:

$$\rho_i = \frac{A_p^{best} \cdot C_i^{best} - A_p^{curr} \cdot C_i^{curr}}{A_p^{curr} \cdot C_i^{curr}} \qquad \text{Eq. 19}$$

Similarly, power consumption may be accounted for in measurement overhead through appropriate factors used in determining $C_i^{curr,eff}$.

Figure 15:
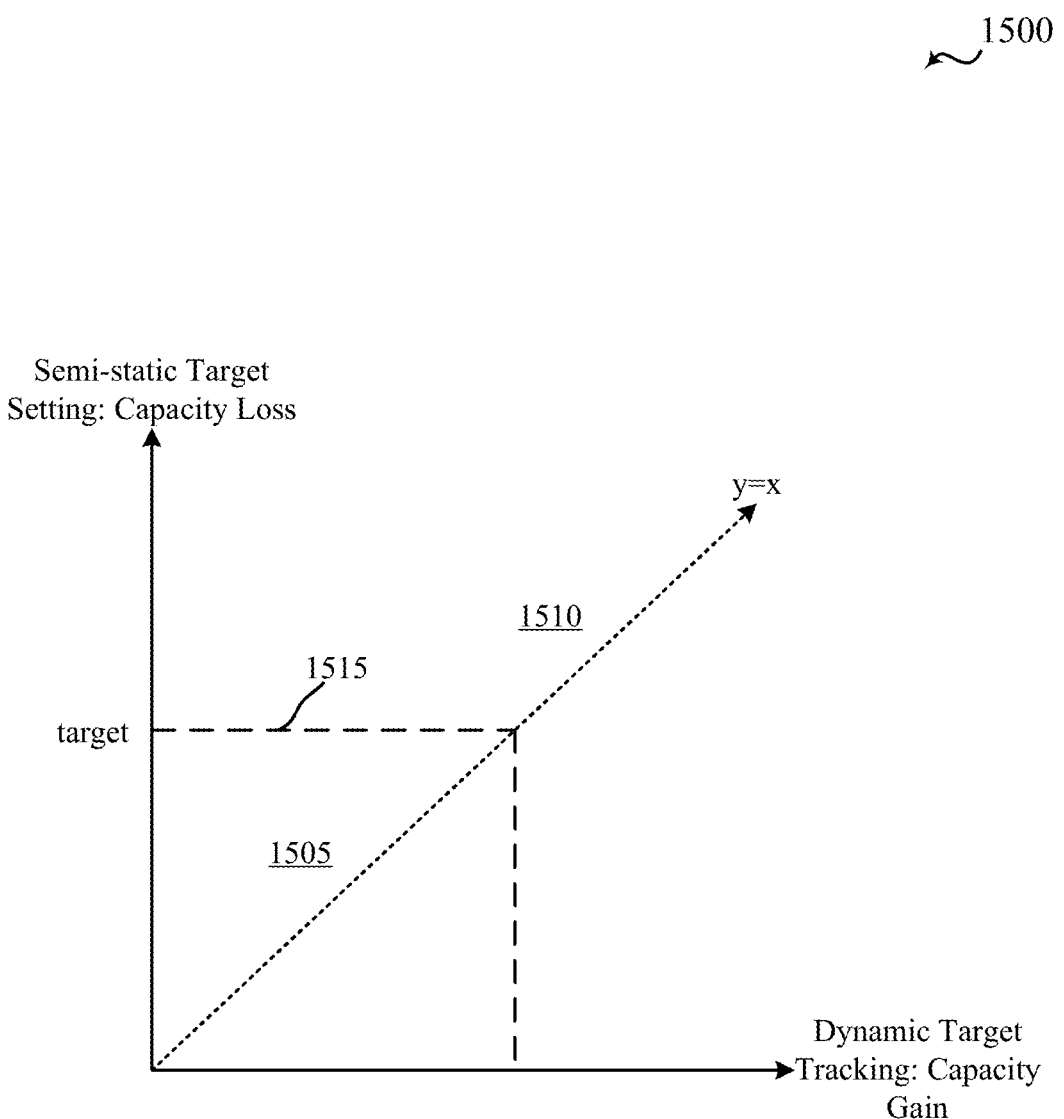
FIG. 15 is a graphical representation of a decision region map for semi-static target setting and dynamic target tracking.

FIG. 15 is a diagram 1500 illustrating a decision region map for semi-static target setting and dynamic target tracking as described herein. A target gain 1515 (e.g., based on a metric of measurement overhead, etc.) may be semi-statically set as described below. The decision map shows a first region 1505 and a second region 1510 for the target gain 1515. The first region 1505 may correspond to decreasing or lower Doppler conditions which may be disadvantageous in terms of measurement overhead because potential capacity gains from antenna switching may be less. Accordingly, the strategy for the first region 1505 is to increase the antenna measurement period $P_i$ (thus decreasing the frequency of measurements) to reduce the measurement overhead. The second region 1510 may correspond to increasing or higher Doppler conditions which may be advantageous in terms of antenna switching gain because potential capacity gains from antenna switching may be greater. Accordingly, the strategy for the second region 1510 is to decrease the antenna measurement period $P_i$ (thus increasing the frequency of measurements) to seek more possible capacity gain from more frequent antenna switching. Note that the target gain 1515 may be adjusted (semi-statically set) for successive antenna selection intervals as described herein. Thus, the measurement overhead target and the regions 1505, 1510 may change over time.

Figure 16:
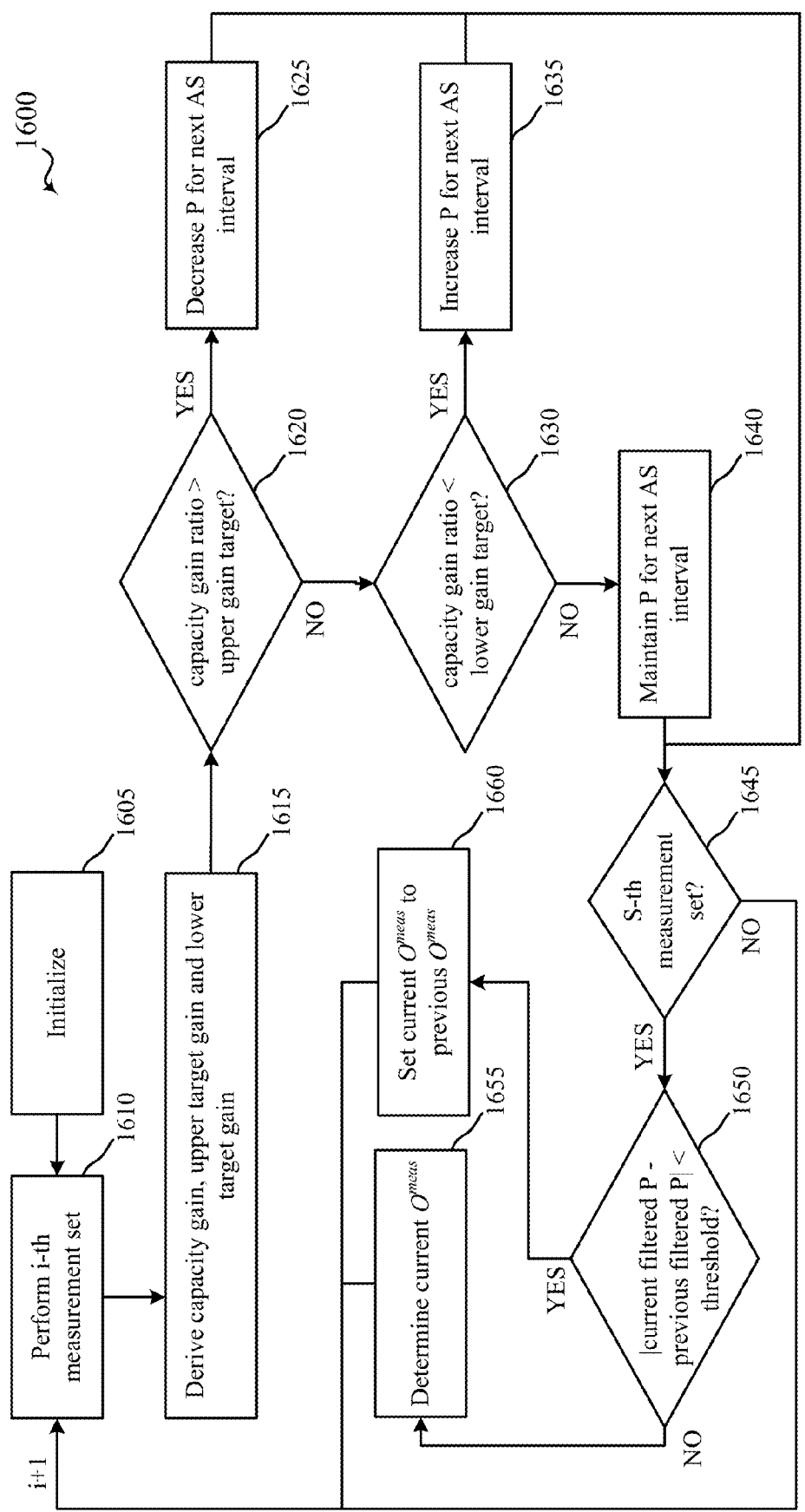
FIG. 16 shows a flow diagram of a method for performing and controlling antenna selection in accordance with various examples.

FIG. 16 is a flow diagram of an example of a method 1600 for performing and controlling an antenna selection process. The method 1600 may be performed using, for example, the UEs 115 of FIG. 1, the receiver/demodulator 230 of FIG. 2, and/or the receiver 300 of FIG. 3.

The antenna selection process may be initialized (e.g., i=1) at block 1605. At block 1610, measurements for the measurement set of the i-th antenna selection interval may be performed. For example, each of M antenna subsets of a measurement set may be switched to and used for reception of transmitted signals (e.g., data, reference signals, etc.) during successive subframes.

At block 1615, capacity gain, upper target gain, and lower target gain may be derived. For example, capacity gain may be computed as absolute capacity gain or capacity gain ratio as described above. Upper and lower target gains may be derived from a metric of measurement overhead as described above with reference to equations 10 and 11, where the metric of measurement overhead may be derived as described above with reference to equations 5, 6, or 8. The metric of measurement overhead may be determined based on filtering of the antenna selection period as described below with reference to blocks 1645, 1650, 1655, and 1660. The upper and lower target gains may be determined for an initial antenna selection interval (e.g., i=1) using appropriate initialization of the metric of measurement overhead (e.g., equation 2).

Next, dynamic target tracking may be performed. At block 1620, a comparison between the capacity gain ($\rho_i$) and the upper target gain ($T_i^U$) may be performed. If the capacity gain is greater than the upper target gain, then the method 1600 may proceed to block 1625, where the antenna selection period $P_i$ for the next antenna selection (AS) interval may be decreased. If the capacity gain is not greater than the upper target gain, then the method 1600 may proceed to block 1630, where a comparison between the capacity gain ($\rho_i$) and the lower gain target ($T_i^L$) may be performed. If the capacity gain is less than the lower target gain, then the method 1600 may proceed to block 1635, where the antenna selection period $P_i$ for the next antenna selection interval may be increased. If the capacity gain ratio is not less than the lower gain target, then the method 1600 may proceed to block 1640, where the antenna selection period $P_i$ for the next antenna selection interval may be maintained as the current antenna selection period. The decrease and increase in the antenna selection period $P_i$ performed in blocks 1625 and 1635 may be any suitable positive values, which may be the same or different. Further, the values for the decrease and increase may be variable or constant. For example, the values may be based upon an amount that the capacity gain is above or below the respective target gain at blocks 1620 and 1630, a number of subframes used for completing the measurement set, or the like.

Blocks 1645, 1650, 1655 and 1660 of method 1600 illustrate semi-static determination of the metric of measurement overhead used in target setting. For example, the method 1600 may proceed to begin semi-static target setting at block 1645 after the antenna selection period for the next antenna selection interval is determined at blocks 1625, 1635, or 1640.

At block 1645, a determination is made as to whether a desired number of iterations have occurred since the last target setting was performed. In this example, target setting may be performed after every S-th measurement set. Thus, if the S-th measurement set has been completed, the method 1600 may continue to block 1650, where a the absolute value of a difference between the filtered version of the current antenna selection period and the filtered version of the previous antenna selection period (absolute value) is compared to a threshold ($\epsilon$). If the difference is equal to or exceeds the threshold, the method 1600 may continue to block 1655, where a current metric of measurement overhead ($O^{meas}$) may be determined for target setting. For example, $O^{meas}$ may be determined according to one of equations 5, 6, or 8. If the difference is less than the threshold at block 1650, the method 1600 may proceed to block 1660, where the current metric of measurement overhead ($O^{meas}$) may be set to the previous metric of measurement overhead for target gain setting (e.g., the target gain(s) may remain unchanged). In this manner, the method 1600 may perform dynamic target tracking and semi-static target setting using capacity gain and measurement overhead.

Figure 17:
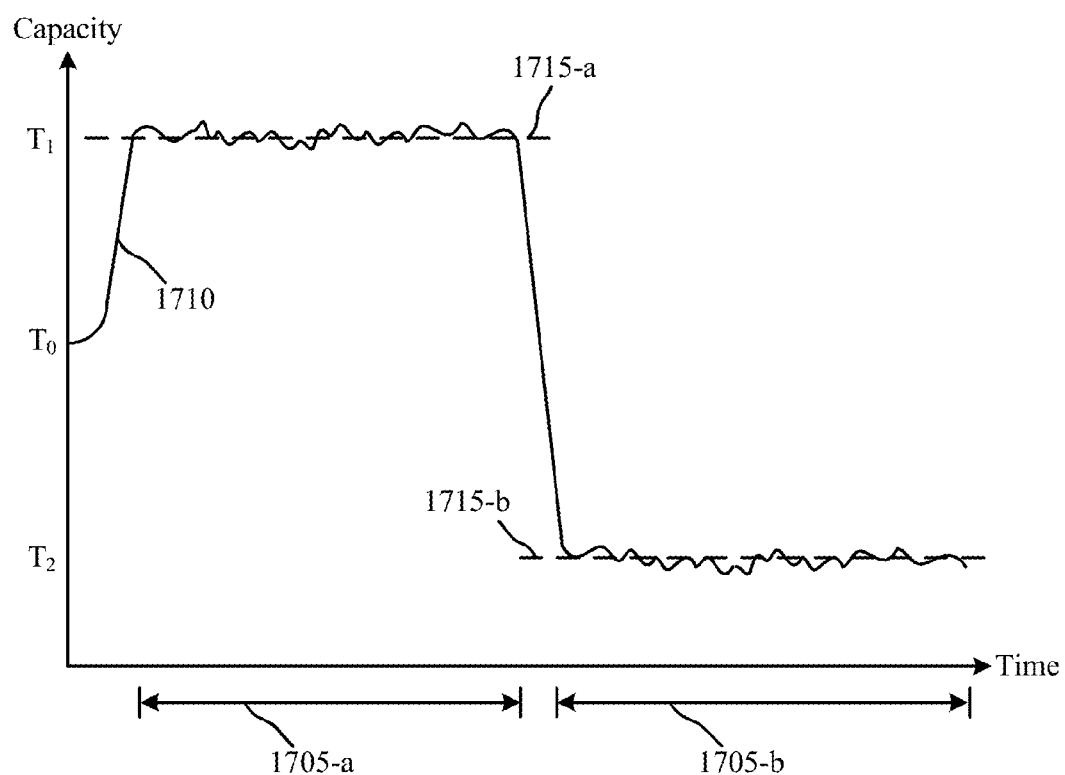
FIG. 17 is a graphic representation of convergence of dynamic antenna switch gain in capacity around semi-static targets under higher and lower Doppler conditions.

FIG. 17 is a diagram 1700 illustrating convergence of dynamic antenna selection capacity gain that may be achieved using the techniques described herein. Diagram 1700 illustrates a first time period 1705-a which may have higher Doppler conditions (e.g., relatively high speed of a UE 115, etc.) and a second time period 1705-b in which the UE is experiencing lower Doppler conditions (e.g., relatively lower speed, etc.). Starting with an initial target gain set at $T_0$, the higher Doppler conditions 1705-*a* may cause the capacity gain 1710 from antenna selection to increase. As the capacity gain increases, the antenna selection period may consequently decrease according to the techniques described herein. The shorter antenna selection period increases the measurement overhead and thus raises the target gain to a higher target gain $T_1$ 1715-*a*. The dynamic switch gain may then converge around the higher target gain $T_1$.

Lower Doppler conditions 1705-*b* (e.g., lower relative speed of the UE, etc.) may cause the dynamic antenna selection capacity gain 1710 to decrease. As the capacity gain 1710 decreases, the antenna selection period consequently increases, resulting in lower measurement overhead. Thus, the target gain is reduced to a new lower target gain $T_2$ 1715-*b*. The dynamic antenna selection capacity gain 1710 then converges around the lower target gain $T_2$ 1715-*b*. As described above, the target gains $T_1$ 1715-*a* and $T_2$ 1715-*b* may be semi-statically set according to respective increases and decreases in the frequency of antenna measurements to allow the antenna selection process to adapt to changes in channel conditions (e.g., Doppler conditions) and improve data throughput.

Figure 18:
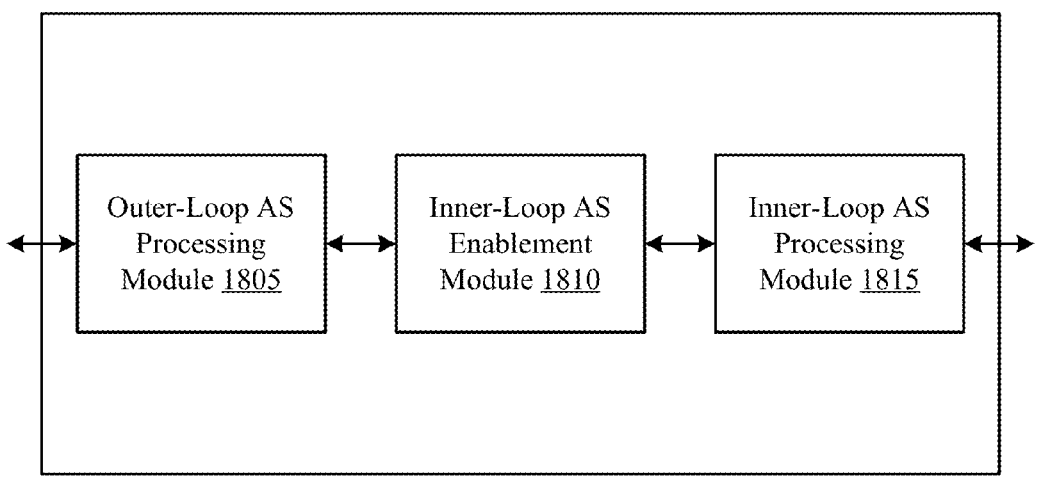
FIG. 18 shows a device for enabling and disabling antenna selection using estimates of UE speed according to various examples.

FIG. 18 illustrates a device 1800 for enabling and disabling antenna selection using an outer-loop according to various examples. Device 1800 may illustrate, for example, aspects of UEs 115 illustrated in FIG. 1, receiver/demodulator 230 of FIG. 2, and/or receiver 300 of FIG. 3. Device 1800 includes outer-loop AS processing module 1805, inner-loop AS enablement module 1810, and inner-loop AS processing module 1815. Each of these components may be in communication with each other.

Outer-loop AS processing module 1805 may evaluate whether to perform antenna selection using an outer-loop process based on an antenna selection performance metric meeting an antenna selection enablement threshold. For example, the outer-loop AS processing module 1805 may evaluate whether to enable antenna selection for an outer-loop period based on an estimate of UE speed for the outer-loop period. Additionally or alternatively, the outer-loop AS processing module 1805 may evaluate whether to perform antenna selection based on a change rate of antenna selection according to an antenna selection function.

Inner-loop AS enablement module 1810 may enable an inner-loop process for performing antenna selection based on the evaluation of outer-loop AS processing module 1805. Inner-loop AS enablement module 1810 may enable antenna selection for an outer-loop period based on the antenna selection performance metric meeting the antenna selection enablement threshold. For example, the inner-loop AS enablement module 1810 may enable antenna selection based on the estimate of UE speed for the outer-loop period meeting an initial antenna selection speed threshold. Additionally or alternatively, the inner-loop AS enablement module 1810 may switch to an inner-loop process of inner-loop AS processing module 1815 based on the antenna selection performance metric meeting the antenna selection enablement threshold. For example, the inner-loop AS enablement module 1810 may switch to the inner-loop process based on based on an antenna selection change rate being less than a high change rate threshold.

The inner-loop AS processing module 1815 may perform antenna selection for each inner-loop time period. For example, the inner-loop AS processing module 1815 may determine an antenna subset for receiving downlink transmissions during each inner-loop period based on an antenna selection function. Inner-loop AS processing module 1815 may perform R-out-of-N antenna selection, capacity-power antenna selection, or a combination of these techniques.

Figure 19:
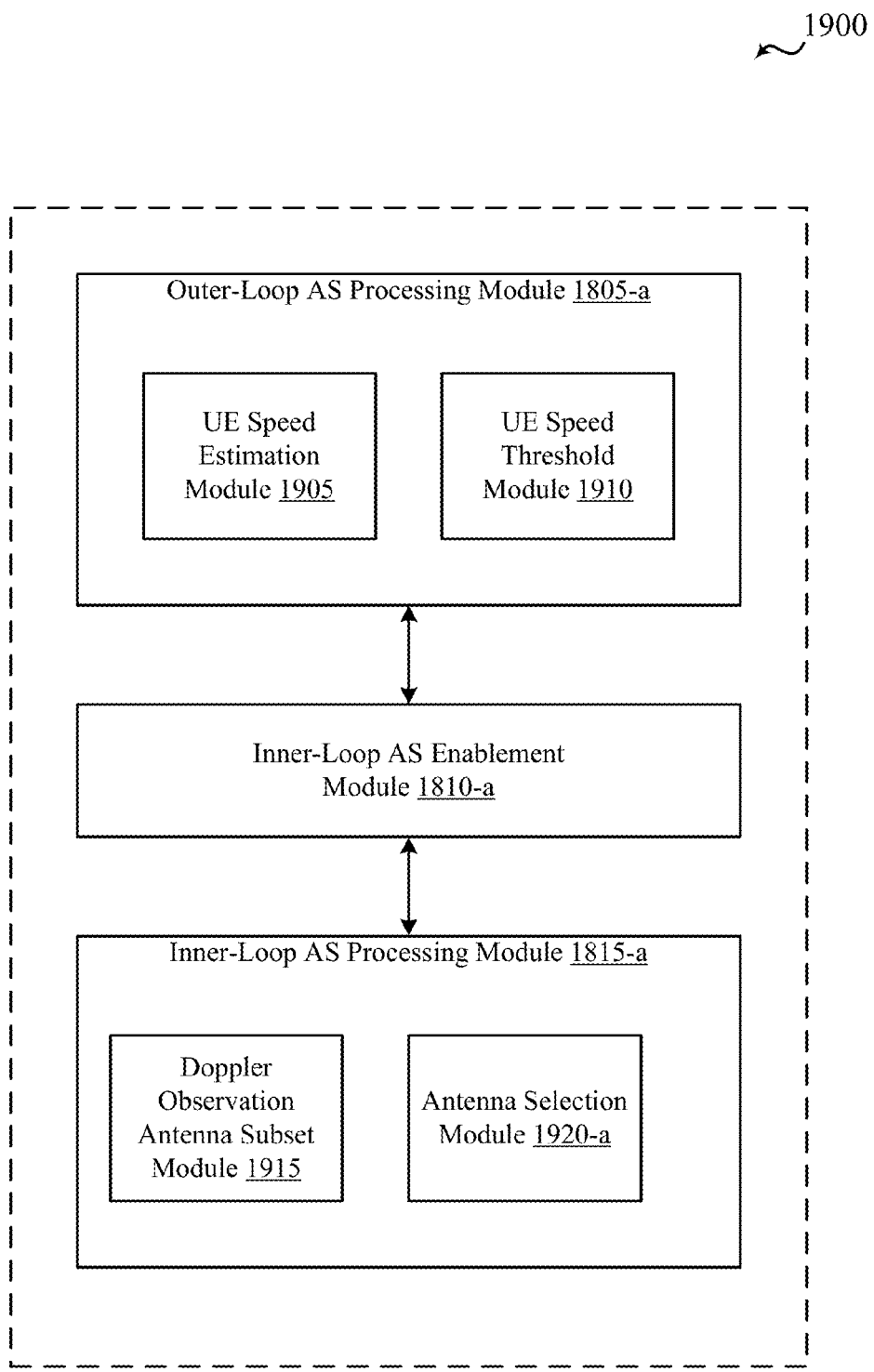
FIG. 19 shows a device for enabling and disabling antenna selection using an outer-loop based on change rate of antenna selection in accordance with various examples.

FIG. 19 illustrates a device 1900 for enabling and disabling antenna selection based on estimates of UE speed according to various examples. Device 1900 may illustrate, for example, aspects of UEs 115 illustrated in FIG. 1, receiver/demodulator 230 of FIG. 2, receiver 300 of FIG. 3, or device 1800 of FIG. 18. Device 1900 includes outer-loop AS processing module 1805-*a*, inner-loop AS enablement module 1810-*a*, and inner-loop AS processing module 1815-*a*. Each of these components may be in communication with each other.

Outer-loop AS processing module 1805-*a* includes UE speed estimation module 1905 and UE speed threshold module 1910. UE speed estimation module 1905 estimates UE speed. For example, UE speed estimation module 1905 may estimate the UE speed based on transmissions received from a transmitter (e.g., eNB 105, etc.). Additionally or alternatively, the UE speed estimation module 1905 may obtain location and speed information by receiving global positioning system (GPS) signals or employing sensors (e.g., accelerometers, gyroscopes, etc.). For many techniques used in speed estimation, filtering of location, acceleration, or speed data may be used to reduce noise in estimated UE speed. The filtering may employ a variety of techniques (e.g., moving average, infinite impulse response (IIR), finite impulse response (FIR), etc.). In one example, UE speed estimation module 1905 estimates UE speed based on Doppler estimation of reference signals in downlink transmissions (e.g., eNB 105) as described above with reference to FIG. 6.

Outer-loop AS processing module 1805-*a* evaluates whether to enable or disable antenna selection based on the estimated UE speed. For example, UE speed threshold module 1910 may compare Doppler frequency estimates of signals received by the device 1900 against thresholds for employing antenna selection. UE speed threshold module 1910 may employ an initial enablement threshold $T_{fDE}$, a high-speed threshold $T_{fDH}$, and a low-speed threshold $T_{fDL}$ for determining whether to enable or disable antenna selection. For example, inner-loop AS enablement module 1810-*a* may enable antenna selection if an initial Doppler frequency estimate is less than the initial enablement threshold $T_{fDE}$. Once antenna selection is enabled, inner-loop AS enablement module 1810-*a* may continue to enable antenna selection unless the Doppler frequency estimates are greater than the high-speed threshold $T_{fDH}$. If the initial Doppler frequency estimate is greater than the initial enablement threshold $T_{fDE}$, inner-loop AS enablement module 1810-*a* may disable antenna selection until the Doppler frequency estimates fall below the low-speed threshold $T_{fDL}$. The initial enablement threshold $T_{fDE}$, high-speed threshold $T_{fDH}$, and low-speed threshold $T_{fDL}$ may be defined according to mean, maximum, or a percentile of estimated Doppler frequency for a given observation length. The thresholds may be defined according to SNR ranges of the received signals.

Inner-loop AS processing module 1815-*a* may perform antenna selection using an inner-loop antenna selection period. For each antenna selection period, antenna selection module 1920-*a* may select a subset of antennas for receiving downlink transmissions. Antenna selection module 1920-*a* may perform R-out-of-N antenna selection, capacity-power antenna selection, or a combination of these techniques. Doppler observation antenna subset module 1915 may disable antenna selection and may select the same antenna subset for receiving downlink transmissions during Doppler observation windows. Alternatively, Doppler observation antenna subset module 1915 may select an anchor antenna for Doppler estimates and perform antenna selection from among the other antennas during Doppler observation windows.

Figure 20:
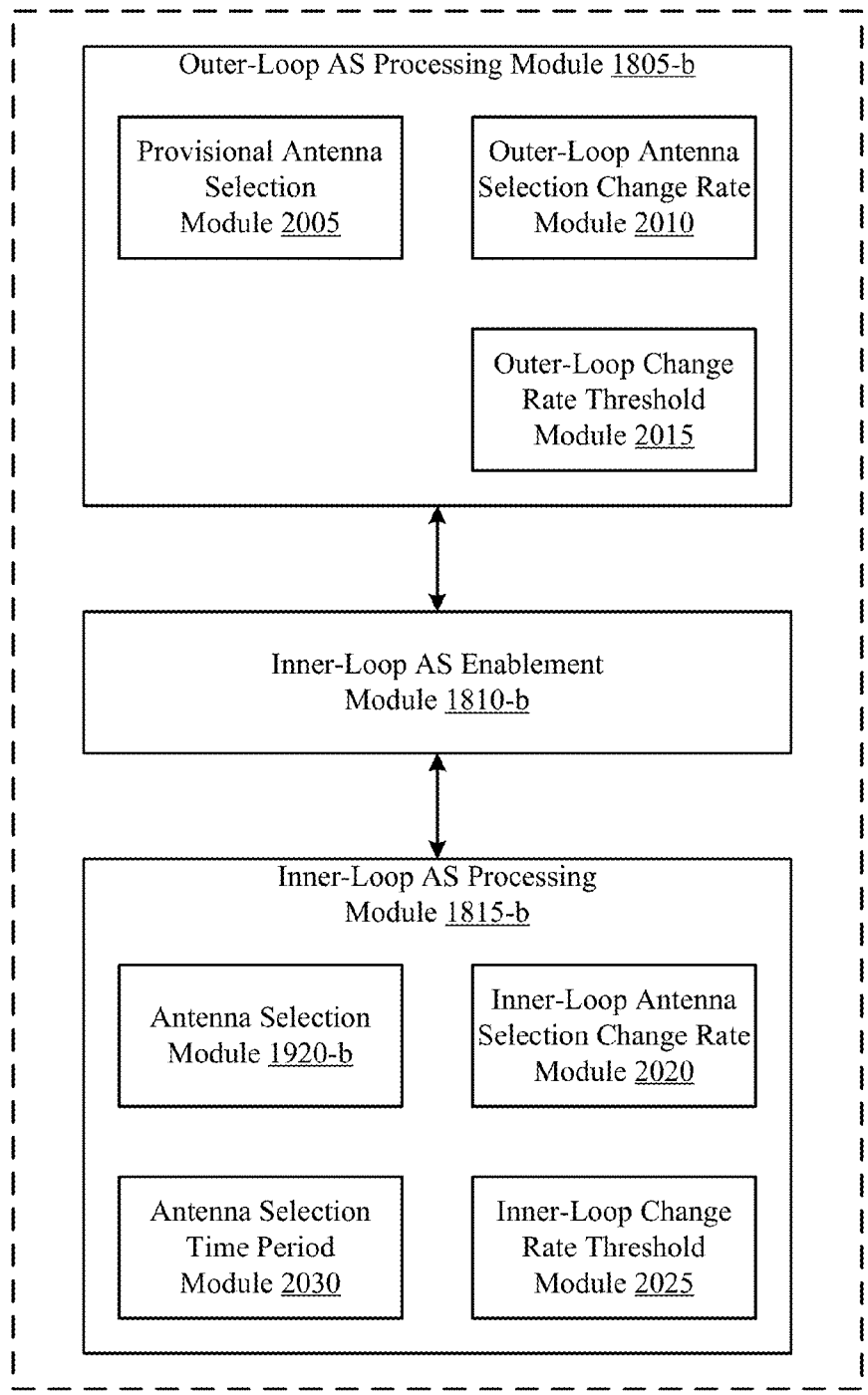
FIG. 20 shows a device for enabling and disabling antenna selection using an outer-loop based on change rate of antenna selection in accordance with various examples.

FIG. 20 illustrates a device 2000 for enabling and disabling antenna selection using an outer-loop based on change rate of antenna selection in accordance with various examples. Device 2000 may illustrate, for example, aspects of UEs 115 illustrated in FIG. 1, receiver/demodulator 230 of FIG. 2, receiver 300 of FIG. 3, or device 1800 of FIG. 18. Device 2000 includes outer-loop AS processing module 1805-b, inner-loop AS enablement module 1810-b, and inner-loop AS processing module 1815-b. Each of these components may be in communication with each other.

Outer-loop AS processing module 1805-b may include provisional antenna selection module 2005, outer-loop antenna selection change rate module 2010, and outer-loop change rate threshold module 2015. Each of these components may be in communication with each other. Outer-loop AS processing module 1805-b may be an example of Outer-loop AS processing module 1805 of FIG. 18.

Outer-loop AS processing module 1805-b may make $N_c$ evaluations of an antenna selection function used for antenna selection at intervals of the minimum antenna selection period $T_{P,min}$. Provisional antenna selection module 2005 may perform provisional antenna selections by evaluation of the antenna selection function at the minimum antenna selection period $T_{P,min}$ to determine selected subsets of antennas, but without performing antenna selection for receiving downlink transmissions. Thus, the subset of antennas selected by the antenna selection function may be identified for each of the $N_c$ evaluations but the antennas used to receive transmissions may be the default antenna subset.

Outer-loop antenna selection change rate module 2010 may determine the change rate $C_n$ of the identified antenna selections by block averaging (e.g., using equation 8) or filtering (e.g., IIR, FIR, etc.) the changes in the identified antenna subsets. Outer-loop change rate threshold module 2015 may compare the change rate $C_n$ to the high change rate threshold $T_H$. If the change rate is greater than the high change rate threshold $T_H$, inner-loop AS enablement module 1810-b may continue the outer-loop process with antenna selection disabled. If the change rate C is less than the high change rate threshold $T_H$, inner-loop AS enablement module 1810-b may switch to the inner-loop performed by the inner-loop AS processing module 1815-b.

Inner-loop AS processing module 1815-b may include antenna selection module 1920-b, inner-loop antenna selection change rate module 2020, inner-loop change rate threshold module 2025, and antenna selection time period module 2030. Each of these components may be in communication with each other. Inner-loop AS processing module 1815-b may be an example of the inner-loop AS processing module 1815 of FIG. 18.

Antenna selection module 1920-b may perform antenna selection for inner-loop antenna selection processing according to an antenna selection time period T. Inner-loop antenna selection change rate module 2020 may compute the change rate $C_n$ for antenna selections (e.g., $N_c$ antenna selections, etc.). The change rate $C_n$ may be computed by block averaging (e.g., using equation 8) or filtering (e.g., IIR, FIR, etc.) the changes in selected antenna subsets.

Inner-loop change rate threshold module 2025 may compare the change rate with a low change rate threshold $T_L$ and high change rate threshold $T_H$. If the change rate $C_n$ is lower than the low change rate threshold $T_L$, antenna selection time period module 2030 may increase the antenna selection time period $T_P$ until it reaches the maximum antenna selection time period $T_{P,max}$. If the change rate C is greater than the high change rate threshold $T_H$, antenna selection time period module 2030 may decrease the antenna selection time period $T_P$ until it reaches the minimum antenna selection time period $T_{P,min}$. If the change rate $C_n$ is above the high change rate threshold $T_H$ at the minimum antenna selection time period $T_{P,min}$, Inner-loop change rate threshold module 2025 may exit the inner-loop and switch to outer-loop processing using the outer-loop AS processing module 1805-b.

Antenna selection time period module 2030 may also adjust the number of antenna selections $N_c$ for block averaging or filtering based on the change to the antenna selection time period $T_P$. For example, the Antenna selection time period module 2030 may adjust the number of antenna selections $N_c$ to keep a substantially constant absolute time for computing the antenna selection change rate $C_n$.

The components of the devices 1800, 1900, and 2000 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

Figure 21A:
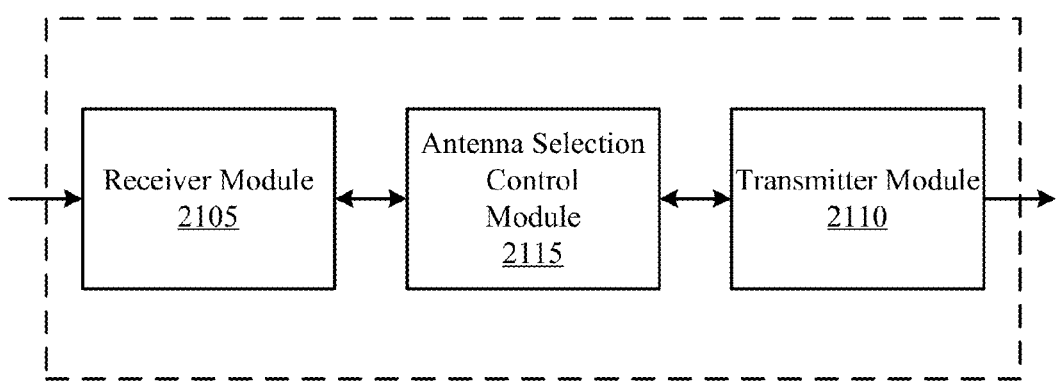
FIG. 21A shows a device for performing antenna selection in accordance with various examples.

FIG. 21A illustrates a device 2100-a for performing antenna selection for a UE. Device 2100-a may illustrate, for example, aspects of UEs 115 illustrated in FIG. 1, receiver/demodulator 230 of FIG. 2, and/or receiver 300 of FIG. 3. As shown, the device 2100-a includes a receiver module 1005, a transmitter module 2110 and an antenna selection control module 2115. The device 2100-a may also include a processor (not shown), which may be part of the antenna selection control module 2115, for example. Each of these components may be in communication with each other.

The receiver module 2105 may receive information such as packets, user data, and/or control information. The received information may be demodulated, descrambled, de-interleaved, and/or decoded. The information may be passed on to appropriate modules, such as a communications management module (not shown), and to other components of the device 2100-a as appropriate or desired.

The receiver module 2105 may include a single receiver or multiple receivers. For example, the receiver module 2105 may include N receive antennas and R RF chains (not shown), where R is generally less than or equal to N. Each RF chain may include an RF module and an analog-to-digital converter (ADC). During operation, signals received by a receive antenna may be provided to an input of an RF chain. At the RF chain, the signals are processed (e.g., amplified, downconverted, filtered, etc.) by an RF module and digitized by the ADC. The output of the RF chain may be provided to the demodulator for further processing. The demodulator may combine signals received from multiple antennas using receive diversity techniques to increase the SINR of the received signals. The demodulator may use a suitable signal combining technique such as equal gain combining, maximum ratio combining (MRC), and the like. The demodulator and RF chains may use interference cancellation techniques to further provide interference cancellation and/or suppression (e.g., interference rejection combining, successive interference cancellation, and the like).

The transmitter module 2110 may transmit information such as packets, user data, and/or control information including synchronization and pilot signals. The transmitted information may be modulated, scrambled, interleaved, and/or coded. The information may be received from a communications management module (not shown), and from other components of the device 2100-*a* such as the antenna selection control module 2115. In some examples, the transmitter module 2110 may be collocated with the receiver module 2105 in a transceiver module (not shown). The transmitter module 2110 may be capable of transmission using a single antenna (e.g., sharing the N antennas of the receiver module 2105), or it may be capable of transmission of one or more data streams using multiple antennas. The antenna selection control module 2115 may employ the transmitter module 2110 and the receiver module 2105 (or a transceiver module) to perform an antenna selection procedure as described herein.

For example, the antenna selection control module 2115 may cooperate with the transmitter module 2110 and the receiver module 2105 to perform measurements of the measurement sets for the antenna selection process. Measurement values may be in terms of capacity, or other values may be measured as representative of capacity, such as RSSI, SINR and/or SNR. Further, the antenna selection control module 2115 may be configured to perform dynamic target tracking and semi-static target setting as described herein, such as with respect to FIG. 13 and FIG. 16.

Figure 21B:
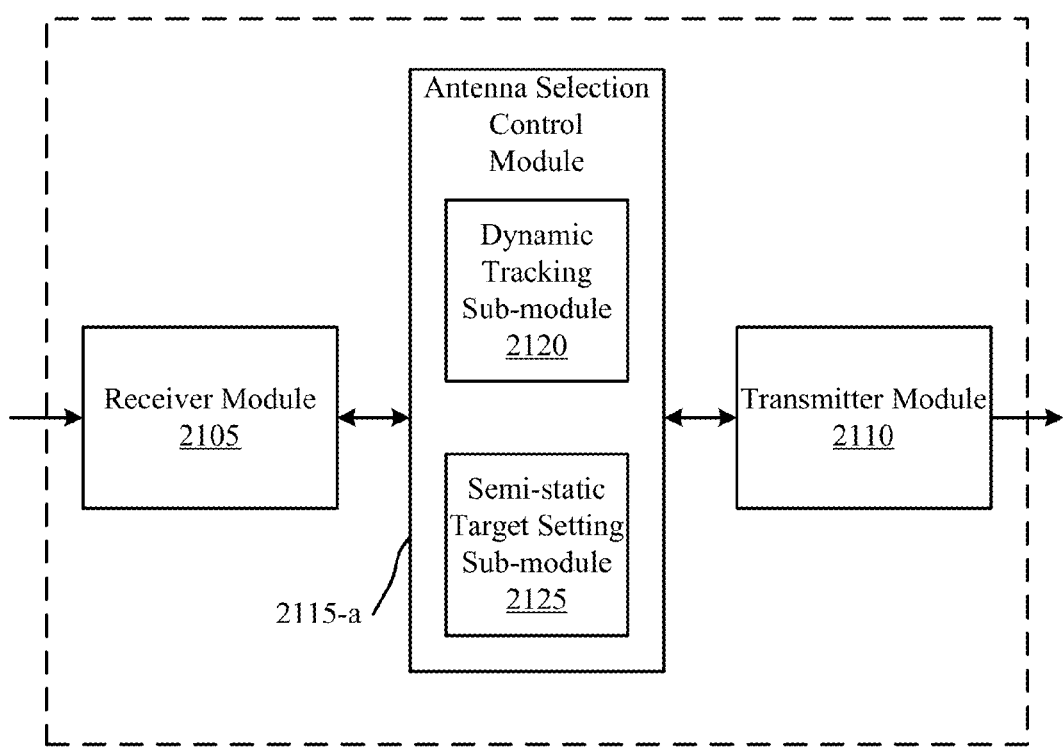
FIG. 21B shows another device for performing antenna selection in accordance with various examples.

FIG. 21B illustrates another device 2100-*b* for performing antenna selection for a UE. Device 2100-*b* may illustrate, for example, aspects of UEs 115 illustrated in FIG. 1, receiver/demodulator 230 of FIG. 2, receiver 300 of FIG. 3, and/or the device 2100-*a* of FIG. 21A. As shown, the device 2100-*b* includes a receiver module 2105, a transmitter module 2110 and an antenna selection control module 2115-*a*. The device 2100-*b* may also include a processor (not shown), which may be part of the antenna selection control module 2115-*a*, for example. Each of these components may be in communication with each other.

The receiver module 2105 and the transmitter module 2110 may be configured and may be employed as described above with respect to FIG. 21A. The antenna selection control module 2115-*a* may be configured and may implement operations as described above with respect to the antenna selection control module 2115 of FIG. 21A.

Further, as illustrated in FIG. 21B, the antenna selection control module 2115-*a* may include a dynamic tracking sub-module 2120 and a semi-static target setting sub-module 2125. These sub-modules may be configured to perform the various derivations, computations, comparisons and other operations involved with dynamic target tracking and target setting as described herein, such as described with respect to FIG. 13 and FIG. 16. The antenna selection control module 2115-*a* may control the operations of the dynamic tracking sub-module 2120 and the semi-static target setting sub-module 2125, as appropriate or desired, and may provide measurement results, thresholds, constants, etc. thereto for carrying out such operations.

Figure 21C:
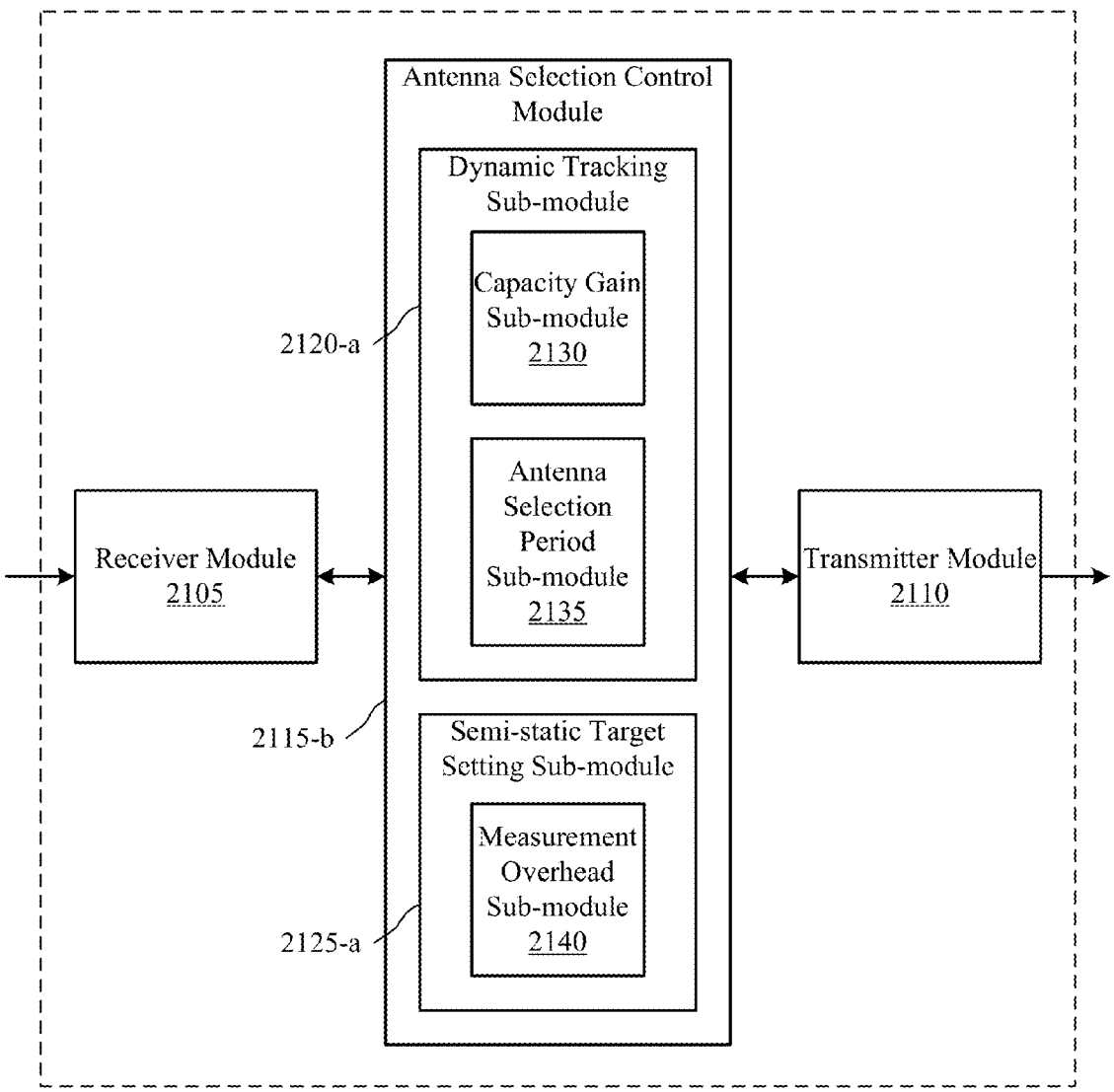
FIG. 21C shows yet another device for performing antenna selection in accordance with various examples.

FIG. 21C illustrates another device 2100-*c* for performing antenna selection for a UE. Device 2100-*c* may illustrate, for example, aspects of UEs 115 illustrated in FIG. 1, receiver/demodulator 230 of FIG. 2, receiver 300 of FIG. 3, and/or the devices 2100 of FIGS. 21A and/or 21B. As shown, the device 2100-*c* includes a receiver module 2105, a transmitter module 2110 and an antenna selection control module 2115-*b*. The device 2100-*c* may also include a processor (not shown), which may be part of the antenna selection control module 2115-*b*, for example. Each of these components may be in communication with each other.

The receiver module 2105 and the transmitter module 2110 may be configured and may be employed as described above with respect to FIG. 21A. The antenna selection control module 2115-*b* may be configured and may implement operations as described above with respect to the antenna selection control modules 2115 of FIGS. 21A and/or 21B. Thus, antenna selection control module 2115-*b* may include a dynamic tracking sub-module 2120-*a* and a semi-static target setting sub-module 2125-*a*, which may be configured as described above with respect to FIG. 21B.

Further, as illustrated in FIG. 21C, the dynamic tracking sub-module 2120-*a* may include a capacity gain sub-module 2130 and an antenna selection period sub-module 2135. The capacity gain sub-module 2130 may be configured to derive a capacity ratio from antenna measurements. In some examples, the capacity gain sub-module 2130 also may be configured to perform comparisons of the capacity gain to target gain(s) (e.g., upper and lower target gains, etc.). Alternatively, such comparisons may be performed by the dynamic tracking sub-module 2120-*a* or the antenna selection control module 2115-*b*. Results of the comparison(s) may be provided to the antenna selection period sub-module 2135.

The antenna selection period sub-module 2135 may be configured to adjust the antenna selection period for the next antenna selection interval as described herein. For example, the antenna selection period sub-module 2135 may decrease, increase or maintain the antenna selection period based on results of the foregoing comparisons, such as described above with respect to FIG. 13 and FIG. 16.

The semi-static target setting sub-module 2125-*a* may include a measurement overhead sub-module 2140. The measurement overhead sub-module 2140 may be configured to determine when target setting should be performed (e.g., every S-th measurement set) and to determine whether to adjust the target relative to the previous target. As described above with respect to FIG. 13, whether to adjust the target may be determined using a result of a comparison to a threshold. The measurement overhead sub-module 2140 may be configured to compute a value for comparison to the threshold, and may be configured to determine or set the threshold as well. Further, the measurement overhead sub-module 2140 may be configured to determine a current target (measurement overhead), such as described above with respect to FIG. 13 or FIG. 16. In some examples, one or more of these operations may be performed by the semi-static target setting sub-module 2125-*a*.

Figure 21D:
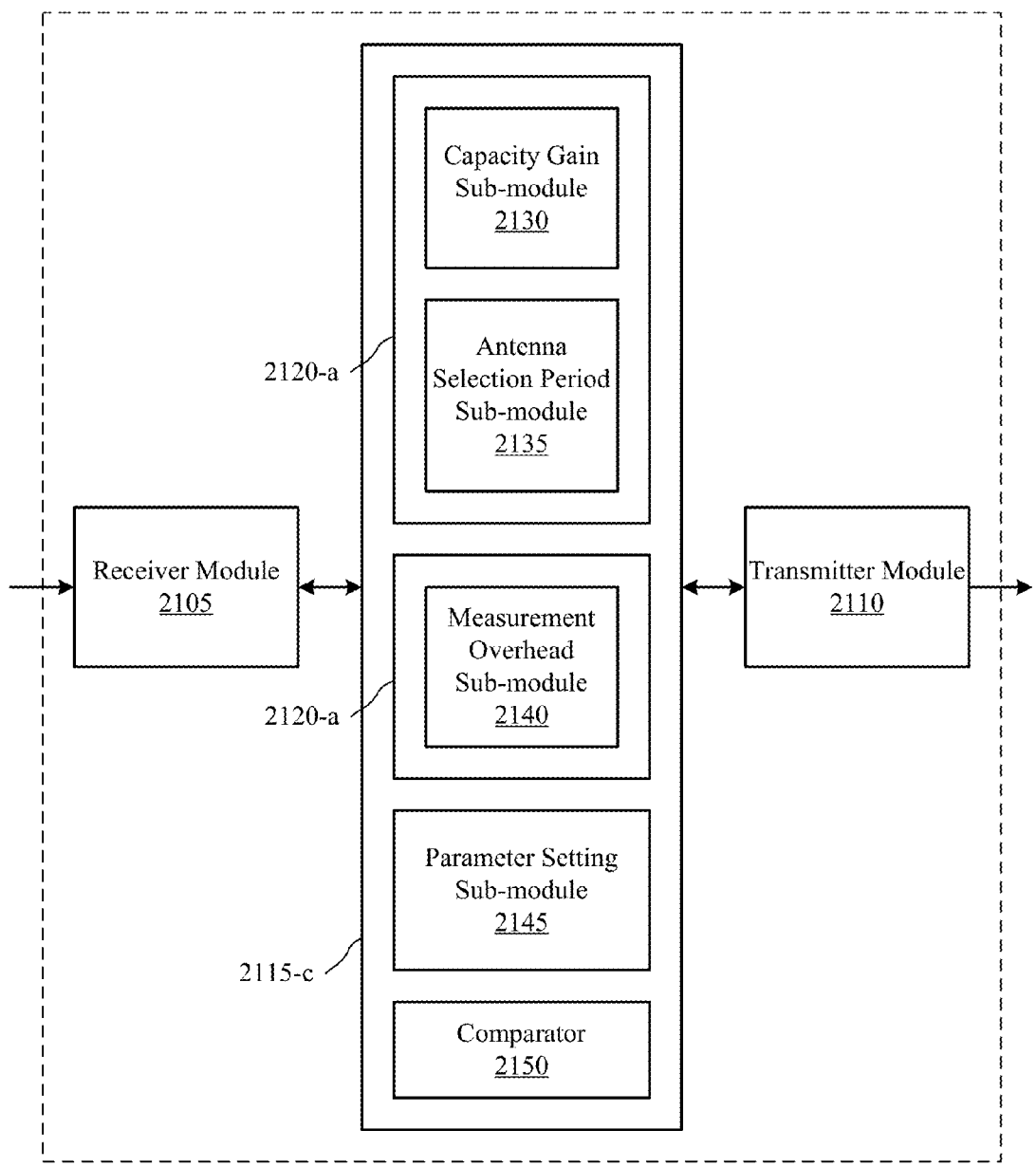
FIG. 21D shows still another device for performing antenna selection in accordance with various examples.

FIG. 21D illustrates another device 2100-*d* for performing antenna selection for a UE. Device 2100-*d* may illustrate, for example, aspects of UEs 115 illustrated in FIG. 1, receiver/demodulator 230 of FIG. 2, receiver 300 of FIG. 3, and/or the devices 2100 of FIGS. 21A, 21B and/or 21C. As shown, the device 2100-*d* includes a receiver module 2105, a transmitter module 2110 and an antenna selection control module 2115-*c*. The device 2100-*d* may also include a processor (not shown), which may be part of the antenna selection control module 2115-*c*, for example. Each of these components may be in communication with each other.

The receiver module 2105 and the transmitter module 2110 may be configured and may be employed as described above with respect to FIG. 21A. The antenna selection control module 2115-*c* may be configured and may implement operations as described above with respect to the antenna selection control modules 2115 of FIGS. 21A, 21B and/or 21C. Thus, antenna selection control module 2115-*c* may include a dynamic tracking sub-module 2120-*a* and a semi-static target setting sub-module 2125-*a*, which may be configured as described above with respect to FIG. 21B or FIG. 21C. As shown in FIG. 21D, the dynamic tracking sub-module 2120-*a* and the semi-static target setting sub-module 2125-*a* include a capacity gain sub-module 2130, an antenna selection period sub-module 2135 and a measurement overhead sub-module 2140, respectively. These sub-modules may be configured as described above with respect to FIG. 21C.

Further, the antenna selection control module 2115-*c* may include a parameter setting sub-module 2145 and a comparator 2150. The parameter setting sub-module 2145 may be configured to determine various parameters for performing antenna selection and/or control as described herein. For example, the parameter setting sub-module 2145 may determine the various thresholds, the target margins and/or the amounts of decrease/increase for the antenna selection period for the dynamic target tracking. As appropriate or desired, the parameter setting sub-module 2145 also may determine an initial target value (measurement overhead) for initialization of the antenna selection process. The comparator 2150 may be provided with thresholds from the parameter setting sub-module 2145 and with values for comparing thereto from the corresponding sub-modules, and may provide results of comparisons performed to the appropriate sub-modules.

Figure 21E:
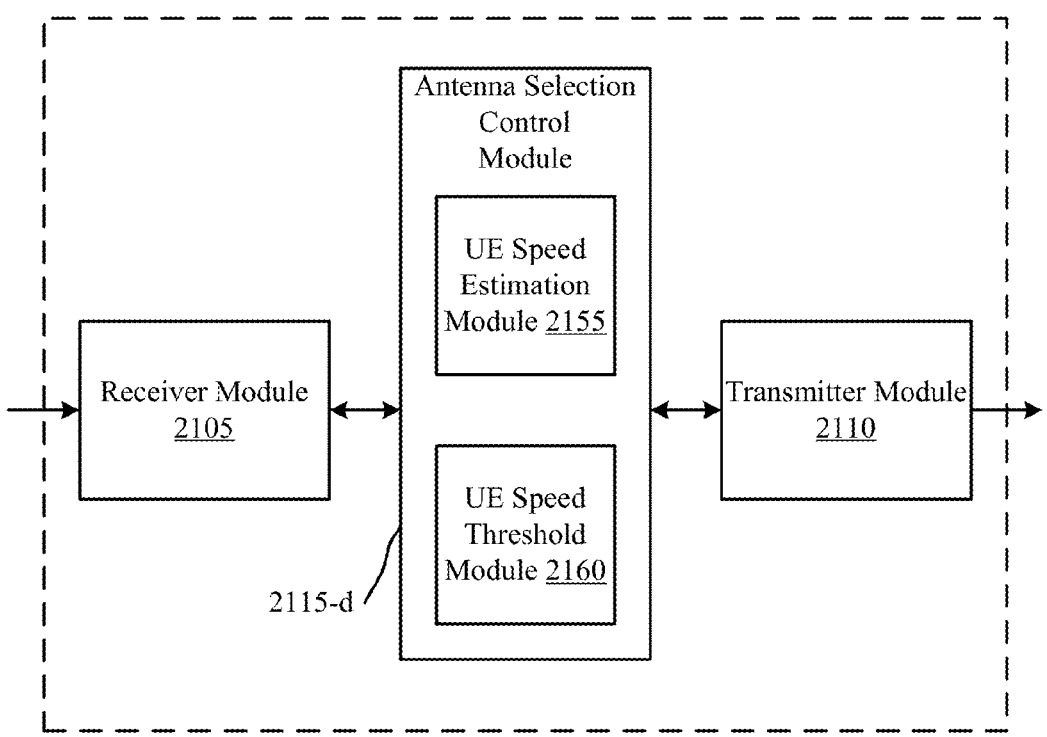
FIG. 21E shows yet another device for performing antenna selection in accordance with various examples.

FIG. 21E illustrates another device 2100-*e* for performing antenna selection for a UE. Device 2100-*e* may illustrate, for example, aspects of UEs 115 illustrated in FIG. 1, receiver/demodulator 230 of FIG. 2, receiver 300 of FIG. 3, and/or the device 2100-*a* of FIG. 21A. As shown, the device 2100-*e* includes a receiver module 2105, a transmitter module 2110 and an antenna selection control module 2115-*d*. The device 2100-*e* may also include a processor (not shown), which may be part of the antenna selection control module 2115-*d*, for example. Each of these components may be in communication with each other.

The receiver module 2105 and the transmitter module 2110 may be configured and may be employed as described above with respect to FIG. 21A. The antenna selection control module 2115-*d* may be configured and may implement operations as described above with respect to the antenna selection control module 2115 of FIG. 21A.

Further, as illustrated in FIG. 21E, the antenna selection control module 2115-*d* may include a UE speed estimation module 2155 and a UE speed threshold module 2160. These sub-modules may be configured to perform the various derivations, computations, comparisons and other operations involved with estimating and comparing UE speed, as described herein, such as described with respect to FIGS. 5-9. The antenna selection control module 2115-*d* may control the operations of the UE speed estimation module 2155 and the UE speed threshold module 2160, as appropriate or desired, and may provide measurement results, thresholds, constants, etc. thereto for carrying out such operations.

Figure 21F:
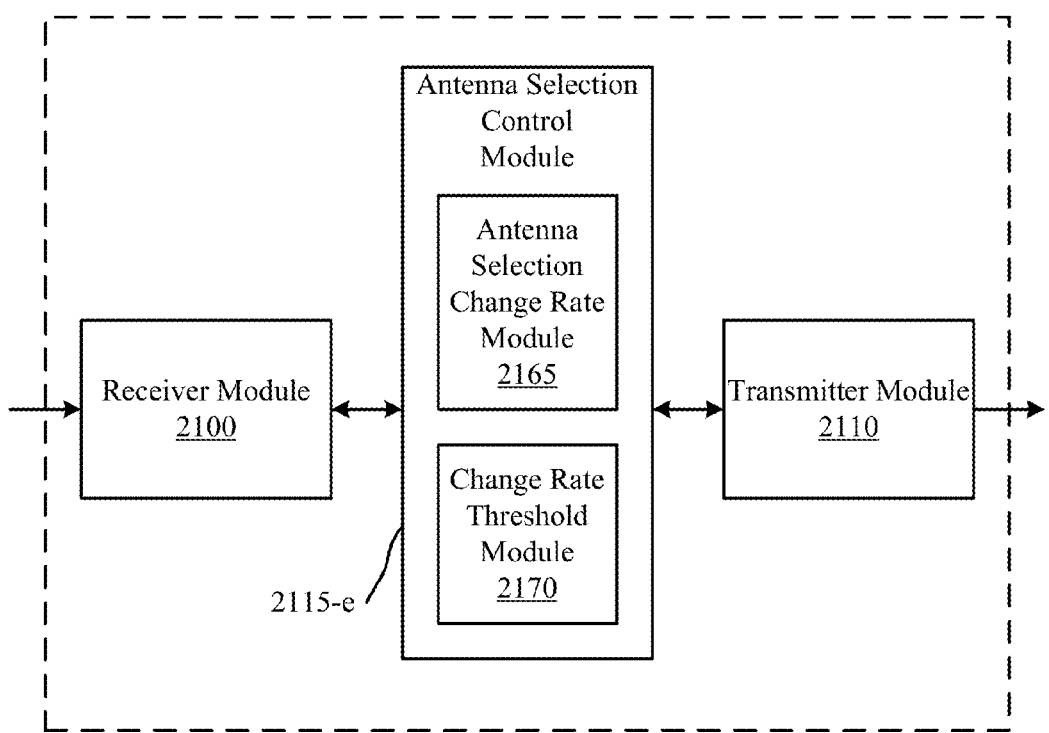
FIG. 21F shows still another device for performing antenna selection in accordance with various examples.

FIG. 21F illustrates another device 2100-*f* for performing antenna selection for a UE. Device 2100-*f* may illustrate, for example, aspects of UEs 115 illustrated in FIG. 1, receiver/demodulator 230 of FIG. 2, receiver 300 of FIG. 3, and/or the device 2100-*a* of FIG. 21A. As shown, the device 2100-*f* includes a receiver module 2105, a transmitter module 2110 and an antenna selection control module 2115-*e*. The device 2100-*f* may also include a processor (not shown), which may be part of the antenna selection control module 2115-*e*, for example. Each of these components may be in communication with each other.

The receiver module 2105 and the transmitter module 2110 may be configured and may be employed as described above with respect to FIG. 21A. The antenna selection control module 2115-*e* may be configured and may implement operations as described above with respect to the antenna selection control module 2115 of FIG. 21A.

Further, as illustrated in FIG. 21E, the antenna selection control module 2115-*e* may include an antenna selection change rate module 2165 and a change rate threshold module 2170. These sub-modules may be configured to perform the various derivations, computations, comparisons and other operations involved with estimating and comparing antenna selection change rate, as described herein, such as described with respect to FIGS. 10-12. The antenna selection control module 2115-*e* may control the operations of the antenna selection change rate module 2165 and the change rate threshold module 2170, as appropriate or desired, and may provide measurement results, thresholds, constants, etc. thereto for carrying out such operations.

Figure 22A:
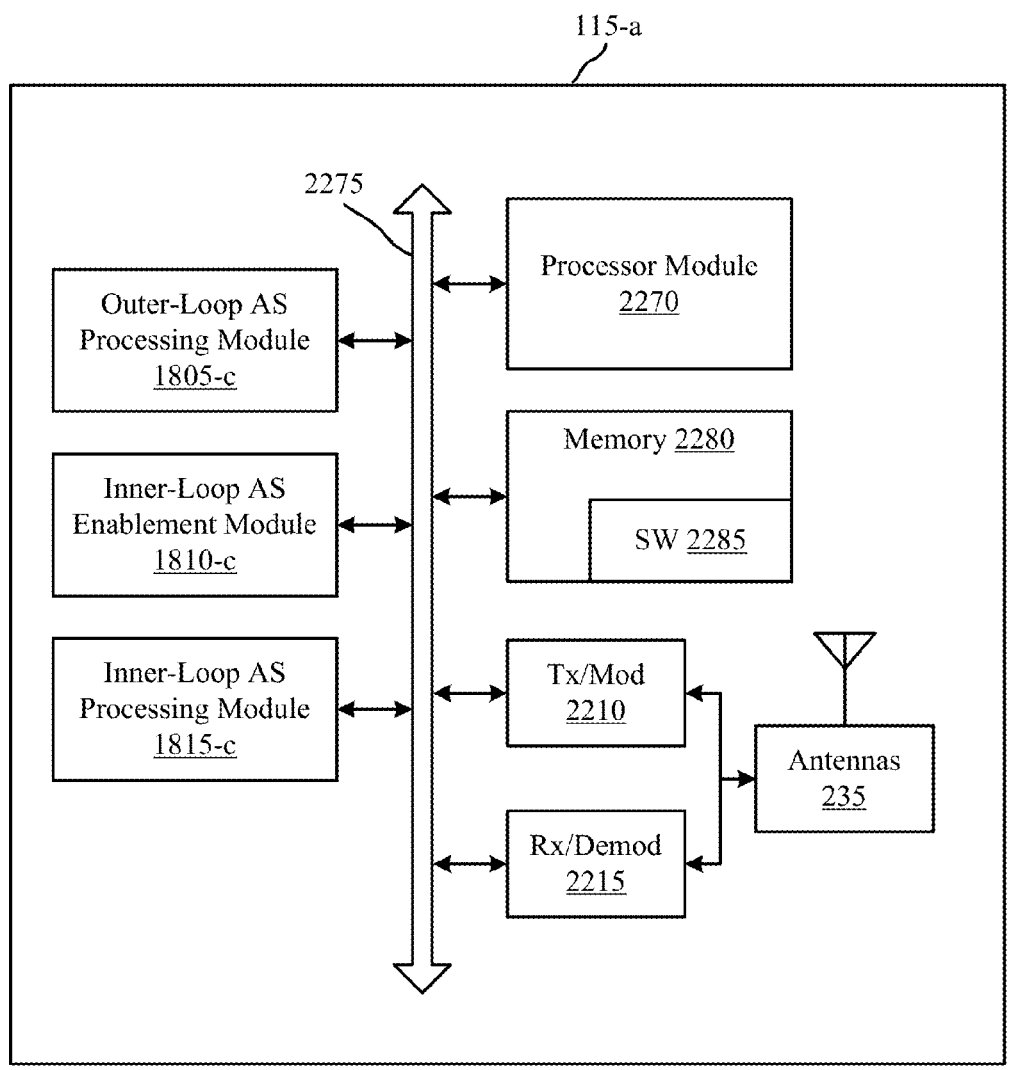
FIG. 22A shows a block diagram of a mobile device configured for enabling and disabling antenna selection using estimates of device speed according to various examples.

FIG. 22A is a block diagram 2200-*a* of a mobile device 115-*a* configured for enabling and disabling antenna selection using an outer-loop according to various examples. The mobile device 115-*a* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*a* may have an internal power supply (not shown), such as a small battery, to facilitate mobile operation. In some examples, the mobile device 115-*a* may be the mobile devices 115 of FIG. 1.

The mobile device 115-*a* may generally include components for bi-directional voice and data communications including components for transmitting communications and components for receiving communications. The mobile device 115-*a* may include a processor module 2270, a memory 2280, transmitter/modulators 2210, receiver/demodulators 2215, and antennas 235, which each may communicate, directly or indirectly, with each other (e.g., via one or more buses 2275). The mobile device 115-*a* may include multiple antennas 235 capable of concurrently transmitting and/or receiving multiple wireless transmissions via transmitter/modulator modules 2210 and receiver/demodulator modules 2215. For example, the mobile device 115-*a* may have N antennas 235, T transmitter/modulator modules 2210, and R receiver/demodulators 2215. The transmitter/modulator modules 2210 may be configured to transmit signals via one or more of the antennas 235 to access points including base stations 105. The transmitter/modulator modules 2210 may include a modem configured to modulate packets and provide the modulated packets to the antennas 235 for transmission. The receiver/demodulators 2215 may be configured to receive, perform RF processing, and demodulate packets received from one more of the antennas 235. In some examples, the mobile device 115-*a* may have one receiver/demodulator 2215 for each antenna 235 (i.e., R=N), while in other examples R may be less than or greater than N. The transmitter/modulators 2210 and receiver/demodulators 2215 may be capable of concurrently communicating with multiple eNBs 105 via multiple MIMO layers and/or component carriers.

According to the architecture of FIG. 22A, the mobile device 115-*a* may also include outer-loop AS processing module 1805-*c*, inner-loop AS enablement module 1810-*c*, and inner-loop AS processing module 1815-*c*. By way of example, these modules may be components of the mobile device 115-*a* in communication with some or all of the other components of the mobile device 115-*a* via bus 2275. Alternatively, functionality of these modules may be implemented as a component of the transmitter/modulators 2210, the receiver/demodulators 2215, as a computer program product, and/or as one or more controller elements of the processor module 2270.

The memory 2280 may include random access memory (RAM) and read-only memory (ROM). The memory 2280 may store computer-readable, computer-executable software/firmware code 2285 containing instructions that are configured to, when executed, cause the processor module 2270 to perform various functions described herein (e.g., call processing, database management, antenna selection, etc.). Alternatively, the software/firmware code 2285 may not be directly executable by the processor module 2270 but be configured to cause a computer (e.g., when compiled and executed) to perform functions described herein.

The processor module 2270 may include an intelligent hardware device, e.g., a central processing unit (CPU) such as those made by Intel® Corporation or AMD®, a microcontroller, an application-specific integrated circuit (ASIC), etc. The mobile device 115-*a* may include a speech encoder (not shown) configured to receive audio via a microphone, convert the audio into packets (e.g., 20 ms in length, 30 ms in length, etc.) representative of the received audio, provide the audio packets to the transmitter/modulator module 2210, and provide indications of whether a user is speaking.

The mobile device 115-*a* may be configured to implement aspects discussed above with respect to UEs 115 of FIG. 1, receiver/demodulator 230 of FIG. 2, receiver 300 of FIG. 3, devices 1800, 1900, or 2000 of FIG. 18, FIG. 19, or FIG. 20 and may not be repeated here for the sake of brevity. Thus, the outer-loop AS processing module 1805-*c* may include the modules and functionality described above with reference to outer-loop AS processing modules 1805, 1805-*a*, or 1805-*b* of FIG. 18, FIG. 19, or FIG. 20, respectively. The inner-loop AS enablement module 1810-*c* may include the modules and functionality described above with reference to the inner-loop AS enablement modules 1810, 1810-*a*, or 1810-*b* of FIG. 18, FIG. 19, or FIG. 20, respectively. The inner-loop AS processing module 1815-*c* may include the modules and functionality described above with reference to the inner-loop AS processing modules 1815, 1815-*a*, and 1815-*b* of FIG. 18, FIG. 19, or FIG. 20, respectively.

Figure 22B:
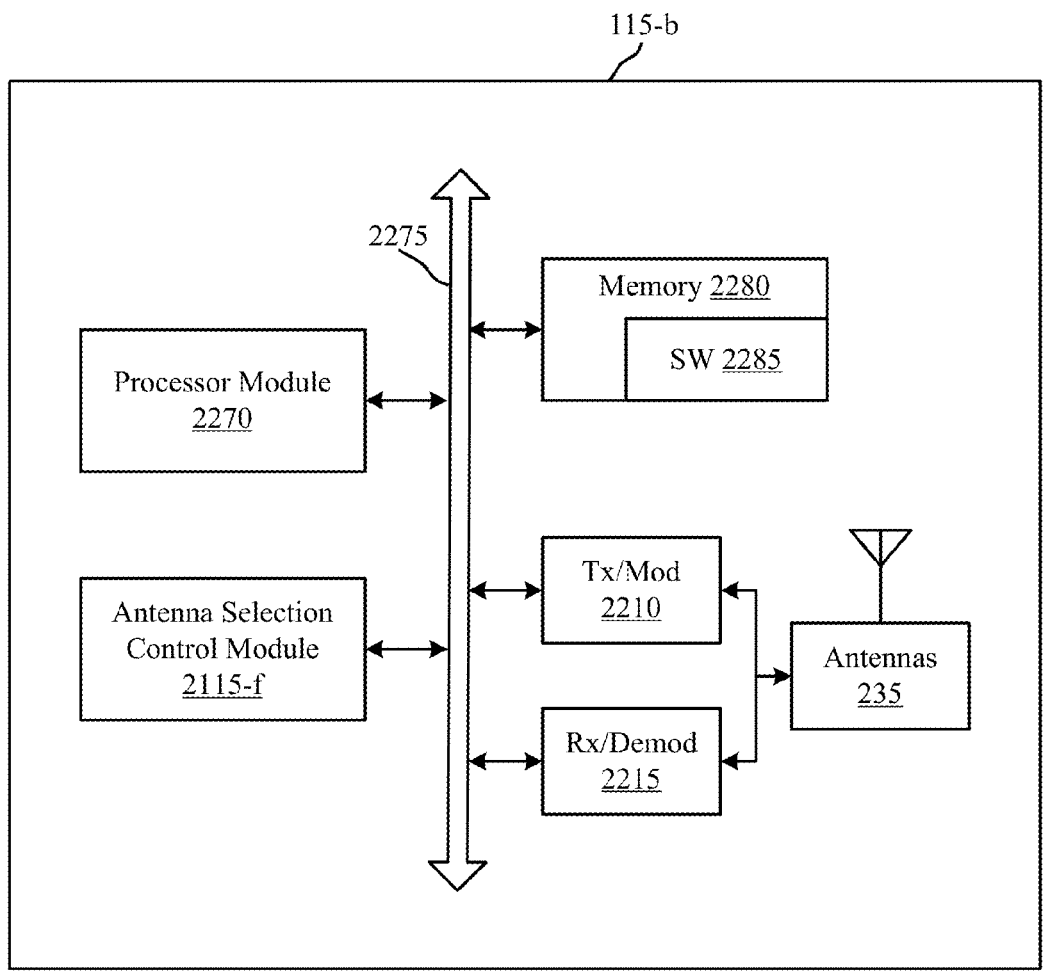
FIG. 22B shows a block diagram of a mobile device configured for adjusting an antenna selection period according to various examples.

FIG. 22B is a block diagram 2200-*b* of a mobile device 115-*b* configured for adjusting an antenna selection period according to various examples. The mobile device 115-*b* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*b* may have an internal power supply (not shown), such as a small battery, to facilitate mobile operation. In some examples, the mobile device 115-*b* may be the mobile devices 115 of FIG. 1.

The mobile device 115-*b* may generally include components for bi-directional voice and data communications including components for transmitting communications and components for receiving communications, as described in FIG. 22A.

According to the architecture of FIG. 22B, the mobile device 115-*b* may also include antenna selection control module 2115-*f*. By way of example, this module may be a component of the mobile device 115-*b* in communication with some or all of the other components of the mobile device 115-*b* via bus 2275. Alternatively, functionality of these modules may be implemented as a component of the transmitter/modulators 2210, the receiver/demodulators 2215, as a computer program product, and/or as one or more controller elements of the processor module 2270.

The mobile device 115-*b* may be configured to implement aspects discussed above with respect to UEs 115 of FIG. 1, receiver/demodulator 230 of FIG. 2, receiver 300 of FIG. 3, devices 2100-*a*, 2100-*b*, 2100-*c*, 2100-*d*, 2100-*e* or 2100-*f* of FIGS. 21A, 21B, 21C, 21D, 21E and 21F, and may not be repeated here for the sake of brevity. Thus, the antenna selection control module 2115-*f* may include the modules and functionality described above with reference to the dynamic tracking sub-module 2120, the semi-static target setting sub-module 2125, the capacity gain sub-module 2130, the antenna selection period sub-module 2135, the measurement overhead sub-module 2140, the parameter setting sub-module 2145, and comparator 2150, the UE speed estimation module 2155, the UE speed threshold module 2160, the antenna selection change rate module 2165, or the change rate threshold module 2170 of FIGS. 21A, 21B, 21C, 21D, 21E and 21F.

Figure 23:
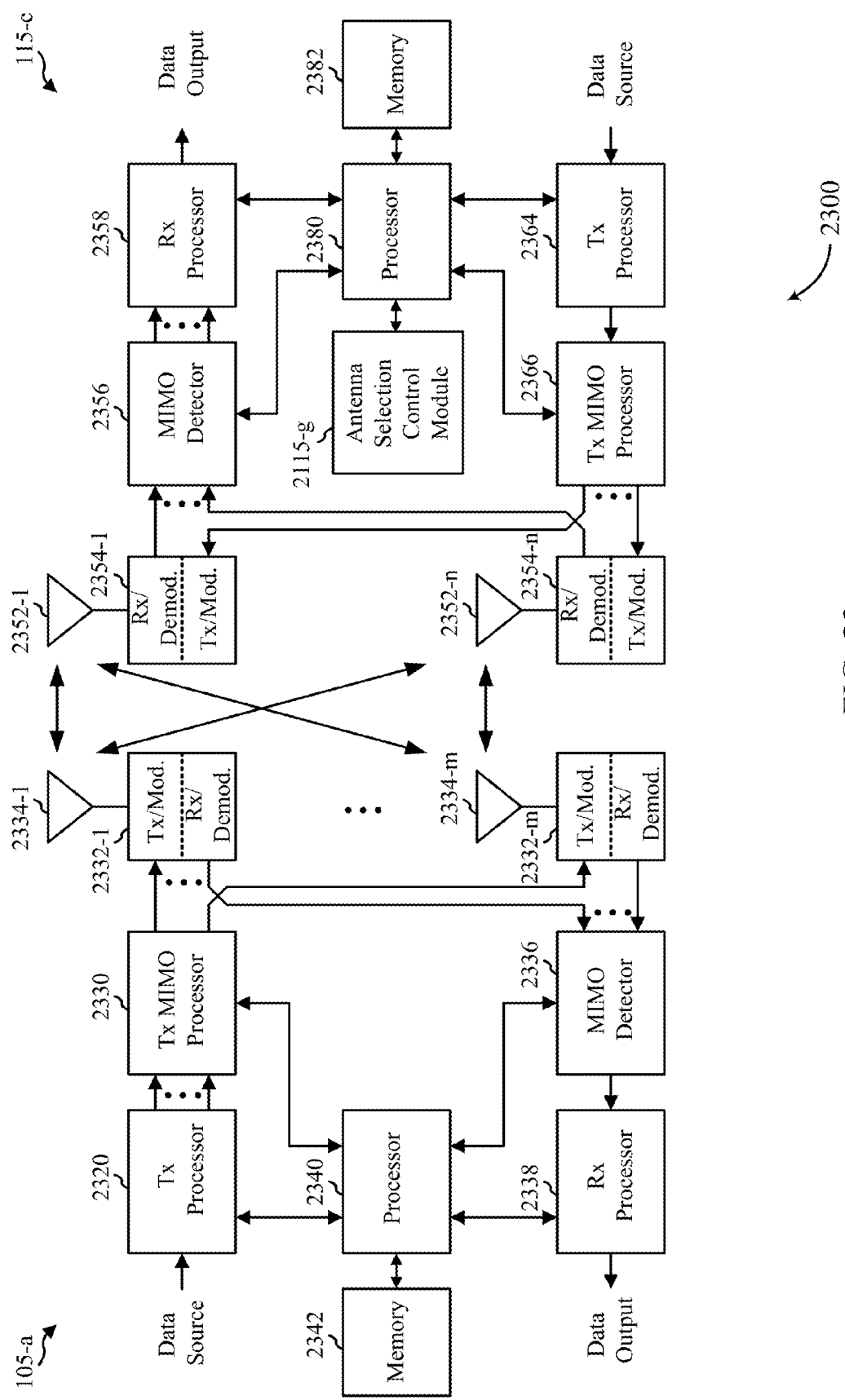
FIG. 23 shows a block diagram of a MIMO communication system including a base station or eNB and a mobile device or UE.

FIG. 23 is a block diagram of a MIMO communication system 2300 including a base station or eNB 105-*a* and a mobile device or UE 115-*c*. The base station 105-*a* may be an example of the base stations 105 of FIG. 1, while the mobile device 115-*c* may be an example of the communication devices 115 of FIGS. 1, 22A, and 22B. This system 2300 may illustrate aspects of the system 100 of FIG. 1 and/or system 200 or FIG. 2. Moreover, the system 2300 may illustrate aspects of the multiple-antenna receiver 300 of FIG. 3. The base station 105-*a* may be equipped with M antennas 2334-1 through 2334-*m*, and the mobile device 115-*c* may be equipped with N antennas 2352-1 through 2352-*n*. In the system 2300, the base station 105-*a* may be able to send data over multiple communication links at the same time. Each communication link may be called a "layer" and the "rank" of the communication link may indicate the number of layers used for communication. Each layer may transmit a different data stream. Additionally or alternatively, the base station 105-*a* may employ transmit diversity to improve robustness of transmissions received by the mobile device 115-*c*. The mobile device 115-*c* may employ receive diversity using multiple receive antennas to combine signals received at multiple antennas.

At the base station 105-*a*, a transmit (Tx) processor 2320 may receive data from a data source or memory 2342 (e.g., via processor 2340). The transmit processor 2320 may process the data. The transmit processor 2320 may also generate reference symbols, and a cell-specific reference signal. A transmit (Tx) MIMO processor 2330 may perform spatial processing (e.g., precoding) on data symbols, control symbols, and/or reference symbols, if applicable, and may provide output symbol streams to the transmit modulators 2332-1 through 2332-*m*. Each modulator 2332 may process a respective output symbol stream (e.g., for OFDM, etc.) to obtain an output sample stream. Each modulator 2332 may further process (e.g., convert to analog, amplify, filter, and upconvert) the output sample stream to obtain a downlink (DL) signal. In one example, DL signals from modulators 2332-1 through 2332-*m* may be transmitted via the antennas 2334-1 through 2334-*m*, respectively.

At the mobile device 115-*c*, the mobile device antennas 2352-1 through 2352-*n* may receive the DL signals from the base station 105-*a* and may provide the received signals to the demodulators 2354-*a* through 2354-*n*, respectively. Each demodulator 2354 may condition (e.g., filter, amplify, downconvert, and digitize) a respective received signal to obtain input samples. Each demodulator 2354 may further process the input samples (e.g., for OFDM, etc.) to obtain received symbols. A MIMO detector 2356 may obtain received symbols from all the demodulators 2354-*a* through 2354-*n*, perform MIMO detection on the received symbols if applicable, and provide detected symbols. A receive (Rx) processor 2358 may process (e.g., demodulate, deinterleave, and decode) the detected symbols, providing decoded data for the mobile device 105-*a* to a data output, and provide decoded control information to a processor 2380, or memory 2382.

The mobile device 115-*c* may employ antenna selection. For example, the mobile device 115-*c* may perform R-out-of-N antenna selection by selecting a subset of R antennas 2352 of the N antennas having the highest SNR for receiving particular transmissions. Additionally or alternatively, the mobile device 115-*c* may perform capacity-power antenna selection to optimize the capacity of selected antenna subsets with respect to the receiver power consumption.

The mobile device 115-*c* may include antenna selection control module 2115-*g* to enable, disable, or adjust antenna selection based on an antenna selection performance metric. The antenna selection performance metric may include an estimated speed of the mobile device 115-*c*, an antenna selection change rate, measurement overhead, and antenna switching capacity gain. In some examples, the antenna selection control module 2115-*g* performs antenna enabling and disabling in an outer loop based on estimates of the speed of the mobile device 115-*c*. Mobile device speed may be estimated based on observations of Doppler effects to the received signals. Doppler estimation may be performed once each outer-loop period during a Doppler estimation period. The outer-loop period may be substantially longer than the Doppler estimation period. In examples, antenna selection is disabled during the Doppler estimation period. In other examples, an anchor antenna is used for Doppler estimation during Doppler estimation periods while antenna selection is performed among the remaining antennas.

In some examples, antenna selection control module 2115-*g* performs enabling and disabling of antenna selection based on a change rate of selected antenna subsets according to the antenna selection function. An outer loop may be performed that periodically checks the antenna selection change rate based on the antenna selection function while antenna selection is disabled. When the antenna selection change rate falls below a high change rate threshold, antenna selection may be enabled and the antenna selection period may be varied according to an inner loop. If the change rate is below a low threshold, the antenna selection period may be increased until a maximum antenna selection period is reached. If the change rate is above a high threshold, the antenna selection period may be decreased until a minimum antenna selection period is reached. If the change rate stays above the high threshold at the minimum antenna selection period, antenna selection may be disabled and the outer loop may be resumed to evaluate the change rate while antenna selection is disabled. In some examples, antenna selection control module 2115-*g* may be implemented as components of MIMO detector 2356, receive processor 2358, processor 2380 and/or memory 2382.

On the uplink (UL), at the mobile device 115-*c*, a transmit (Tx) processor 2364 may receive and process data from a data source or a processor 2380 coupled with memory 2382. The transmit processor 2364 may also generate reference symbols for a reference signal. The symbols from the transmit processor 2364 may be precoded by a transmit (Tx) MIMO processor 2366 if applicable, further processed by the demodulators 2354-*a* through 2354-*n* (e.g., for SC-FDMA, etc.), and be transmitted to the base station 105-*a* in accordance with the transmission parameters received from the base station 105-*a*. At the base station 105-*a*, the UL signals from the mobile device 115-*c* may be received by the antennas 2334, processed by the demodulators 2332, detected by a MIMO detector 2336 if applicable, and further processed by a receive (Rx) processor 2338. The receive processor 2338 may provide decoded data to a data output and to the processor 2340.

The components of the base station 105-*a* may, individually or collectively, be implemented with one or more Application Specific Integrated Circuits (ASICs) adapted to perform some or all of the applicable functions in hardware. Each of the noted modules may be a means for performing one or more functions related to operation of the system 2300. Similarly, the components of the mobile device 115-*c* may, individually or collectively, be implemented with one or more Application Specific Integrated Circuits (ASICs) adapted to perform some or all of the applicable functions in hardware. Each of the noted components may be a means for performing one or more functions related to operation of the system 2300.

Figure 24:
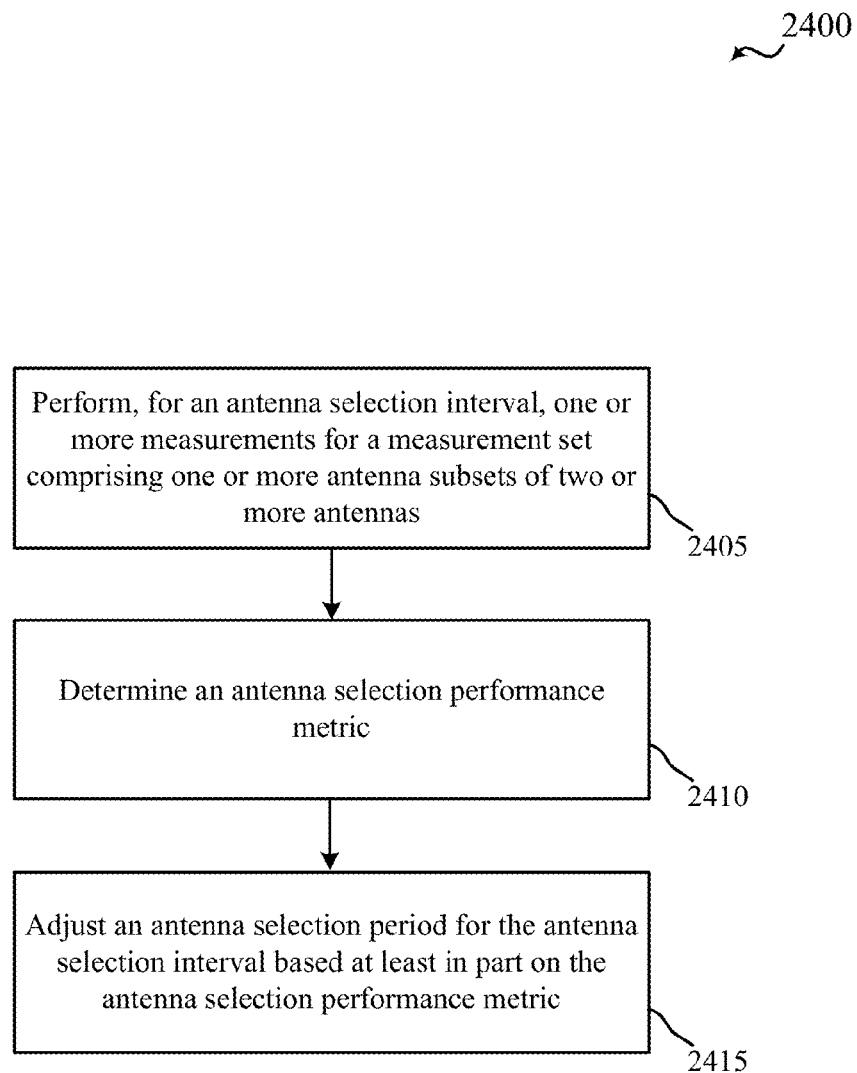
FIG. 24 shows a flowchart illustrating a method for performing antenna selection in accordance with various examples.

FIG. 24 is a flowchart illustrating an example of a method 2400 for performing antenna selection. The method 2400 may be performed using, for example, the UEs 115 of FIGS. 1, 22A, 22B, and 23, the receiver/demodulator 230 of FIG. 2, and/or the receiver 300 of FIG. 3.

The method 2400 may illustrate adjustment of an antenna selection period for one of repeating antenna selection intervals. Starting at block 2405 one or more measurements may be performed for a measurement set of the antenna selection interval. The measurement set may include one or more antenna subsets of two or more antennas.

At block 2410, an antenna selection performance metric may be determined. Based at least in part on the antenna selection performance metric, an antenna selection period for the antenna selection interval may be adjusted at block 2415. For example, the antenna selection period may be increased, decreased, enabled, or disabled.

The method 2400 illustrated in FIG. 24 provides a basic implementation of various aspects described herein. Other implementations may involve additional operations as described throughout this specification. For example, the method 2400 may be modified to include one or more aspects of the methods 800 or 1000 for enabling or disabling antenna selection as described above with respect to FIGS. 8 and 12, respectively. The method 2400 may also include one or more aspects of the methods 1200 or 1600 for determining the antenna selection metric based on UE speed, antenna selection change rate, or antenna selection overhead and capacity gain and adjusting the antenna selection period based on the determined antenna selection metric as described above with respect to FIGS. 12 and 16, respectively.

Figure 25:
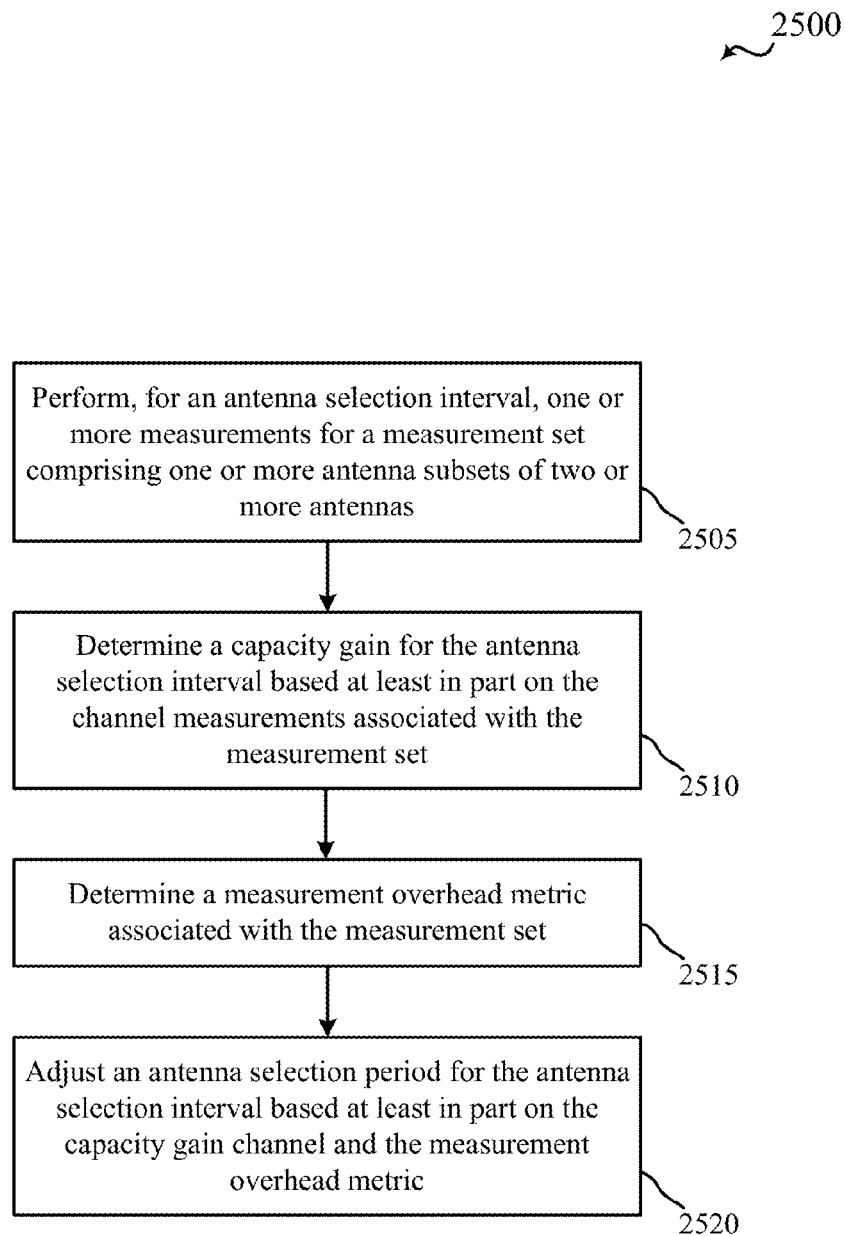
FIG. 25 shows a flowchart illustrating another method for performing antenna selection in accordance with various examples.

FIG. 25 is a flowchart illustrating another example of a method 2500 for performing antenna selection. The method 2500 may be performed using, for example, the UEs 115 of FIGS. 1, 22A, 22B, and 23, the receiver/demodulator 230 of FIG. 2, and/or the receiver 300 of FIG. 3.

The method 2500 may illustrate adjustment of an antenna selection period for one of repeating antenna selection intervals. Starting at block 2505 one or more measurements may be performed for a measurement set of the antenna selection interval. The measurement set may include one or more antenna subsets of two or more antennas and may be performed by switching to each of the one or more antenna subsets for measurement subframe(s).

At block 2510, a capacity gain may be determined for the antenna selection interval based at least in part on the channel measurements associated with the measurement set. For example, the capacity gain may be derived using equations 7 or 9.

At block 2515, a measurement overhead metric associated with the measurement set may be determined. For example, the measurement overhead metric may be determined using equations 5, 6, or 8.

Based at least in part on the capacity gain and the measurement overhead metric, an antenna selection period for the antenna selection interval may be adjusted at block 2520. For example, the antenna selection period may be increased from previous antenna selection interval if the capacity gain is lower than a target gain determined from the measurement overhead metric. Upper and lower target gains may be used to provide target bias and/or hysteresis.

The method 2500 illustrated in FIG. 25 provides a basic implementation of various aspect described herein. Other implementations may involve additional operations as described throughout this specification. For example, the method 2500 may be modified to include one or more aspects of the method 1600 as described above with respect to FIG. 16.

Figure 26:
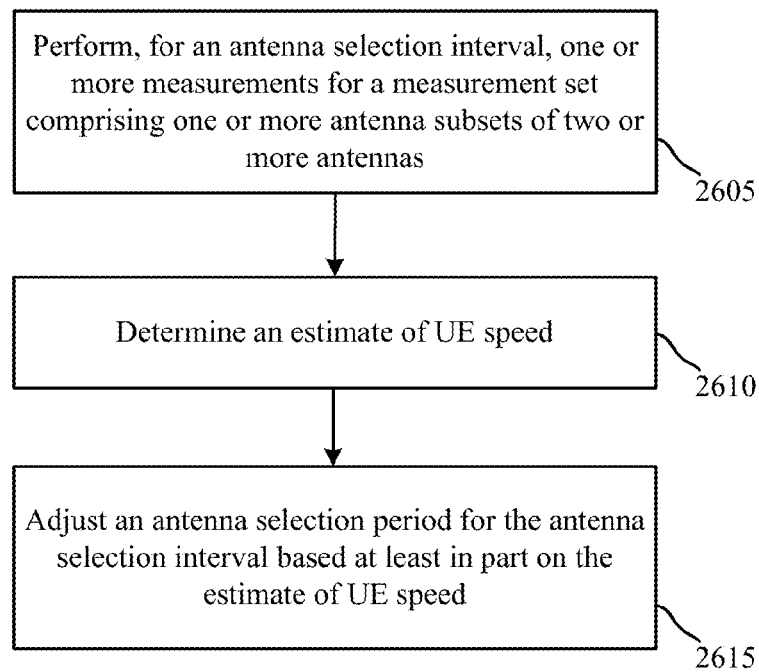
FIG. 26 shows a flowchart illustrating yet another method for performing antenna selection in accordance with various examples.

FIG. 26 is a flowchart illustrating another example of a method 2600 for performing antenna selection. The method 2600 may be performed using, for example, the UEs 115 of FIGS. 1, 22A, 22B, and 23, the receiver/demodulator 230 of FIG. 2, and/or the receiver 300 of FIG. 3.

The method 2600 may illustrate adjustment of an antenna selection period for one of repeating antenna selection intervals. Starting at block 2605 one or more measurements may be performed for a measurement set of the antenna selection interval. The measurement set may include one or more antenna subsets of two or more antennas.

At block 2610, an estimate of UE speed may be determined. Based at least in part on the estimate of UE speed, an antenna selection period for the antenna selection interval may be adjusted at block 2615. For example, the antenna selection period may be increased, decreased, enabled, or disabled based on the estimate of UE speed.

The method 2600 illustrated in FIG. 26 provides a basic implementation of various aspect described herein. Other implementations may involve additional operations as described throughout this specification. For example, the method 2600 may be modified to include one or more aspects of the method 800 as described above with respect to FIG. 8.

Figure 27:
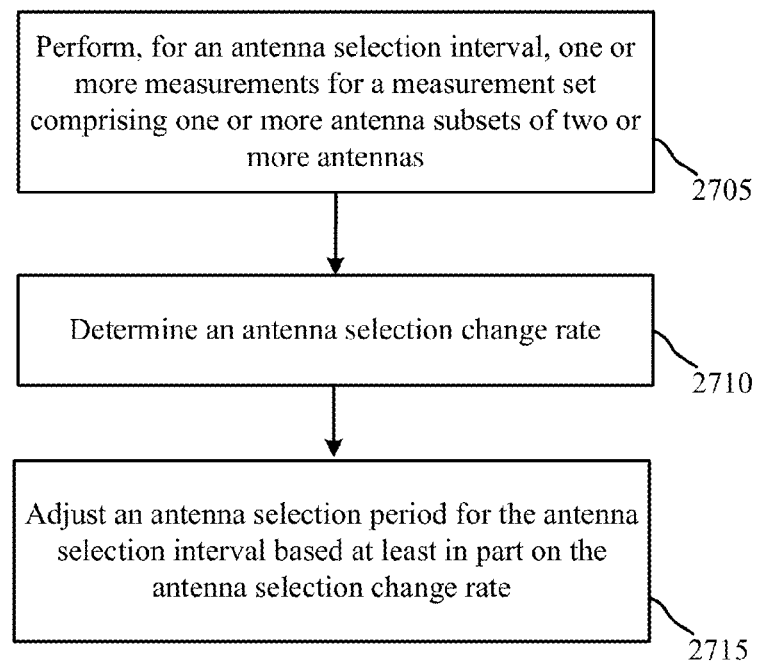
FIG. 27 shows a flowchart illustrating still another method for performing antenna selection in accordance with various examples.

FIG. 27 is a flowchart illustrating another example of a method 2700 for performing antenna selection. The method 2700 may be performed using, for example, the UEs 115 of FIGS. 1, 22A, 22B, and 23, the receiver/demodulator 230 of FIG. 2, and/or the receiver 300 of FIG. 3.

The method 2700 may illustrate adjustment of an antenna selection period for one of repeating antenna selection intervals. Starting at block 2705 one or more measurements may be performed for a measurement set of the antenna selection interval. The measurement set may include one or more antenna subsets of two or more antennas.

At block 2710, an antenna selection change rate may be determined. Based at least in part on the antenna selection change rate, an antenna selection period for the antenna selection interval may be adjusted at block 2715. For example, the antenna selection period may be increased, decreased, enabled, or disabled based on the antenna selection change rate.

The method 2700 illustrated in FIG. 27 provides a basic implementation of various aspect described herein. Other implementations may involve additional operations as described throughout this specification. For example, the method 2700 may be modified to include one or more aspects of the methods 1000 or 1200 as described above with respect to FIGS. 10 and 12, respectively.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, instructions, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE/LTE-A system for purposes of example, and LTE terminology is used in much of the description above, although the techniques are applicable beyond LTE/LTE-A applications.

What is claimed is:

1. A method for performing antenna selection at a user equipment (UE) having two or more antennas, comprising:
   performing, for an antenna selection interval, one or more channel measurements for a measurement set comprising one or more antenna subsets of the two or more antennas;
   determining an antenna selection performance metric, wherein determining the antenna selection performance metric comprises:
   determining a capacity gain for the antenna selection interval based at least in part on the one or more channel measurements, and
   determining a measurement overhead metric associated with performing the one or more channel measurements for the measurement set; and
   adjusting an antenna selection period for the antenna selection interval based at least in part on the antenna selection performance metric.

2. The method of claim 1, wherein determining the capacity gain comprises:
   calculating the capacity gain based at least in part on a highest estimated capacity identified for the measurement set and an estimated capacity of a current antenna subset.

3. The method of claim 1, wherein adjusting the antenna selection period comprises:
   adjusting the antenna selection period, wherein the adjusted antenna selection period conforms the capacity gain to a target gain, and the target gain is based at least in part on the measurement overhead metric; and
   adjusting the target gain according to a target gain period comprising one or more antenna selection periods.

4. The method of claim 1, wherein adjusting the antenna selection period comprises:
   decreasing the antenna selection period by a variable decrease step determined based on an amount by which the capacity gain is greater than an upper target gain, the upper target gain being based at least in part on the measurement overhead metric and an upper gain margin; and
   increasing the antenna selection period by a variable increase step determined based on an amount by which the capacity gain is less than a lower target gain, the lower target gain being based at least in part on the measurement overhead metric and a lower gain margin.

5. The method of claim 1, further comprising:
   filtering a plurality of antenna selection periods to obtain a filtered antenna selection period; and
   determining the measurement overhead metric based at least in part on the filtered antenna selection period.

6. The method of claim 5, wherein, when a difference between the filtered antenna selection period and a previous filtered antenna selection period is less than a threshold, the measurement overhead metric is set to a previous measurement overhead metric.

7. The method of claim 5, wherein the measurement overhead metric comprises a ratio determined by a number of subframes in the measurement set divided by a number of subframes in the filtered antenna selection period.

8. The method of claim 1, wherein the measurement overhead metric is determined based at least in part on an effective channel capacity for a current antenna subset and estimated capacity losses from channel measurements for each antenna subset of the measurement set.

9. The method of claim 1, wherein determining the antenna selection performance metric comprises:
   determining an estimate of UE speed.

10. The method of claim 1, wherein determining the antenna selection performance metric comprises:
    determining an antenna selection change rate.

11. The method of claim 10, wherein adjusting the antenna selection period comprises:
    decreasing the antenna selection period if the antenna selection change rate is greater than an antenna change rate high threshold; and increasing the antenna selection period if the antenna selection change rate is less than an antenna change rate low threshold.

12. An apparatus for performing antenna selection at a user equipment (UE) having two or more antennas, comprising:

a processor;

memory in electronic communication with the processor, the memory embodying instructions, the instructions being executable by the processor to:

perform, for an antenna selection interval, one or more channel measurements for a measurement set comprising one or more antenna subsets of the two or more antennas;

determine an antenna selection performance metric associated with the measurement set, wherein the instructions are executable by the processor to determine the antenna selection performance metric by:

determining a capacity gain for the antenna selection interval based at least in part on the one or more channel measurements, and determining a measurement overhead metric associated with performing the one or more channel measurements for the measurement set; and adjust an antenna selection period for the antenna selection interval based at least in part on the antenna selection performance metric.

13. The apparatus of claim 12, wherein the instructions are executable by the processor to determine the antenna selection performance metric by:

determining an estimate of UE speed.

14. The apparatus of claim 12, wherein the instructions are executable by the processor to determine the antenna selection performance metric by:

determining an antenna selection change rate.

* * * * *